US 8,893,497 B2

(12) United States Patent
Sverdlin

(10) Patent No.: US 8,893,497 B2
(45) Date of Patent: Nov. 25, 2014

(54) KINEMATICALLY INDEPENDENT, THERMO-HYDRO-DYNAMIC TURBO-COMPOUND GENERATOR

(75) Inventor: Anatoly Sverdlin, Anderson, SC (US)

(73) Assignee: Kithd Technologies, LLC, Charlotte, NC (US)

( * ) Notice: Subject to any disclaimer, the term of this patent is extended or adjusted under 35 U.S.C. 154(b) by 0 days.

(21) Appl. No.: 13/566,532

(22) Filed: Aug. 3, 2012

(65) Prior Publication Data

US 2014/0033709 A1 Feb. 6, 2014

(51) Int. Cl.
*F01K 27/00* (2006.01)
*F01K 13/00* (2006.01)

(52) U.S. Cl.
CPC ............. *F01K 27/00* (2013.01); *F01K 13/006* (2013.01)
USPC .......................................................... 60/643

(58) Field of Classification Search
USPC ........ 60/517, 519, 522, 524, 525, 644.1, 645, 60/682, 641.8, 659, 650, 671, 676, 651; 290/1 A–1 E, 1 R
See application file for complete search history.

(56) References Cited

U.S. PATENT DOCUMENTS

| 3,121,311 | A |  | 2/1964 | Crosby et al. |
|---|---|---|---|---|
| 4,148,195 | A |  | 4/1979 | Gerstmann et al. |
| 4,808,079 | A | * | 2/1989 | Crowley et al. .................. 417/50 |
| 5,195,321 | A |  | 3/1993 | Howard |
| 6,164,263 | A |  | 12/2000 | Saint-Hillaire et al. |
| 6,568,169 | B2 |  | 5/2003 | Conde et al. |
| 7,134,279 | B2 |  | 11/2006 | White et al. |
| 7,669,415 | B2 |  | 3/2010 | Komaki et al. |
| 2007/0157615 | A1 |  | 7/2007 | Morgenstein |
| 2007/0193266 | A1 |  | 8/2007 | McConaghy |
| 2008/0072597 | A1 |  | 3/2008 | Call |

FOREIGN PATENT DOCUMENTS

| RU | 2133860 C1 | 7/1999 |
|---|---|---|
| WO | 9307374 A1 | 4/1993 |

OTHER PUBLICATIONS

Beale, W. et al., Sunpower, Inc. Stirling Engine Configurations, http://www.freepistonjetengine.741.com.
Fette, P., Stirling Engine Research and Computer Program Development, http://home.germany.net/101-276996/fette.htm#e.

* cited by examiner

*Primary Examiner* — Kenneth Bomberg
*Assistant Examiner* — Wesley Harris
(74) *Attorney, Agent, or Firm* — Nelson Mullins Riley & Scarborough LLP

(57) ABSTRACT

A power generator may include a digital programmable governor, a plurality of power modules that have working fluid including compound gas and a magneto-responsive liquid column disposed therein, a thermal generator capable of adding heat to the working fluid, one or more cooling exchangers configured to remove heat from the working fluid, at least one set of electro-hydro-dynamic actuators, and a plurality of bidirectional turbines. The set of electro-hydro-dynamic actuators are disposed proximate to the power modules to, responsive to control of the digital programmable governor and in association with a thermal cycle of adding heat to and removing heat from the working fluid, provide influence to drive reciprocal flows of the working fluid through the power modules. The bi-directional turbines are disposed to receive the reciprocal flows and perform a kinematically independent conversion of the operating medium reciprocal flows to rotary motion power output.

19 Claims, 17 Drawing Sheets

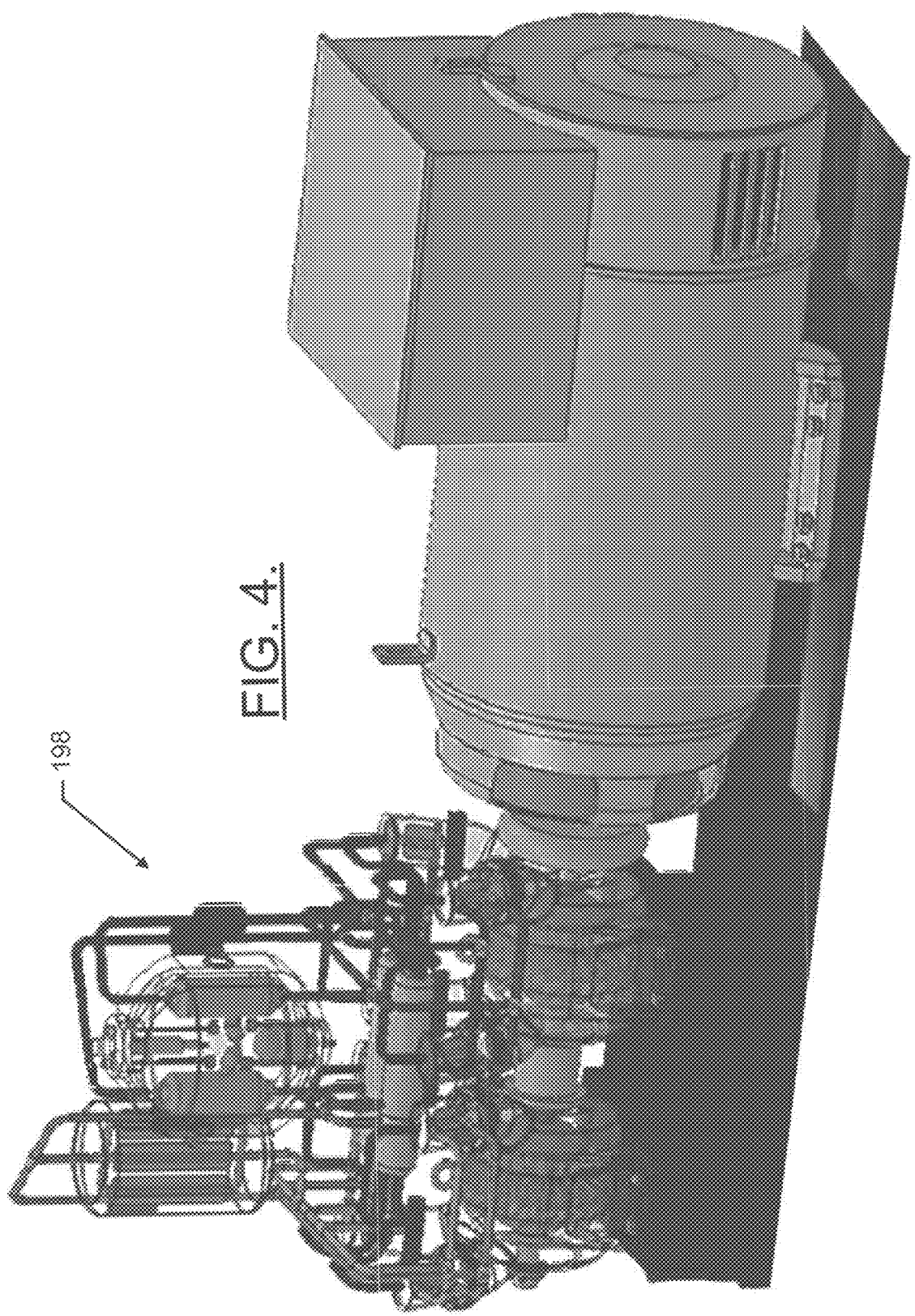

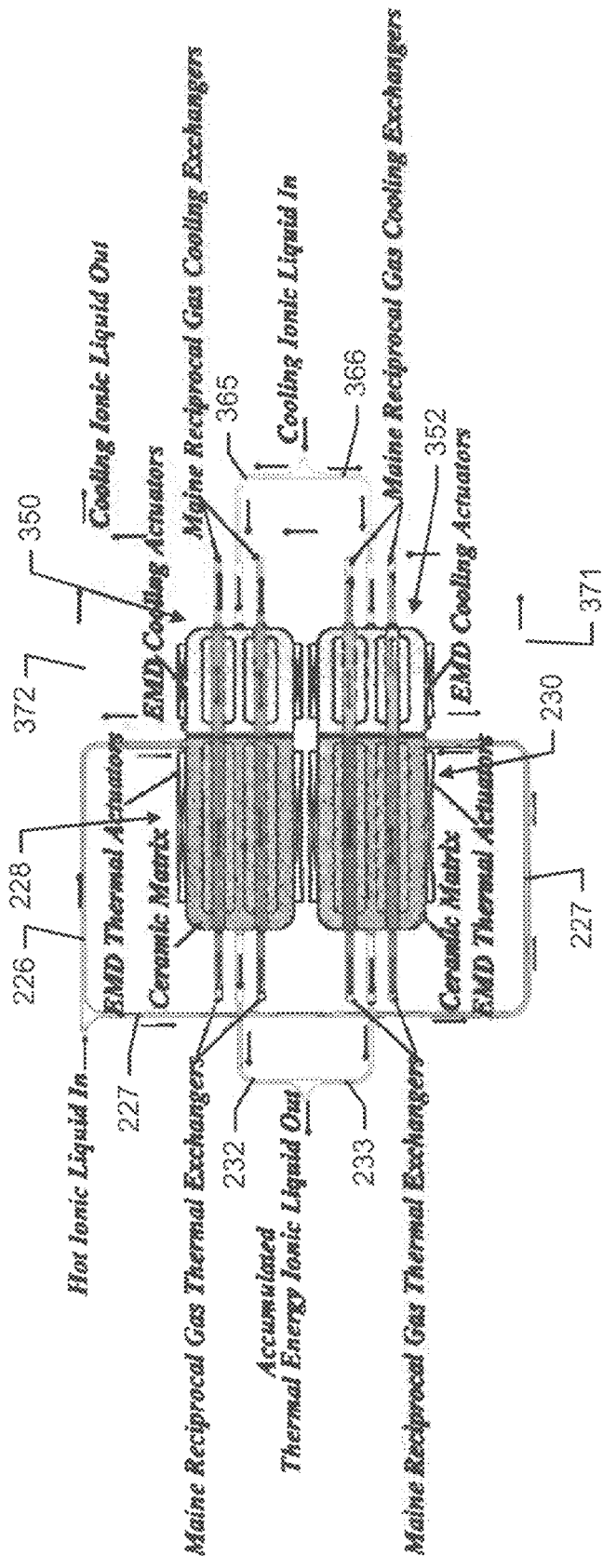

KINEMATICALLY INDEPENDENT, THERMO-HYDRO-DYNAMIC TURBO-COMPOUND GENERATOR

TECHNICAL FIELD

Example embodiments generally relate to power generation technology and, more particularly, relate to a Kinematically Independent, Thermo-Hydro-Dynamic, Turbo-Compound generator.

BACKGROUND

Power generating technologies have been with us for many, many years. During that time, vast numbers of different methods, structures and ideas have been put forth regarding possible ways to generate power (electrical and mechanical). Many of these methods, structures and ideas leverage physical and thermodynamic laws regarding thermo-kinetic variations to generate useful energy. However, it is not uncommon for many of the thermal, kinematic and electrical energy generators that are currently known to implement inefficient mechanisms for power generation.

As an example, a typical power generation unit may employ a thermodynamic cycle to generate reciprocal motion of one or more pistons. The reciprocal motion of the pistons may then be converted, using complicated kinematic mechanisms, into rotary motion for power generation. Thus, typical power generation units may encounter inefficiencies by virtue of the complicated kinematic mechanisms that are required to extract energy from thermodynamic processes.

Typical power generation processes that are currently employed often also suffer from improper characterizations that allude to characteristics, origins or processes that are not accurately described. As an example, the so-called "diesel engine" operates on polytrophic, compression impelled, self-ignition based on a $PV^n$-cons thermodynamic cycle that employs "diesel fuels" that were not known when Rudolf Diesel invented his isothermal, compression induced, self-ignition P-cons thermodynamic cycle. Similarly, the combustion method that is often referred to as "Air Independent Propulsion" (AIP) is actually dependent upon the storage of oxidizers (oxygen) and therefore technically not "airless". As one more example, a so called "Free Piston" typically employs some kind of synchronizing suspension means that causes it to not be "free" at all.

BRIEF SUMMARY OF SOME EXAMPLES

Some example embodiments may provide for a Kinematically Independent, Thermo-Hydro-Dynamic (KITHD), Turbo-Compound generator that actually is "kinematically independent". Some embodiments may therefore provide systems for creating similar conditions to a natural hurricane's conditions such that thermo-kinetic variations that occur in such an environment may be efficiently leveraged into power production. Moreover, such power production may be enabled to be provided without the use of complex and loud mechanical equipment that converts reciprocating motion into rotary motion.

According to one example embodiment, a power generator is provided. The power generator may include a digital programmable governor, a plurality of power modules having working fluid including compound gas and a magneto-responsive liquid column disposed therein, a thermal generator capable of adding heat to the working fluid, one or more cooling exchangers configured to remove heat from the working fluid, a plurality of electro-hydro-dynamic actuators, and a plurality of bidirectional turbines. The a plurality of electro-hydro-dynamic actuators are disposed proximate to the power modules to, responsive to control of the digital programmable governor and in association with a thermal cycle of adding heat to and removing heat from the working fluid, provide influence to drive and control reciprocal flows of the working fluid through the power modules. The bi-directional turbines are disposed to receive the reciprocal flows and perform a kinematically independent conversion of the operating medium reciprocal flows to rotary motion power output.

Some example embodiments may therefore improve efficiency in relation to power generation capabilities. Moreover, some example embodiments may increase the efficiency of oxidizer independent power generation systems so that complicated, noisy and/or expensive mechanical arrangements for conversion of reciprocating motion into rotary motion can be avoided.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1, which includes FIGS. 1A and 1B, illustrates theoretical PV & TS diagrams for a Kinematically Independent, Thermo-Hydro-Dynamic (KITHD) *ICS* thermodynamic cycle according to an example embodiment;

DETAILED DESCRIPTION

Figure 1B:
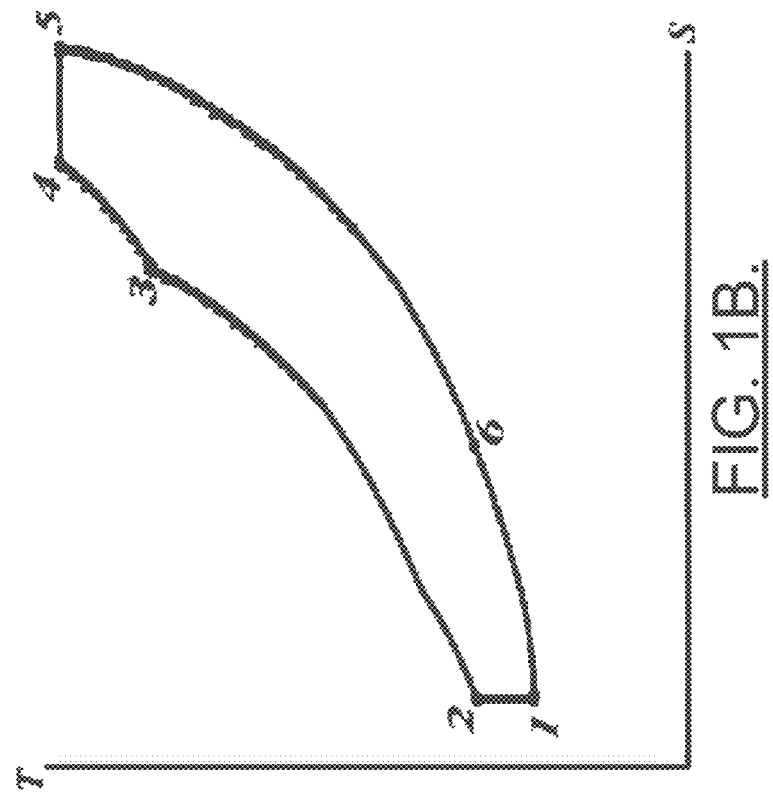

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, "operable coupling" should be understood to relate to direct or indirect connection that, in either case, enables functional interconnection of components that are operably coupled to each other. As used herein, the term "kinematically independent" should be understood to mean without traditional kinematic power converters such as pistons, special seals, piston rods, complicated linkages, crankshafts, connecting rods, bearings, gears, Scotch yokes, Swash-Wobble plates, orbital rotors and/or the like. Meanwhile, the term "turbo compound generator" should be understood to mean a reciprocal, thermo-kinetic energy source that employs turbines for converting energy from liquid thermo-kinetic sources, directly to kinematic, rotary motion without any intermediate kinematic mechanisms.

Figure 1A:
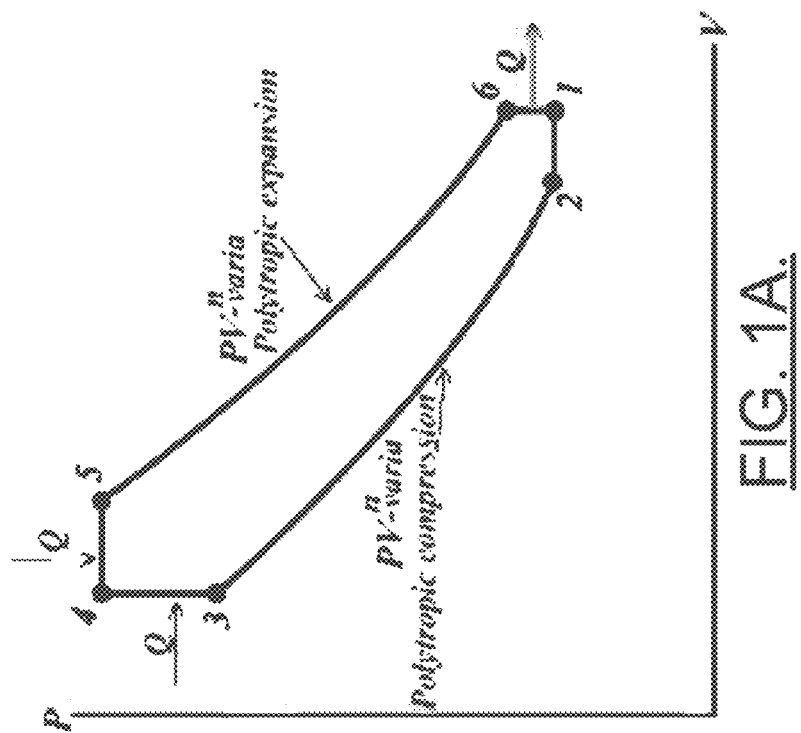

FIG. 1, which includes FIGS. 1A and 1B, illustrates theoretical PV & TS diagrams for a kinematically independent, thermo-hydro-dynamic (KITHD) thermodynamic cycle according to an example embodiment. In this regard, FIG. 1 shows six governed, variable thermodynamic phases. The KITHD thermodynamic cycle is isochoric-isobaric-polytropic. Phase 1-2 corresponds to a variable ratio isobaric compression phase. Phase 2-3 corresponds to a variable polytropic compression phase. Phase 3-4 corresponds to a variable ratio isochoric thermal accumulation phase. Phase 4-5 corresponds to a variable ratio isobaric expansion phase. Phase 5-6 corresponds to a variable polytropic expansion phase. Phase 6-1 corresponds to a variable ratio isochoric thermal rejection phase. The KITHD thermodynamic cycle may be referred to as an $\mathcal{ALS}$ cycle (after the inventor, Anatoly L. Sverdlin). Characteristics of the $\mathcal{ALS}$ cycle may include that it is a complex, polytropic, PV$^n$-varia cycle that is a dynamically regenerative, high pressure (due to pre-charging) and close type thermodynamic cycle.

Typically, free piston reciprocal, external thermal supply cycles that have been developed employ linear AC alternators as electric power outputs. These types of electrical generating means typically do not exceed 50 kilowatts. Such "free pistons" are actually not "free" since they are linear "generators". Oscillating, free pistons engines that drive AC alternators often employ unstable governing methods that are not fully controllable and are not kinematically synchronized. Moreover, such engines often utilize complicated Thermo-Gravitational fluid dampeners, mechanical resonant frequency applicators (which can experience material fatigue), or similar devices. Thus, these methods that utilize linear electrical "generators" often require additional, complicated governing devices in comparison with a rotary DC generator. Linear "generators" are therefore not capable of competing with a rotary generator since the linear generators are involutes of rotary generator, thereby making a comparable linear "generator" necessarily acquire comparable characteristics, that are explainable by the simplified formula:

Diameter×π×L×E.m.chr, where is: Diameter is the rotary generator diameter, L is the rotary generator Link, E.m.chr is the electromagnetic characteristic variables of the rotary generator and has the same oscillating frequency as the rotational frequency of rotary generator. Accordingly, in conclusion, to compete with a rotary DC generator, a free piston linear generator must acquire characteristics that are comparable to the rotary DC generator. However, doing so is practically impossible with an engine employing, for example, a Carnot thermodynamic cycle.

Figure 2:
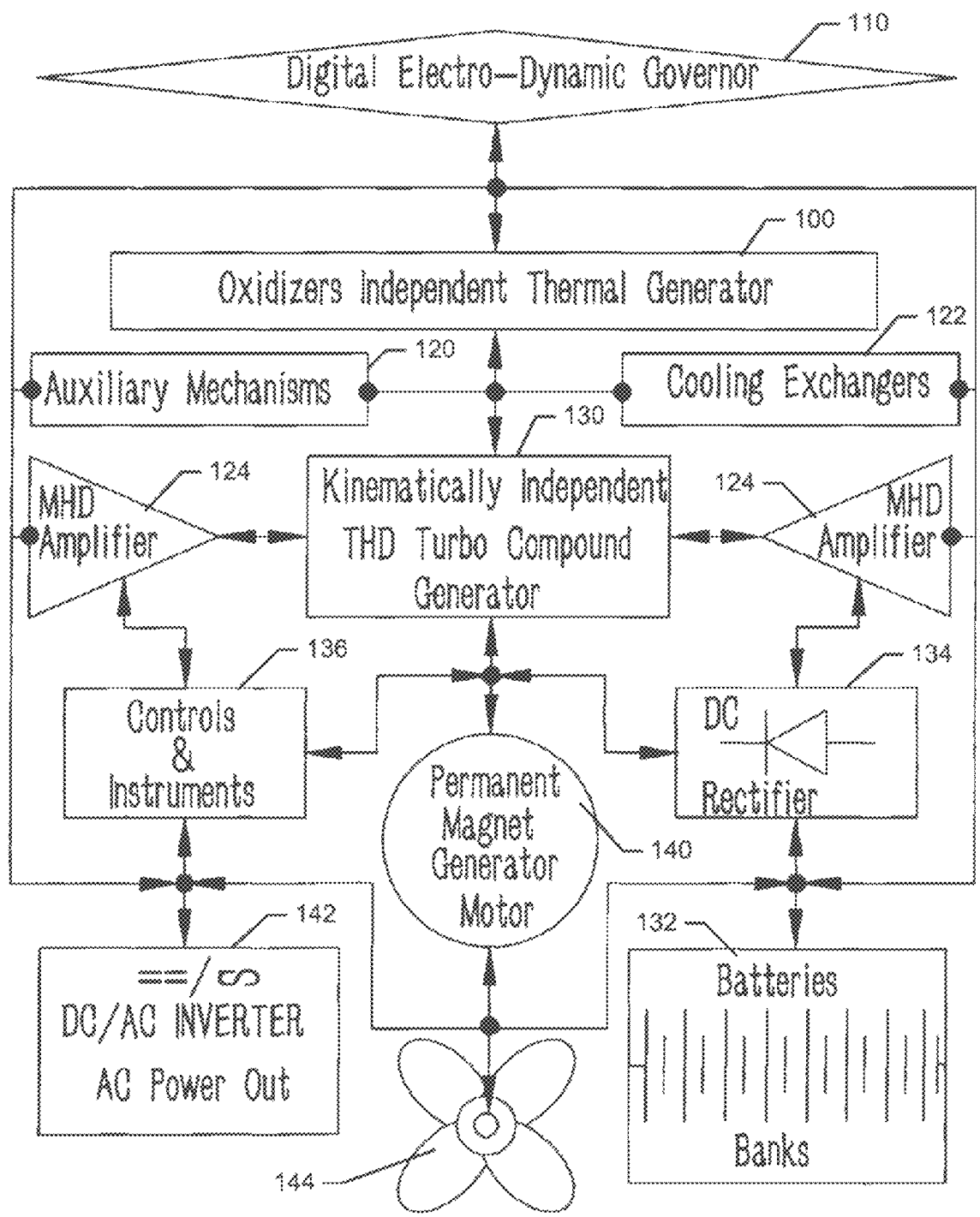
FIG. 2 illustrates a functional block diagram of one KITHD turbo-compound generator that may employ the KITHD cycle with in an oxidizer independent structure according to an example embodiment.
Figure 3:
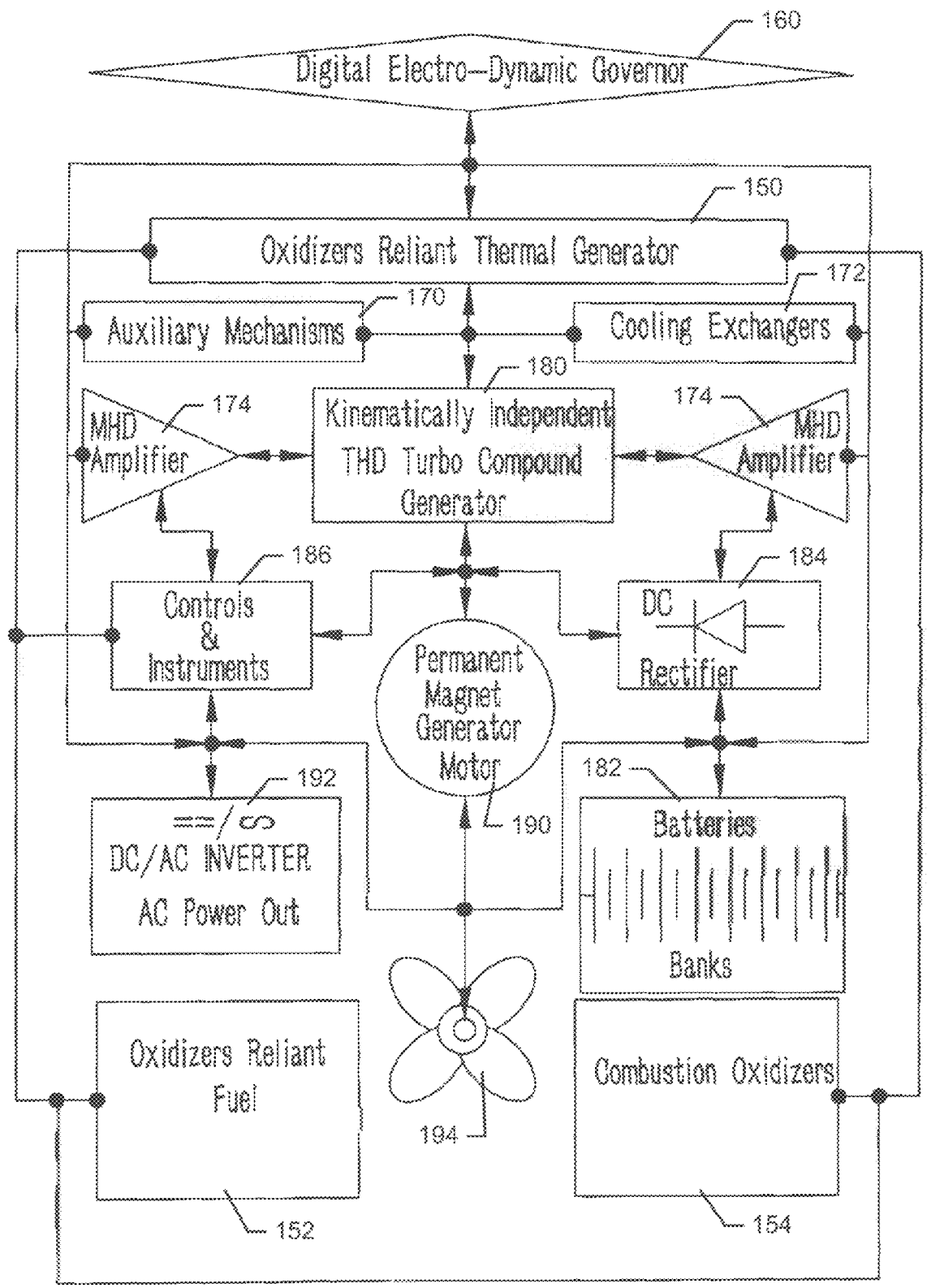
FIG. 3 illustrates a functional block diagram of one KITHD turbo-compound generator that may employ the KITHD cycle with in an oxidizer dependent structure according to an example embodiment.

Although there may be a plurality of different ways to construct a generator capable of employing the KITHD cycle shown in FIG. 1, FIG. 2 illustrates a functional block diagram of one KITHD turbo-compound generator that may employ the KITHD cycle with in an oxidizer independent structure. Meanwhile, FIG. 3 illustrates a functional block diagram of an alternative KITHD turbo-compound generator that may employ the KITHD cycle with an oxidizer dependent structure. As can be appreciated from FIGS. 2 and 3, the primary difference between these two generators is the heat source employed. In this regard, for example, some embodiments may employ air independent thermal generation or air dependent thermal generation. Dependent upon which heat source is employed, certain other components may change to support the employed heat source. However, the basic structure of the remainder of the system is relatively consistent between the two design options.

Referring now to FIG. 2, the heat source of this example embodiment is an oxidizer independent thermal generator 100. Some examples of the oxidizer independent thermal generator 100 may include nuclear thermal generators, thermal storage batteries, radioisotope thermal absorbers, solar thermal absorbers, anaerobic thermal supply means, and/or the like. In some embodiments, a laser induced, quantum nucleonic reactor may form the oxidizer independent thermal generator 100. Quantum nucleonic reactors may be advantageous for some embodiments due to their relatively high energy capacity to weight ratio and the relatively low radiation hazards provided thereby for the generation of thermal energy. The relatively low radiation hazard may be the result of the use of $Hf^{178m2}$ fuel, which emits high temperature gamma rays. $Hf^{178m2}$ fuelled reactor technology may have numerous technology advantages over fission nuclear reactors since $Hf^{178m2}$ produces only gamma radiation and no neutrons, and also does not generate a potentially destructive cascade energy release of a nuclear chain reaction. The absence of neutron radiation means that less bulky shielding may be required and the process may be more tightly controlled. Furthermore, even in the highly unlikely event of an accident, the half life of $Hf^{178m2}$ is about 31 years instead of the half life on the order of thousands of years for uranium and plutonium.

The oxidizer independent thermal generator 100 of an example embodiment may be provided in a radiation protected, hermetically sealed vessel that is charged to a high pressure and is thermo-accumulative to employ compound gasses in connection with heating via $Hf^{178m2}$ fusion reactions. Thermal energy may then be transferred to multiple sets of metalloceramic primary thermal absorbers, as described in greater detail below.

In an example embodiment, the oxidizer independent thermal generator 100 may operate under the control of a digital electro-dynamic governor 110. The digital electro-dynamic governor 110 may be embodied as one or more computers or other processing circuitry. In an example embodiment, the digital electro-dynamic governor 110 may also provide control inputs for auxiliary mechanisms 120, cooling exchangers 122 and one or more magneto-hydro-dynamic amplifiers 124 (or actuators). The oxidizer independent thermal generator 100, auxiliary mechanisms 120, cooling exchangers 122 and one or more magneto-hydro-dynamic (MHD) amplifiers 124 may thereafter provide inputs to a KITHD turbo compound generator 130.

Some example embodiments may employ a magneto-responsive liquid as a thermal working media within the KITHD turbo compound generator 130. Magneto-responsive liquids may have relatively low melting points, high thermal capacities, high density, high thermal conductivity, low propensity to explode or be flammable, high thermal stability, wide temperature ranges as liquids, broad availability relative to variation and composition, and large numbers of possible electro-magnetic and thermo-kinetic variations, as some examples of beneficial characteristics relative to employment in the KITHD turbo compound generator 130.

The MHD amplifiers 124 may be provided as alternating linear induction MHD actuators in the form of electro-hydro-magnetic devices that employ the principle of induction motors to move gases and magneto-responsive liquids by the action of electro-magnetic fields. MHD phenomena generate motion of electromagnetic conducting fluids in the presence of magnetic fields. Effects from such interactions may be observable in magneto-responsive liquids and gases and motion of gases and liquids having such properties may include eddy currents induces in those substances when they are employed in electromagnetic devices. The induced currents and their associated magnetic fields may generate Lorentz forces effects, which may affect alternating gases and magneto-responsive liquid motion. One potential advantage of an MHD actuator is that energy alteration is accomplished in the absence of moving mechanical parts. Accordingly, for example, operational fluid friction influences may be minimized for bi-directional impulse turbines for straight to rotary power conversion. Such turbines may be self-rectifying turbines that rotate in the same direction no matter what direction the fluid flows within the system. Such an impulse turbine may acquire a symmetrical, impulse-type rotor and mirror image fixed or variable guide vanes.

In some embodiments, one or more batteries (e.g., battery bank 132) may be provided as an alternative power source, backup power source, or as a component of the oxidizer independent thermal generator 100. The battery bank 132 may provide primary or backup power to various components of the system of FIG. 2. In some cases, a DC rectifier 134 may be provided to generate DC power for charging the battery bank 132 and/or for providing DC power to various components of the system that may require DC power. Controls and instruments 136 may also be employed to monitor various devices or processes of the system of FIG. 2.

In an example embodiment, the KITHD turbo compound generator 130 may drive a permanent magnet generator motor 140. An output of the permanent magnet generator motor 140 may then be used to provide AC output power (e.g., via a DC/AC inverter 142), DC output power (that may be rectified by the DC rectifier 134 and/or may be used to charge the battery bank 132) or rotary mechanical output 144 (e.g., for propulsion).

As indicated above, some alternative embodiments may employ an oxidizer reliant thermal generator 150 as the heat source. Some examples of the oxidizer reliant thermal generator 150 may include thermal supply sources that require carbon fuels, combustible gases, liquid fuels, synthetic fluids, solid combustible substances, waist thermal sources, and/or the like. As such, the oxidizer reliant thermal generator 150 may utilize oxidizer reliant fuel 152 and/or combustion oxidizers 154 that may be stored in a manner and location that makes the oxidizer reliant fuel 152 and/or combustion oxidizers 154 accessible to the oxidizer reliant thermal generator 150.

In an example embodiment, the oxidizer reliant thermal generator 150 may operate under the control of a digital electro-dynamic governor 160, which may be identical to or similar to the digital electro-dynamic governor 110 described above in connection with the example of FIG. 2. Moreover, it should be appreciated that in some embodiments, a system may be provided that is capable of running alternately with an oxidizer reliant thermal generator or an oxidizer independent thermal generator at different times, and therefore, literally the same digital electro-dynamic governor could work in either the example of FIG. 2 or the example of FIG. 3 depending on the mode of operation of the system. For example, a submarine may operate in an oxidizer independent mode when submerged and in an oxidizer reliant mode when surfaced or snorkeling.

In some embodiments, the digital electro-dynamic governor 160 may also provide control inputs for auxiliary mechanisms 170, cooling exchangers 172 and one or more magneto-hydro-dynamic amplifiers 174. The oxidizer reliant thermal generator 150, auxiliary mechanisms 170, cooling exchangers 172 and one or more magneto-hydro-dynamic (MHD) amplifiers 174 may thereafter provide inputs to a KITHD turbo compound generator 180, which may be similar in form and function to the KITHD turbo compound generator 130 of FIG. 2 (or may be the exact same device in multi-modal operable embodiments). In an example embodiment, the cooling exchangers 172 may include active dynamic cooling and gas-dynamic thermal exchangers with anticorrosion enclosures to minimize dead volumes.

In some embodiments, one or more batteries (e.g., battery bank 182) may be provided as an alternative power source or backup power source. The battery bank 182 may provide primary or backup power to various components of the system of FIG. 3. In some cases, a DC rectifier 184 may be provided to generate DC power for charging the battery bank 182 and/or for providing DC power to various components of the system that may require DC power. Controls and instruments 186 may also be employed to monitor various devices or processes of the system of FIG. 2.

In an example embodiment, the KITHD turbo compound generator 180 may drive a permanent magnet generator motor 190. An output of the permanent magnet generator motor 190 may then be used to provide AC output power (e.g., via a DC/AC inverter 192), DC output power (that may be rectified by the DC rectifier 184 and/or may be used to charge the battery bank 182) or rotary mechanical output 194 (e.g., for propulsion). Each of these components may also be similar in form or function (or be the same device) as the corresponding devices described in connection with the example of FIG. 2.

In example embodiments, KITHD turbo generator operation (e.g., via the KITHD turbo compound generator 130 of FIG. 2 or the KITHD turbo compound generator 180 of FIG. 3) is designed to perform a direct conversion from an alternating electromagnetic magneto-responsive fluid column to rotary motion. Thus, unlike may conventional power generation methods that initially produce reciprocal motion and use kinematically complex equipment to convert the reciprocal motion into rotary motion, example embodiments may more efficiently generate power by avoiding the use of equipment for conversion of reciprocal motion to rotary motion by directly converting alternating electromagnetic magneto-responsive fluid column to rotary motion.

In an example embodiment, KITHD turbo generator operation may generate positive energy by directly transforming thermo-kinetically excited and then alternately cooled, high pressure, pre-charged compound gases and magneto-responsive liquids straight to functional kinematic rotary motion by controlling and amplifying electro-magneto-hydro-dynamic forces. As such, some embodiments may enable power generation without the use of traditional kinematical power converters such as pistons, flow control valves, special seals, piston rods, complicated linkages, crankshafts, connecting rods, gear boxes, Scotch yokes, swash-wobble plates, orbital kinematic mechanisms, and/or the like.

Some example embodiments may implement thermo-kinetic and hydro-kinetic characteristics of a magneto-conductive fluid, which may be influenced by electro-magnetic fields to provide for conversion of thermo-kinetic features of the magneto-responsive liquids directly to kinematic power energy output. Moreover, using magneto-conductive fluids in this manner may enable different possibilities for structures that can deliver efficient power production with KITHD turbo generator operation. In one example, as will be described in greater detail below, a dual, double-acting, incline, V-configured power generating modules. Multiple sets of such modules may be employed in a spaced apart manner. Magneto-responsive liquids may be thermally and electro-magnetically influenced in a pre-charged, high pressure environment to convert thermo-kinetic and electro-hydro-dynamically induced alternating flow directly into rotary motion. For example, a plurality of bi-directional impulse turbines may be employed to activate (e.g., via hydraulic energy) forced, reciprocal flow, to convert magneto-responsive liquid column reciprocal motion directly to kinematically independent, positive power, rotary motion.

A KITHD turbo compound generator may be implemented as a single, double acting power generating module with a single or multiple bi-directional impulse turbine arrangement. Alternatively, a KITHD turbo compound generator may be implemented as a multi-module, double acting power generating module and/or as a incline, V-configured power generating module, again with a single or multiple bi-directional impulse turbine arrangement.

Figure 5:
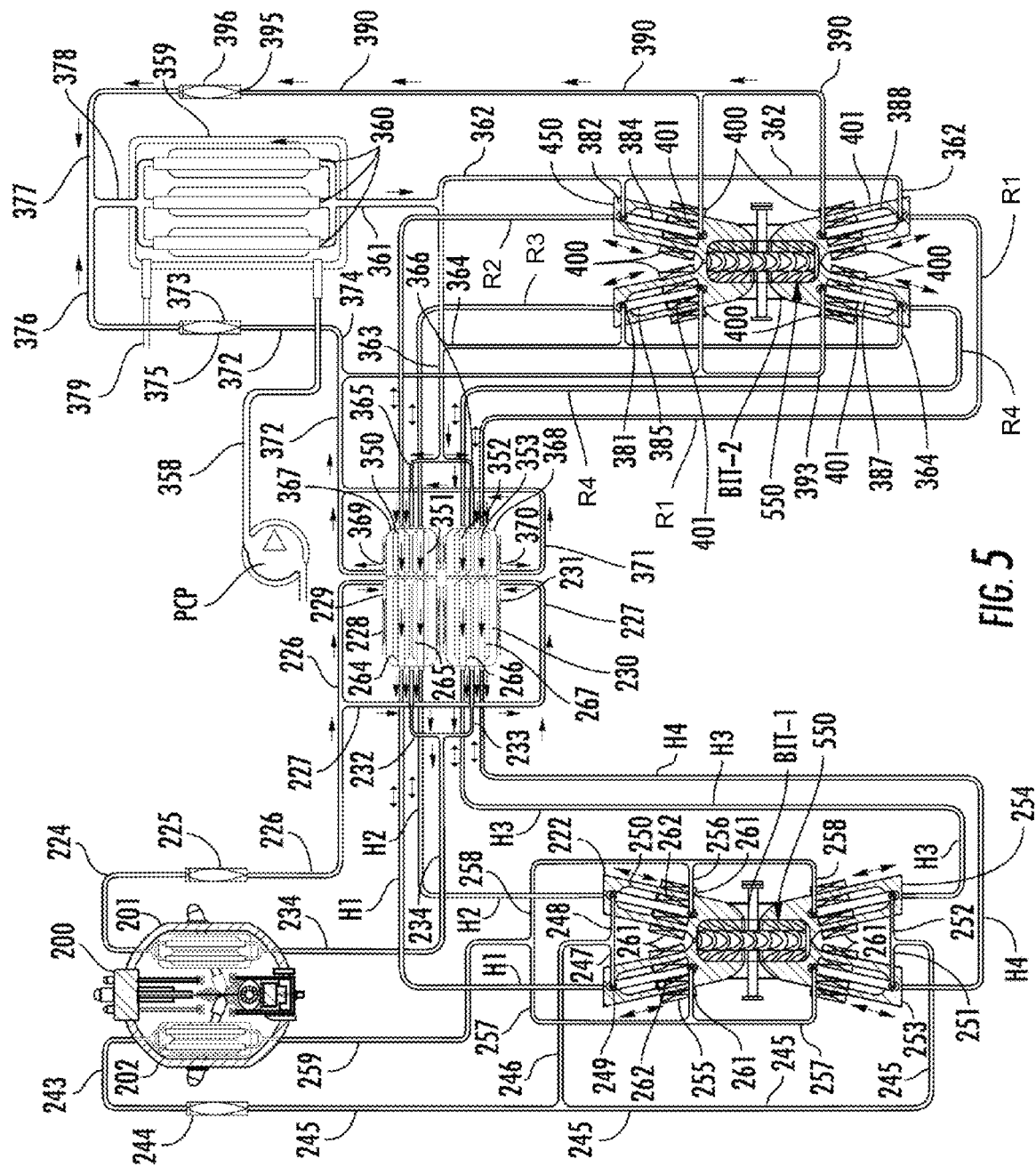
FIG. 5 illustrates a schematic diagram of various components of the KITHD turbo-compound generator of FIG. 4 according to an example embodiment.
Figure 6:
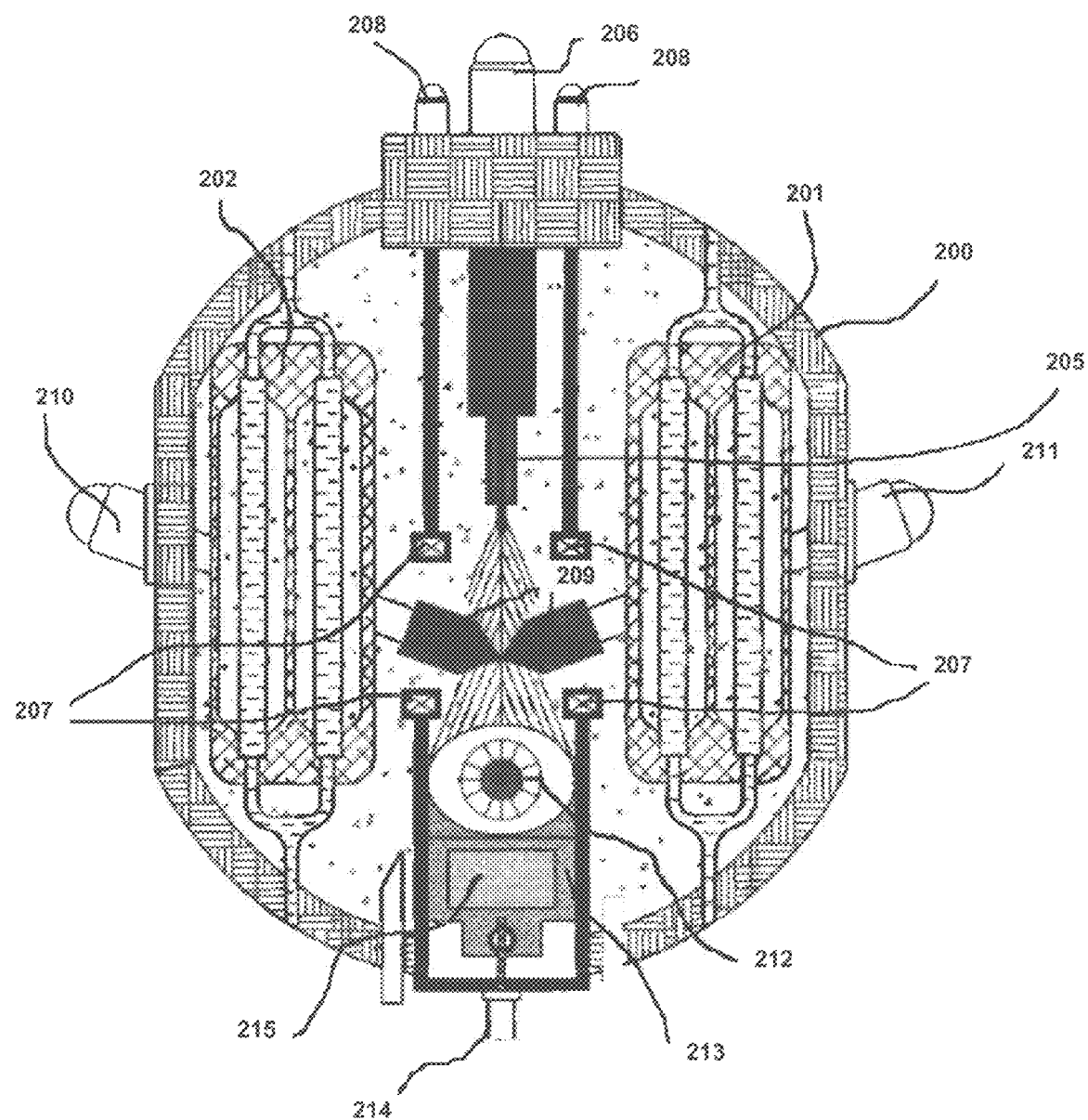
FIG. 6 illustrates a more detailed schematic view of the heat source of an example embodiment.
Figure 7:
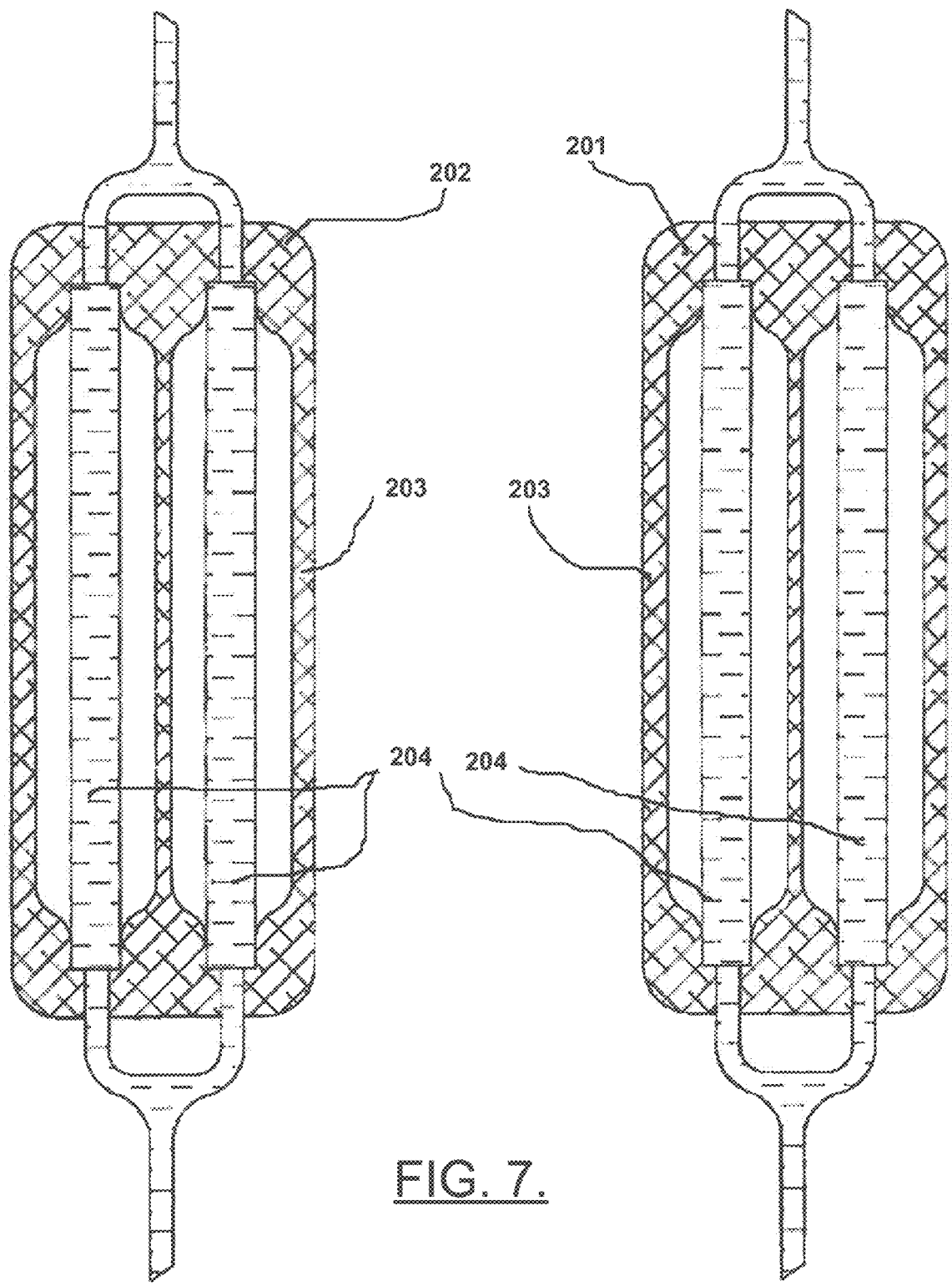
FIG. 7 illustrates a more detailed view of the primary thermal absorbers of an example embodiment.
Figure 8:
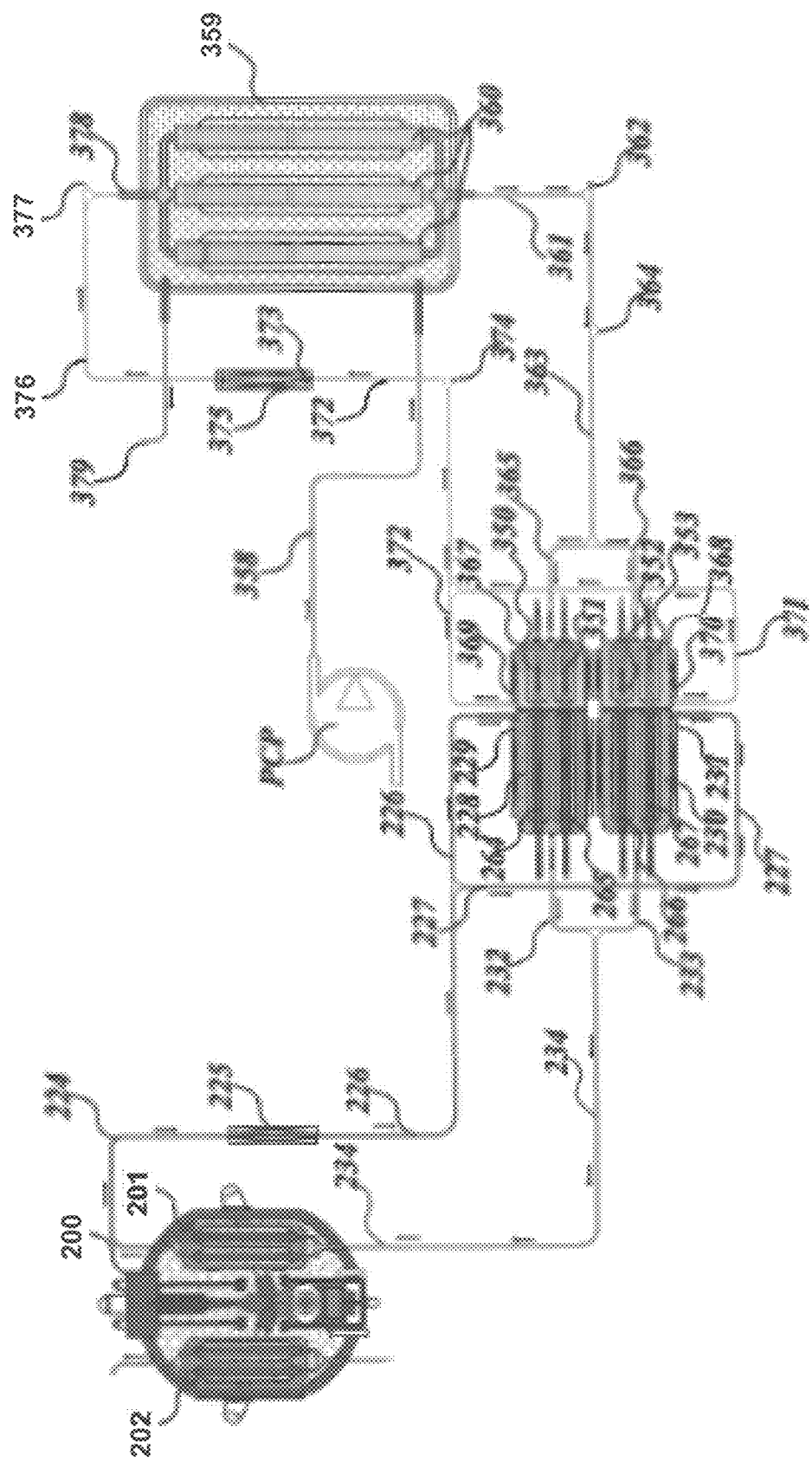
FIG. 8 illustrates a more detailed view of the operable coupling provided between the heat source and dynamic regenerators of FIG. 5 according to an example embodiment.
Figure 10:
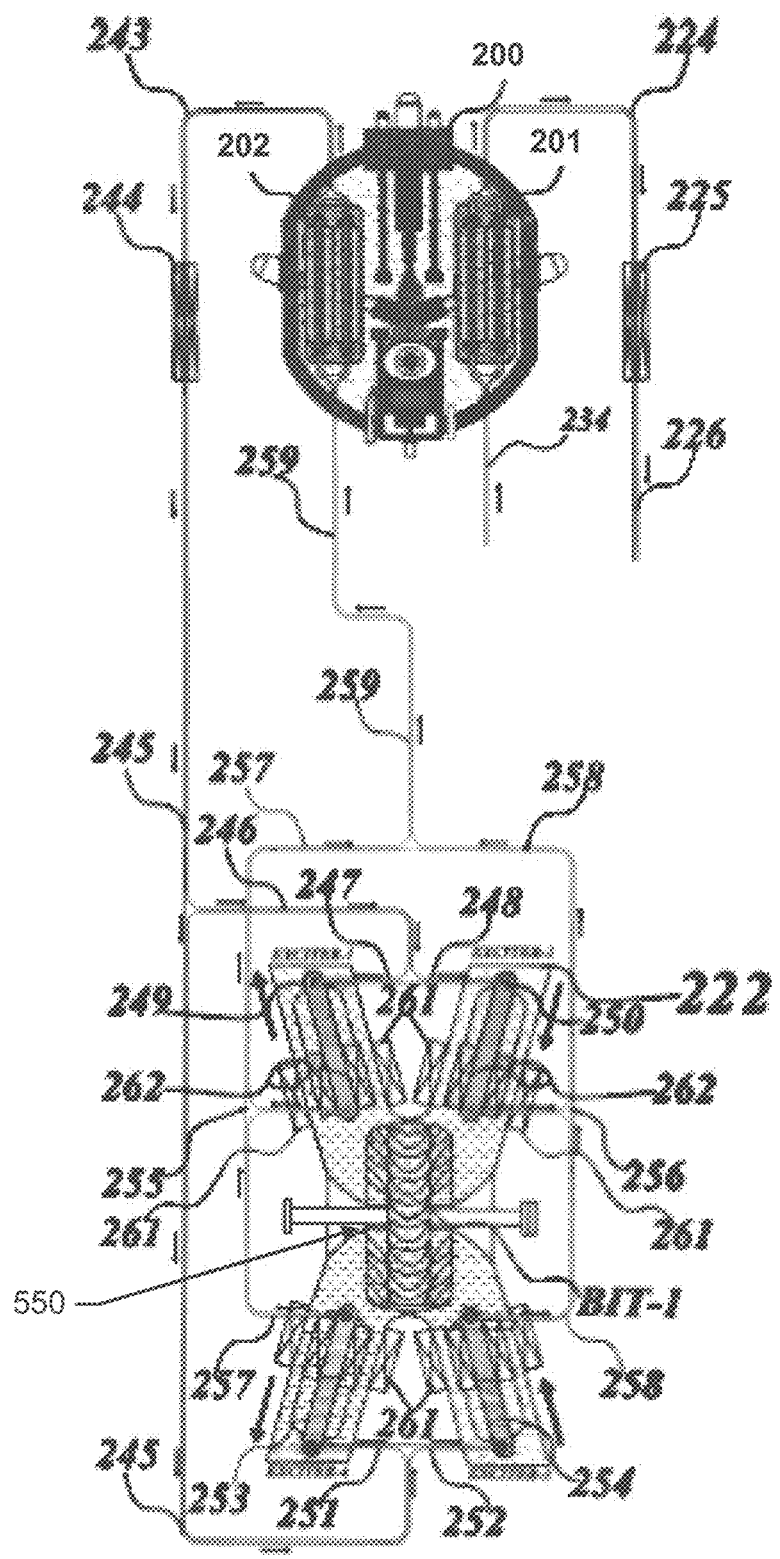
FIG. 10 illustrates portions of FIG. 5 that relate to thermal excitation in greater detail according to an example embodiment.
Figure 11:
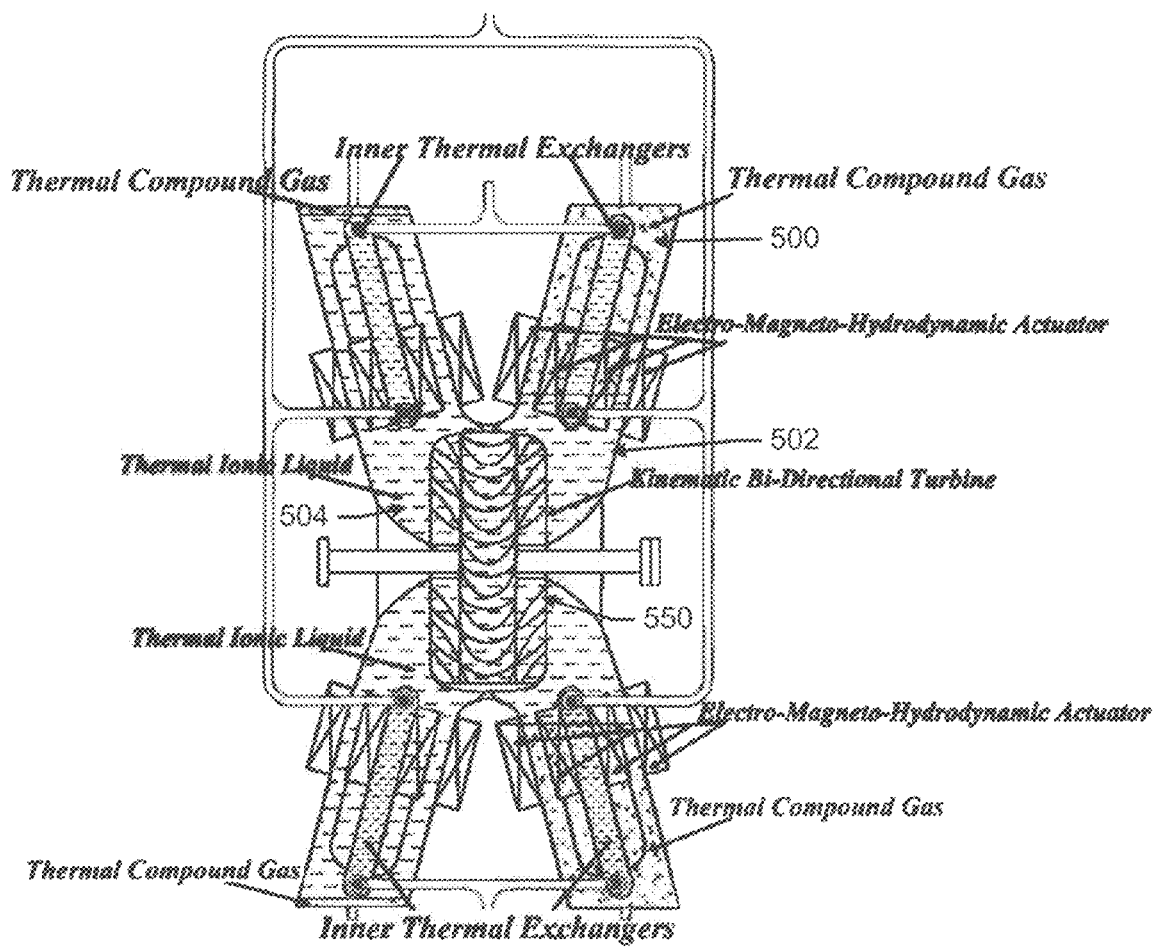
FIG. 11 illustrates a more detailed view of a displacement and power generating module according to an example embodiment.
Figure 12:
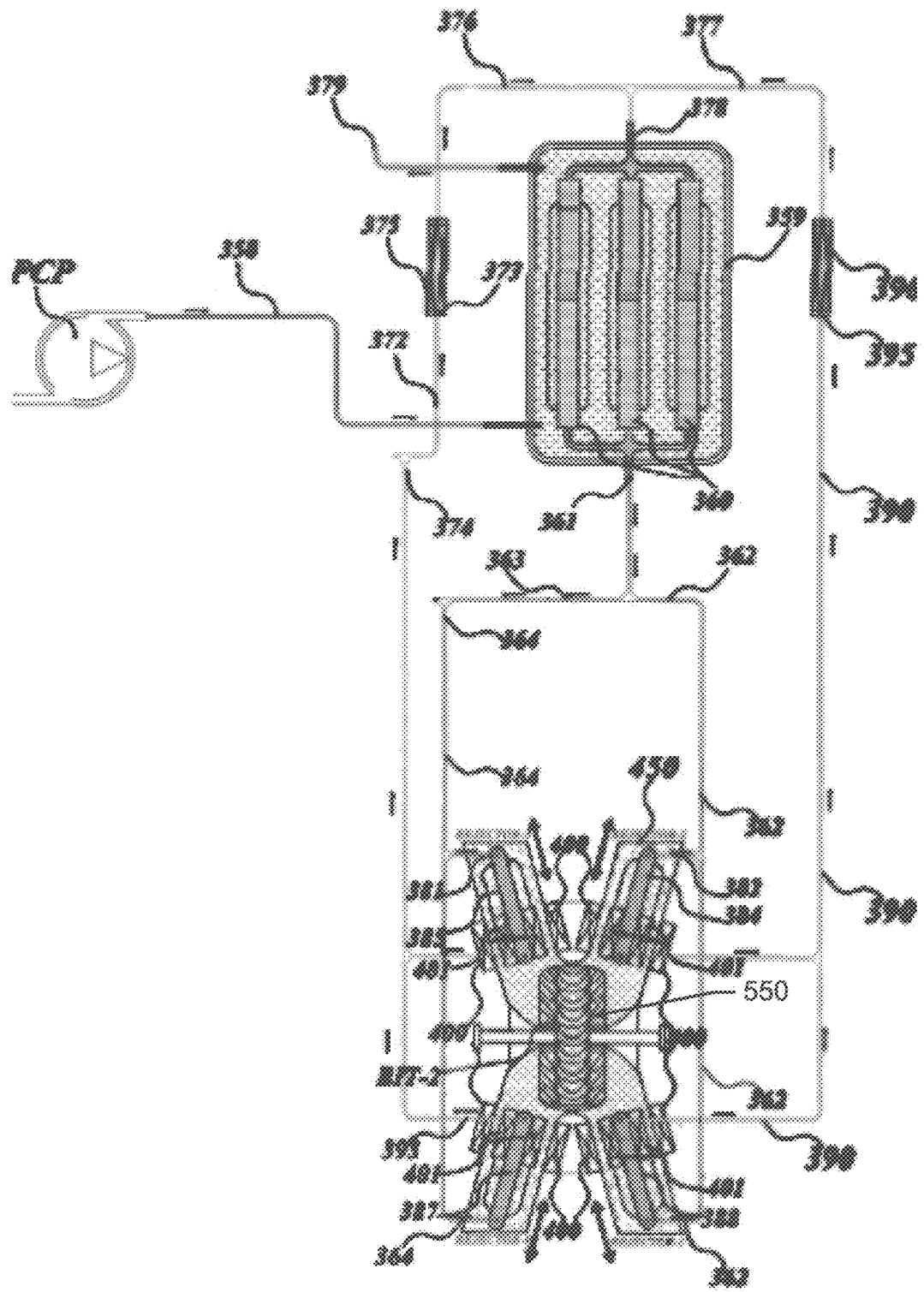
FIG. 12 illustrates portions of FIG. 5 that relate to thermal rejection in greater detail according to an example embodiment.
Figure 13:
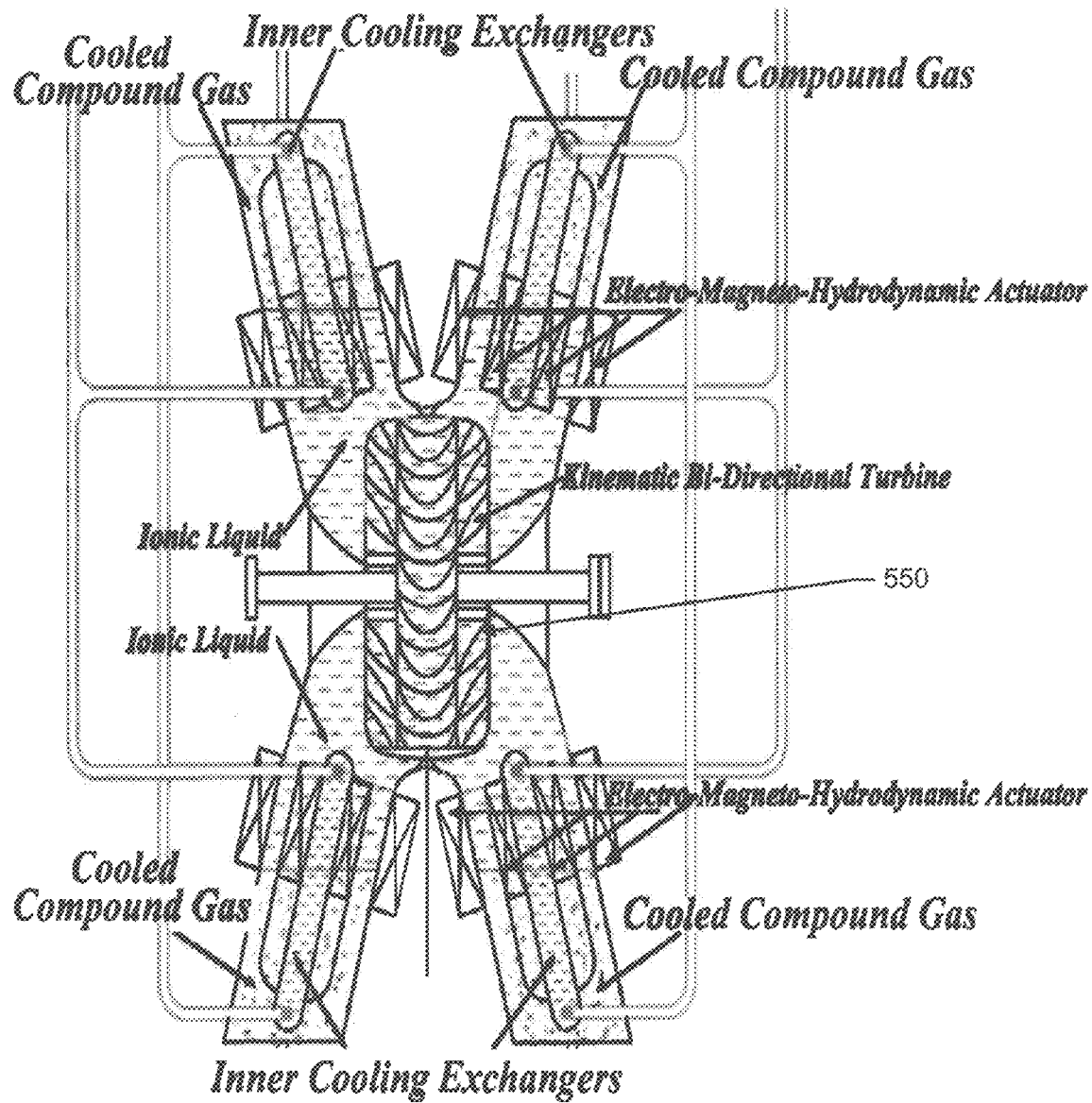
FIG. 13 illustrates a more detailed view of a compression and power generating module according to an example embodiment.
Figure 4:
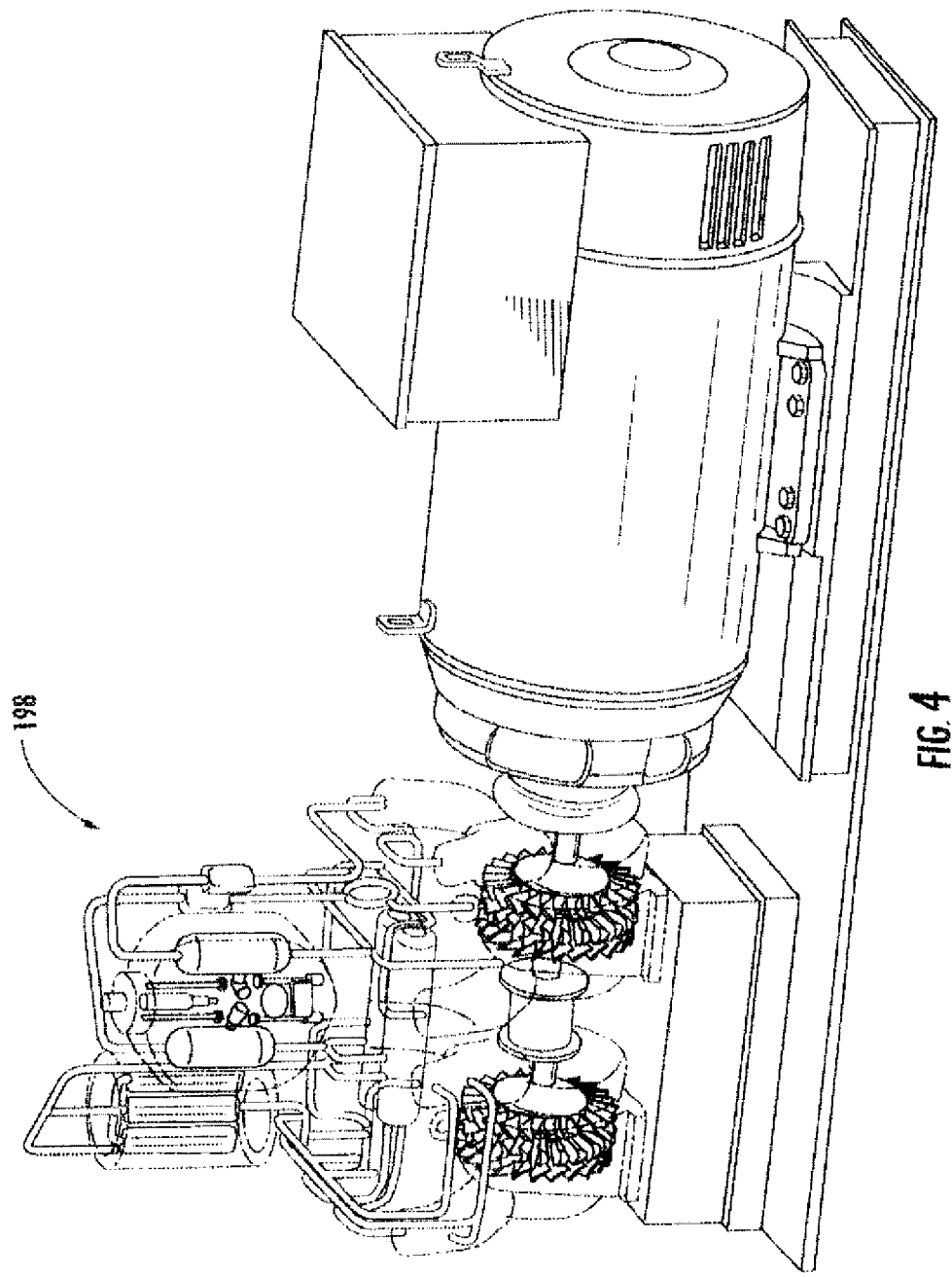
FIG. 4 illustrates a perspective view of a KITHD turbo-compound generator of an example embodiment.
Figure 5:
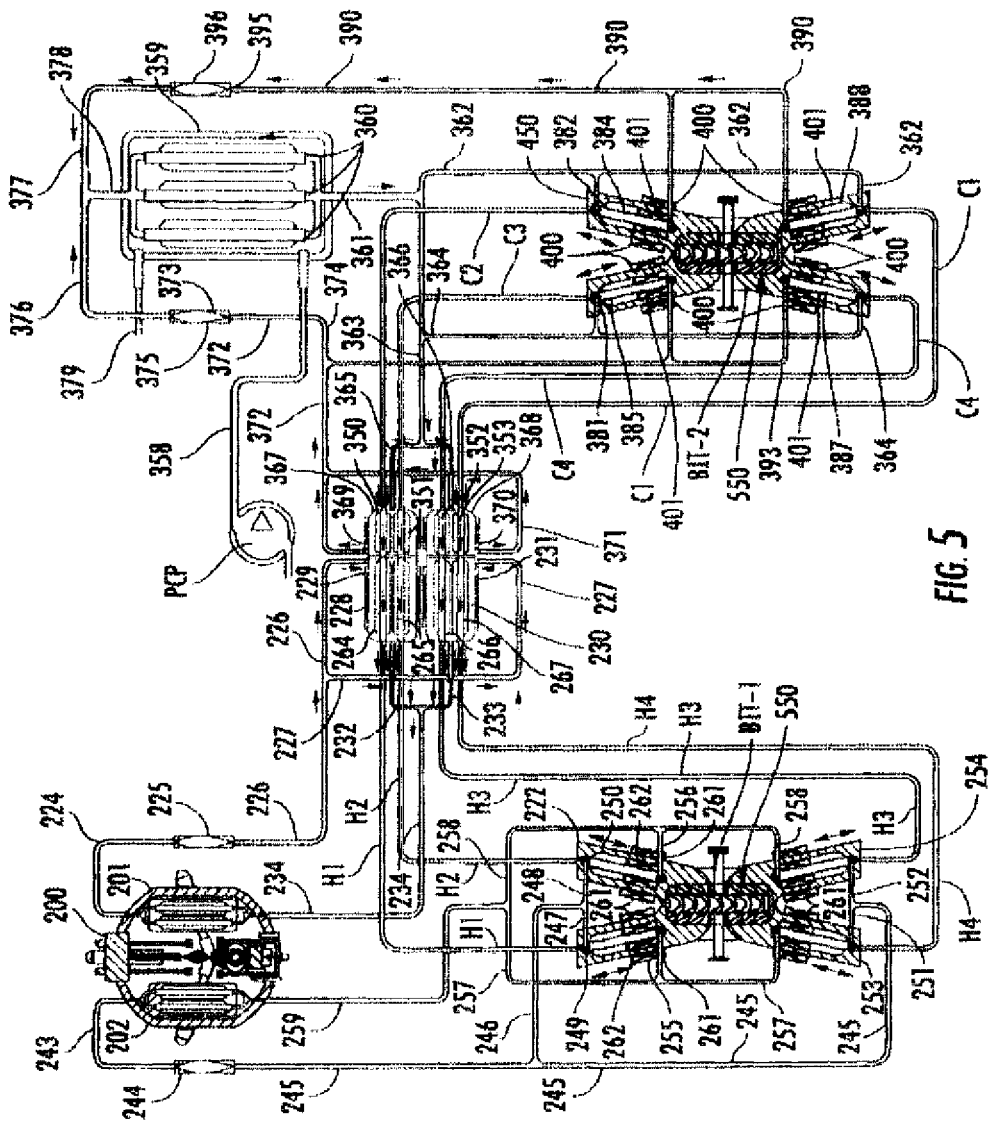
Figure 6:
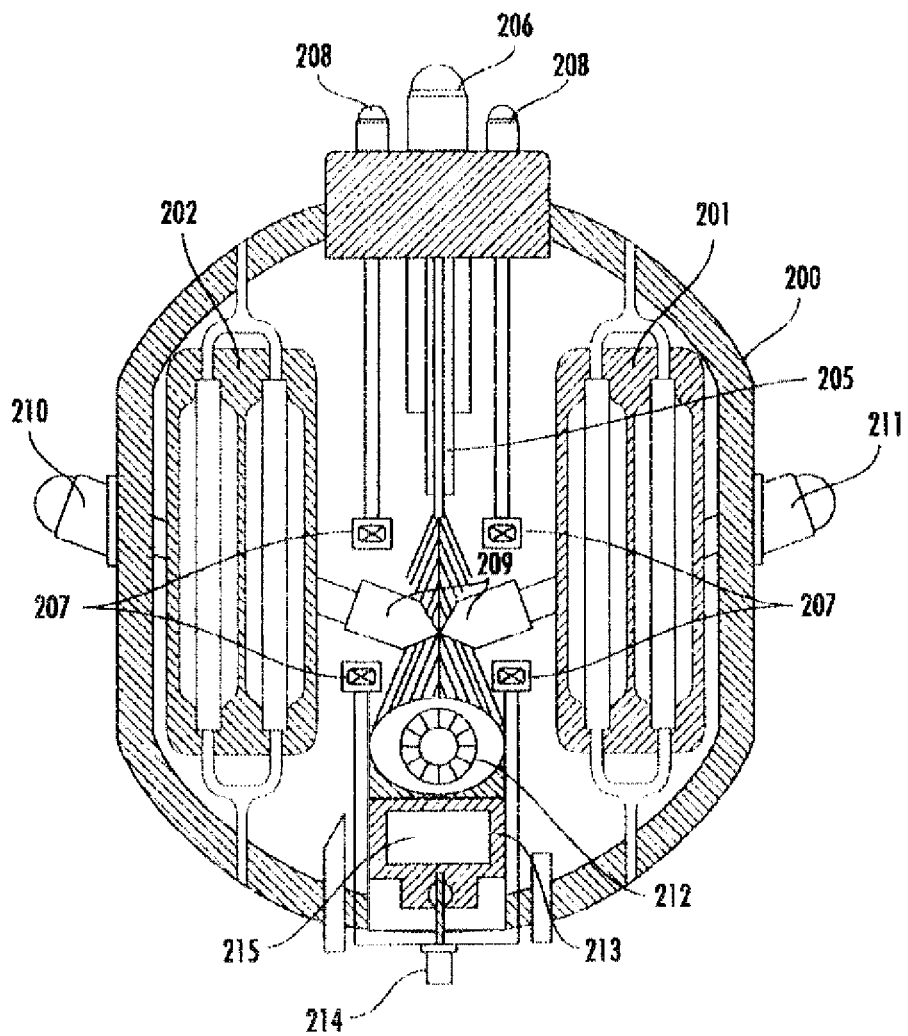
Figure 7:
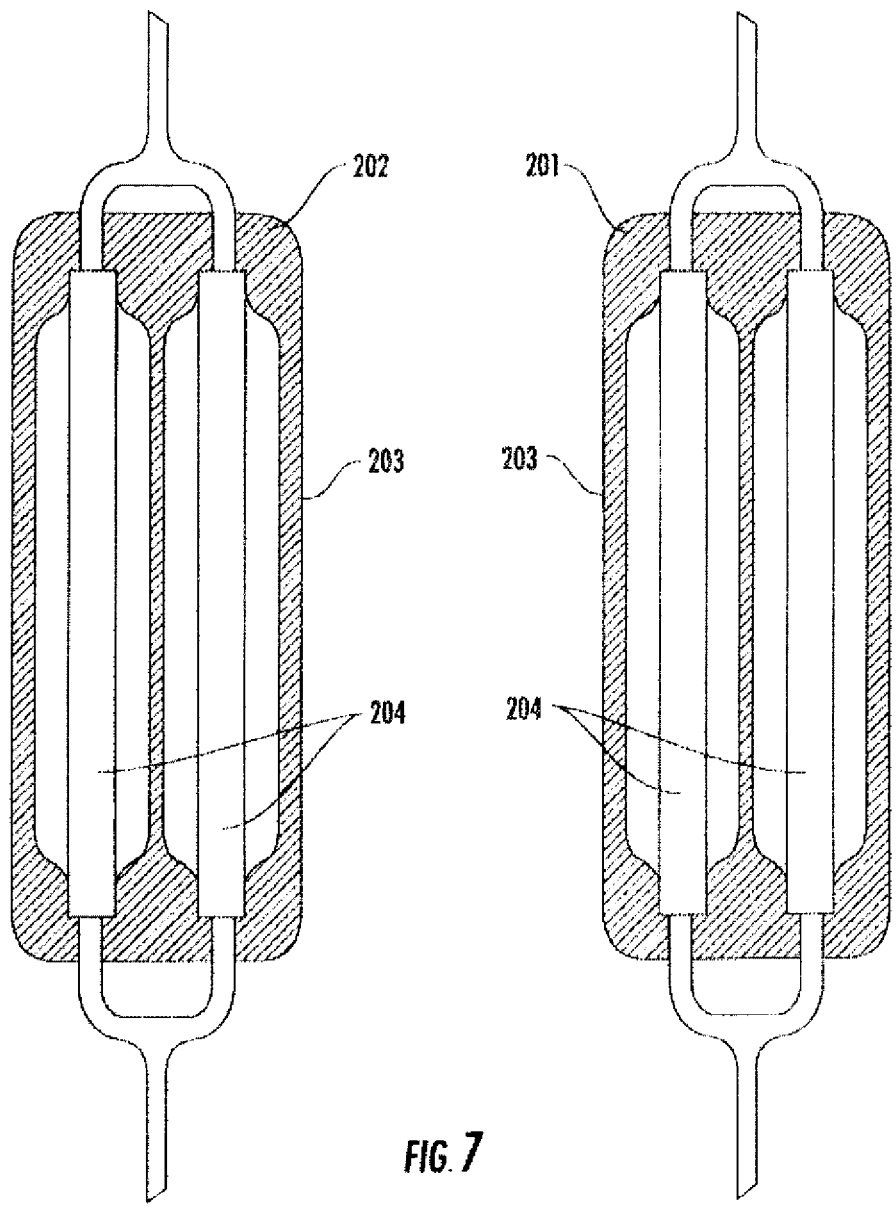
Figure 8:
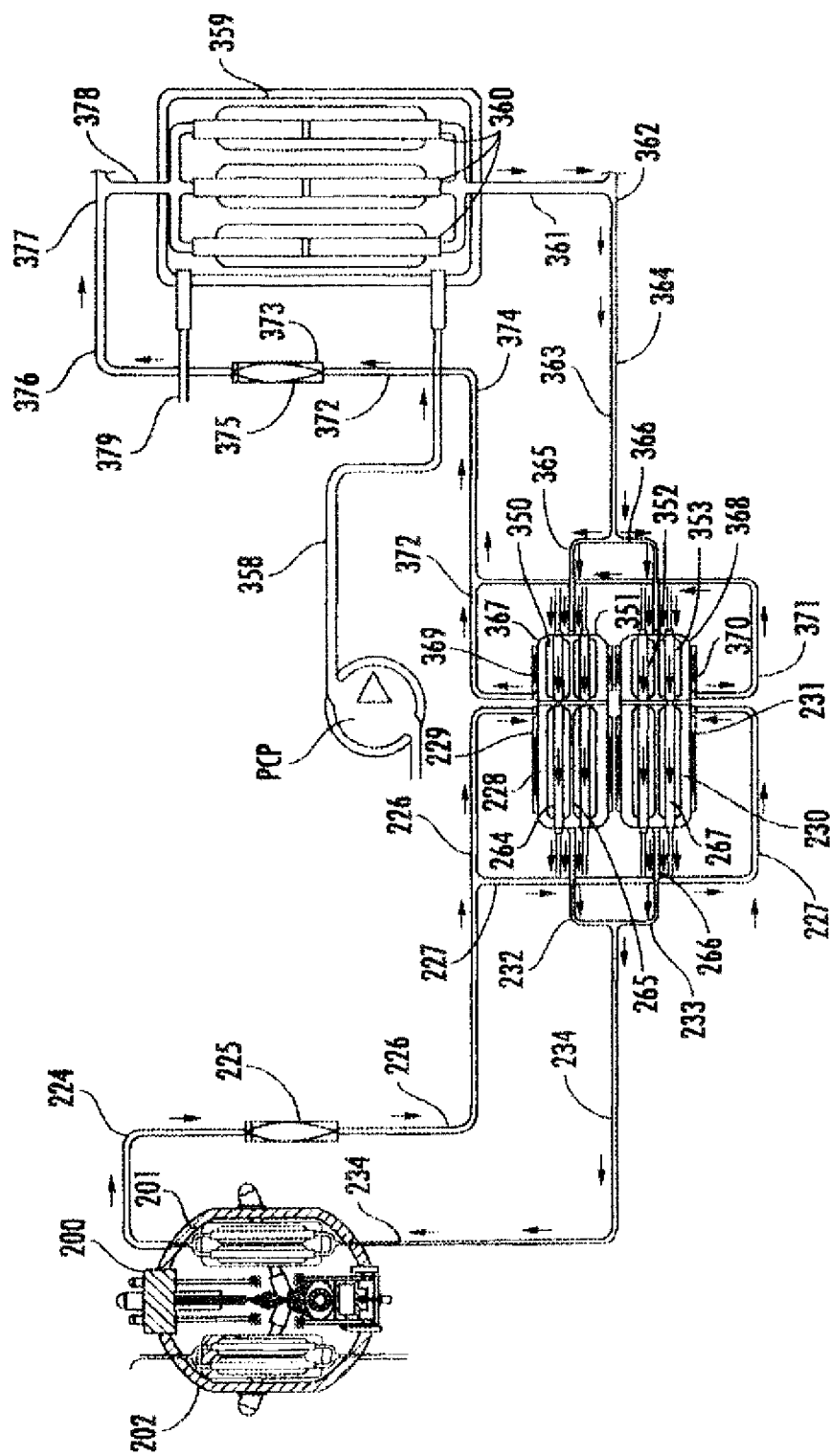
Figure 9:
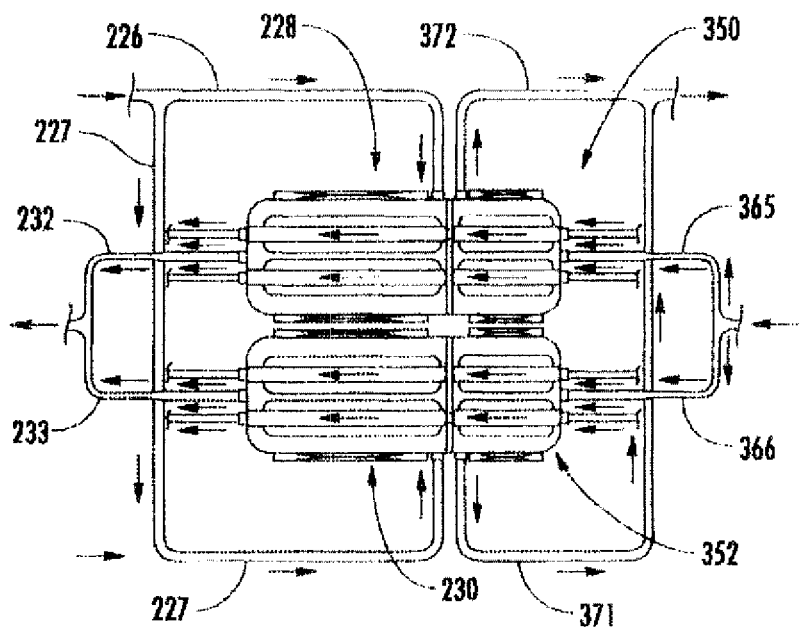
FIG. 9 illustrates a more detailed view of active dynamic regenerators and active main cooling exchangers of FIG. 5 according to an example embodiment.
Figure 10:
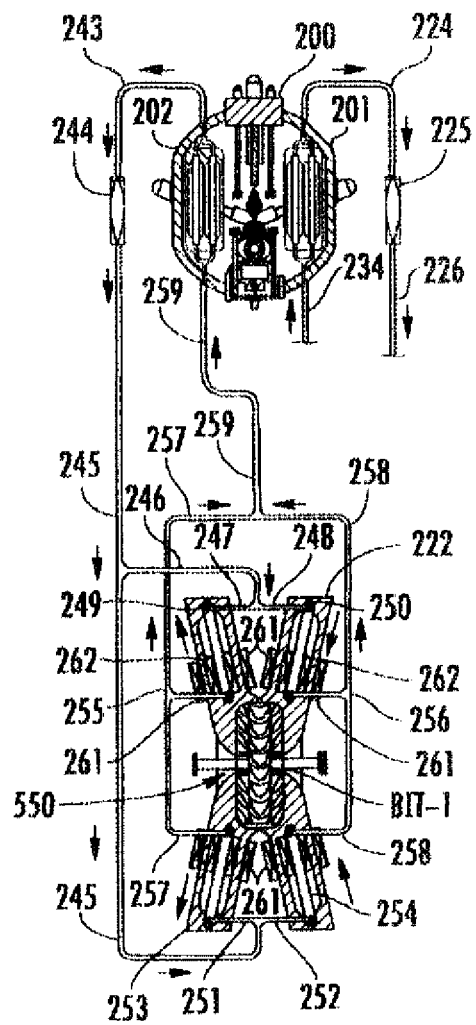
Figure 11:
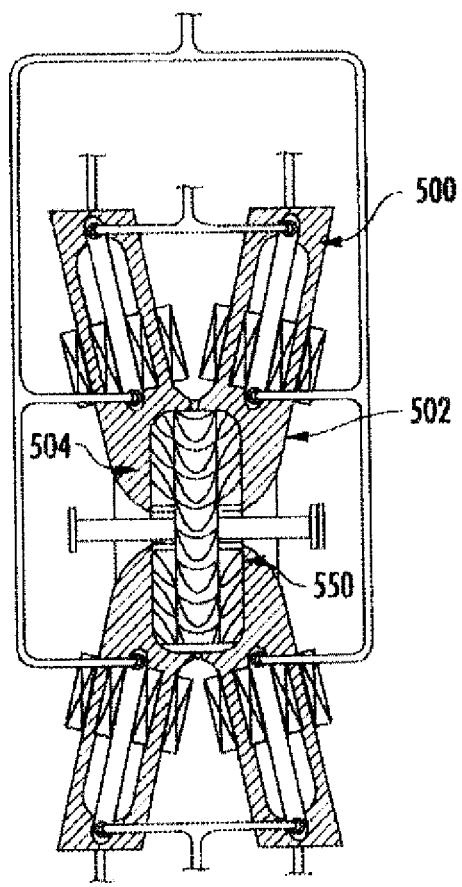
Figure 12:
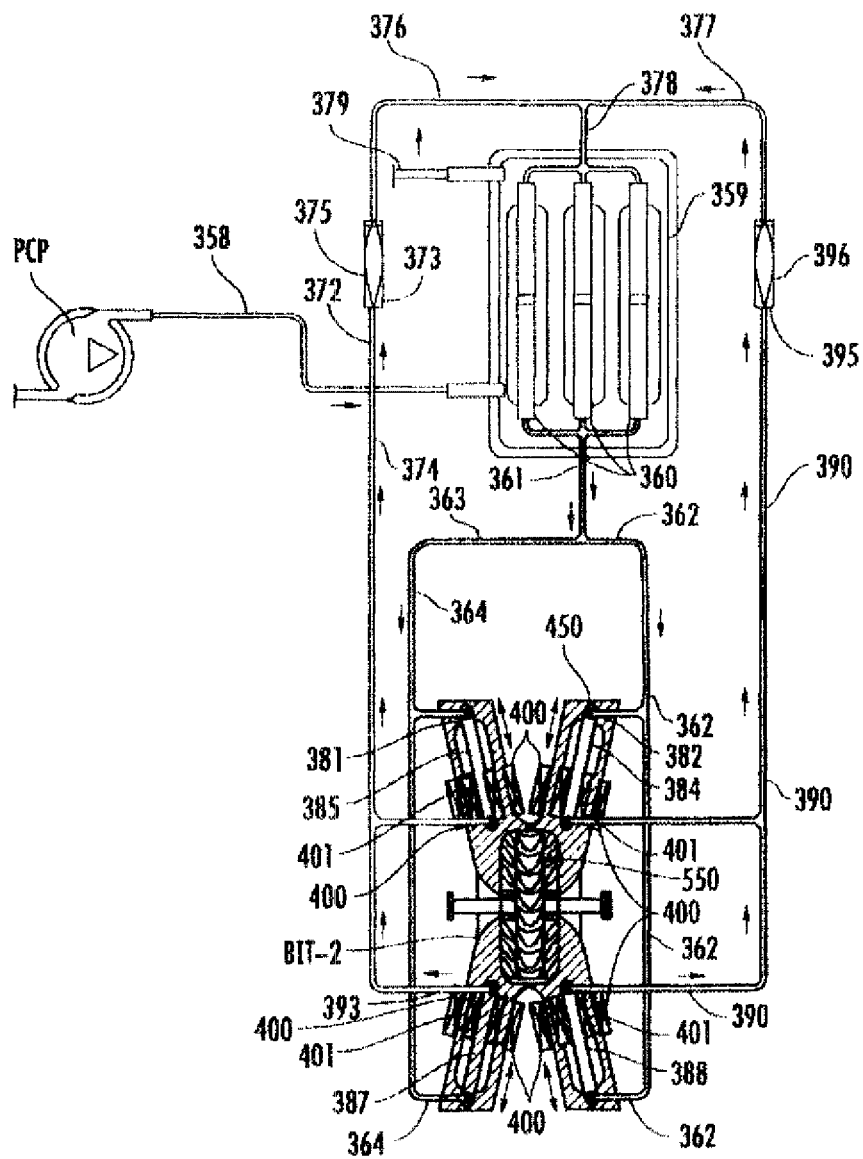
Figure 13:
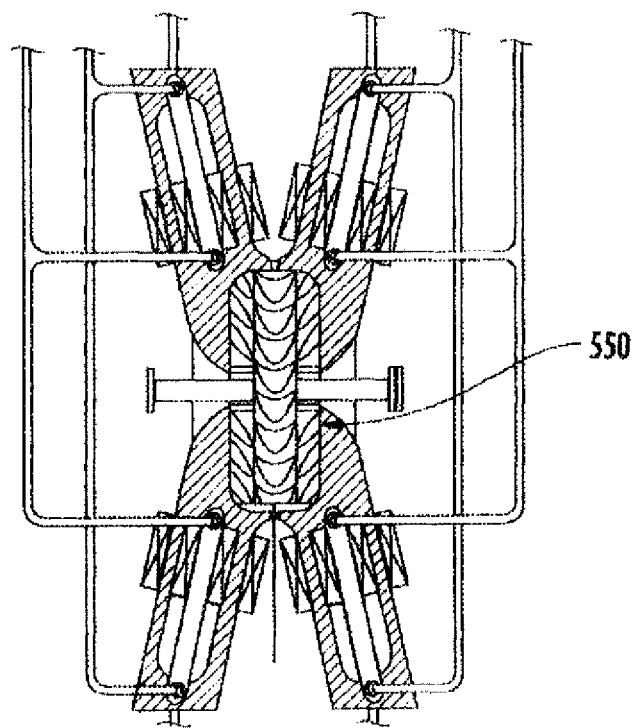
Figure 14:
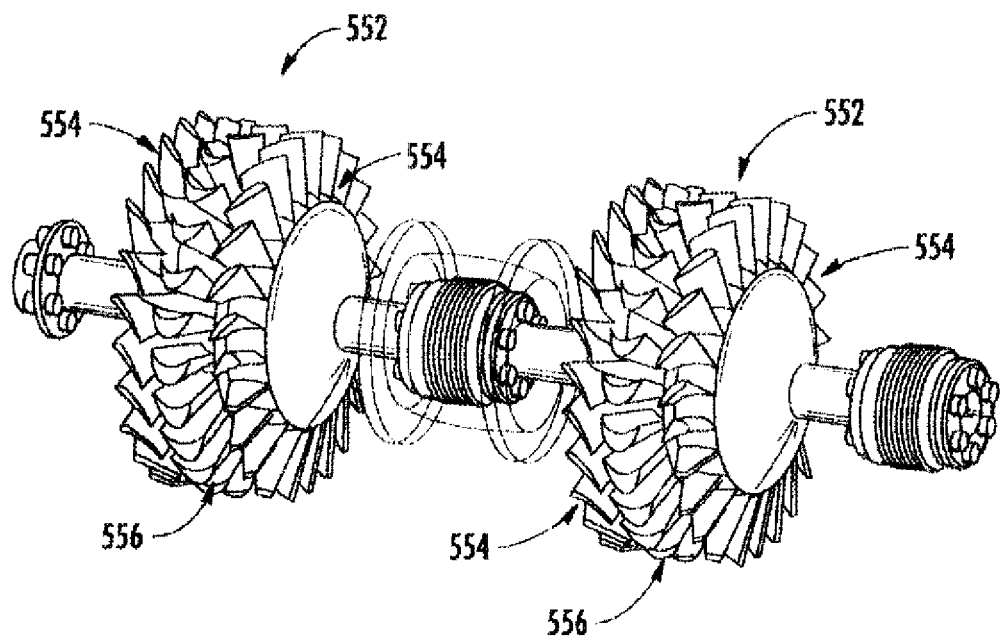
Figure 15:
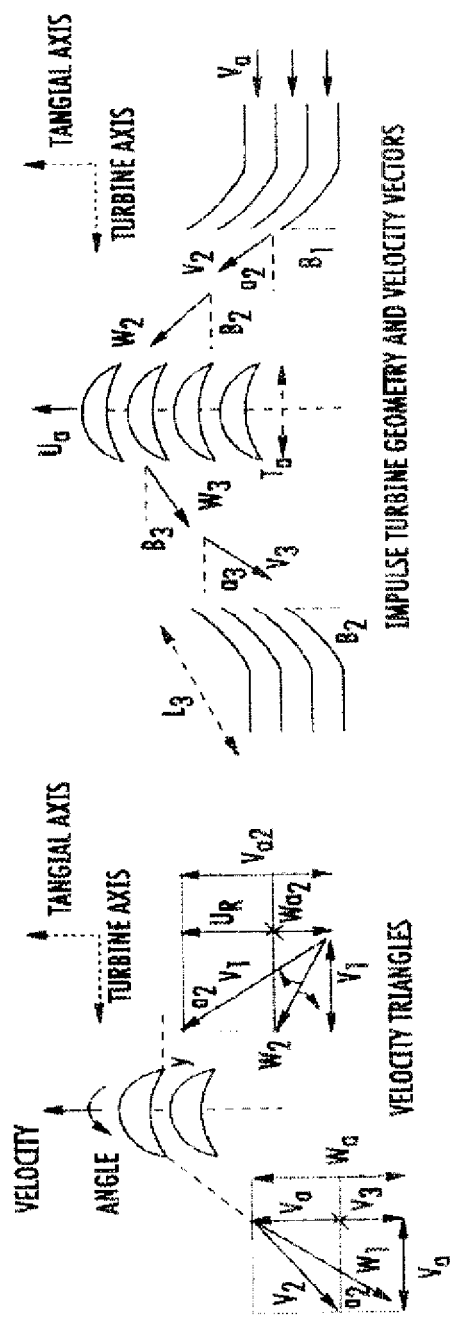
Figure 15:
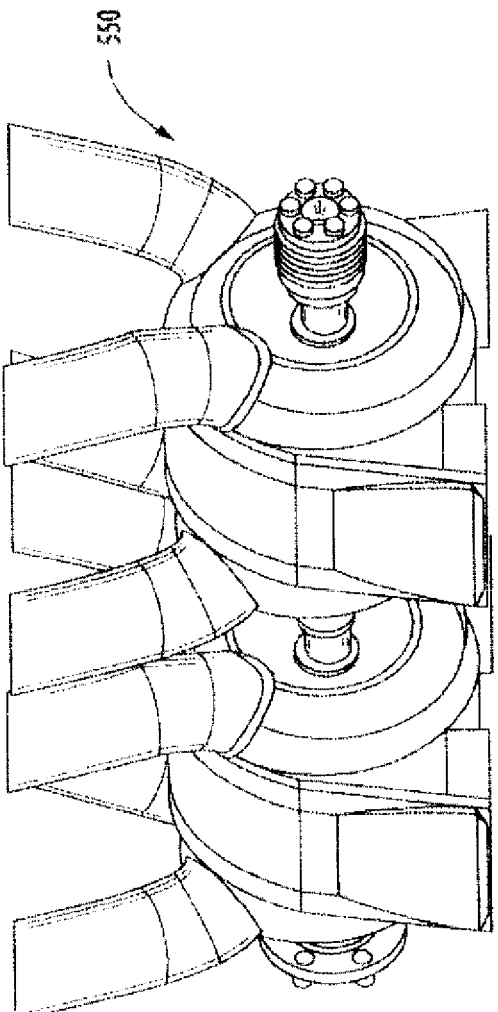
Figure 16:
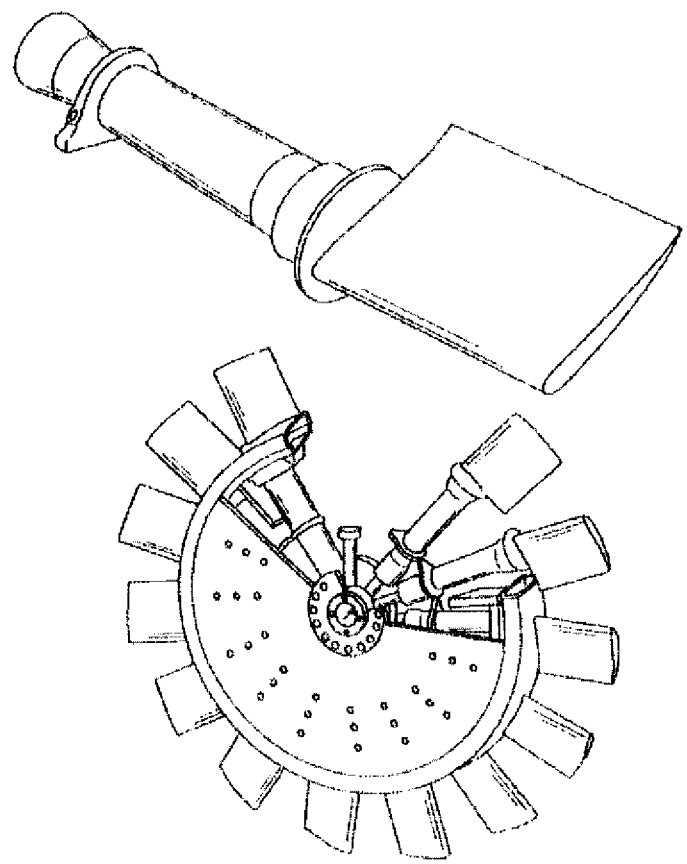
Figure 17:
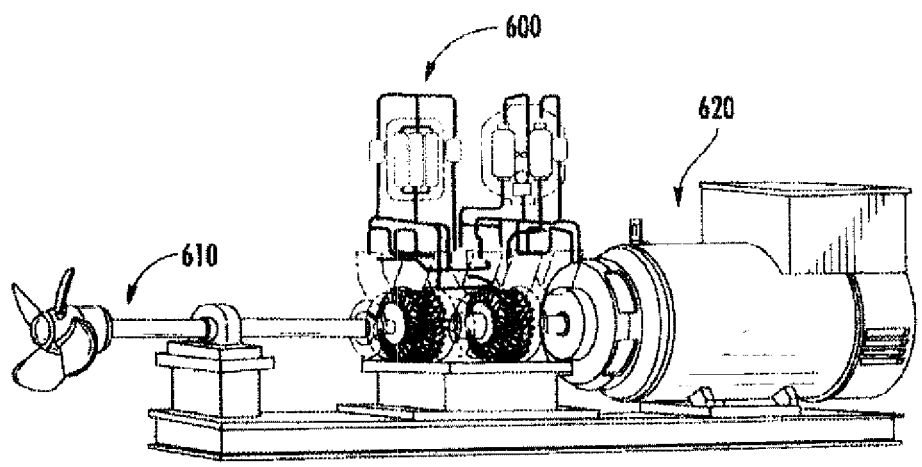

FIG. 4 illustrates a perspective view of a KITHD turbo-compound generator 198 of an example embodiment. Meanwhile, FIG. 5 illustrates a schematic diagram of various components of the KITHD turbo-compound generator of FIG. 4 according to an example embodiment. FIGS. 6-13 illustrate detailed views of various portions and/or components of the embodiment of FIG. 5. FIG. 6 illustrates a more detailed schematic view of the heat source of an example embodiment. FIG. 7 illustrates a more detailed view of the primary thermal absorbers of an example embodiment. FIG. 8 illustrates a more detailed view of the operable coupling provided between the heat source and dynamic regenerators of FIG. 5 according to an example embodiment. FIG. 9 illustrates a more detailed view of active dynamic regenerators and active main cooling exchangers of FIG. 5 according to an example embodiment. FIG. 10 illustrates portions of FIG. 5 that relate to thermal excitation in greater detail according to an example embodiment. FIG. 11 illustrates a more detailed view of a displacement and power generating module according to an example embodiment. FIG. 12 illustrates portions of FIG. 5 that relate to thermal rejection in greater detail according to an example embodiment. FIG. 13 illustrates a more detailed view of a compression and power generating module according to an example embodiment.

As shown in FIG. 5-13, a heat source may be provided in the form of an oxidizer independent quantum nucleonic thermal energy generator 200. The oxidizer independent quantum nucleonic thermal energy generator 200 may be provided in a hermetically sealed high pressure vessel that is radiation insulated. The oxidizer independent quantum nucleonic thermal energy generator 200 may be pre-charged with thermo-accumulative, compound gases. In this example, the oxidizer independent quantum nucleonic thermal energy generator 200 may house a first set of primary thermal absorbers 201 and a second set of primary thermal absorbers 202. The first and second sets of primary thermal absorbers 201 and 202 may be metalloceramic thermal absorbers in one example embodiment. In this regard, for example, referring to FIG. 7, the first and second sets of primary thermal absorbers 201 and 202 may each include a ceramic matrix 203 and ionic liquid thermal absorbers 204 interposed between members of the ceramic matrix 203.

In an example embodiment, the oxidizer independent quantum nucleonic thermal energy generator 200 may include a gamma ray laser 205, which may be controlled at least in part via a laser focusing drive 206, focusing electromagnets 207, and focusing electromagnet drives 208. In some embodiments, the digital electro-dynamic governor 110 or 160 may further provide control inputs to one or more of the gamma ray laser 205, laser focusing drive 206, focusing electromagnets 207, and/or focusing electromagnet drives 208. The oxidizer independent quantum nucleonic thermal energy generator 200 may further include fusion reaction control rods 209 and fusion reaction control rod drives 210 and 211. The control rods 209 may be insertable into the oxidizer independent quantum nucleonic thermal energy generator 200 to control fusion reactions taking place relative to activating fuel material $Hf^{178m2}$ 212, which may be provided on an activating fueling material carrier 213 that is operated via an activating fueling material carrier drive 214. The oxidizer independent quantum nucleonic thermal energy generator 200 may further include a fueling material, thermal fluid cooling exchanger 215.

In an example embodiment, a fusion reaction may be initiated via outward movement of the control rods 209 to increase the clearance between electromagnetic heads. Control of the fusion reaction may be dependent at least in part upon the distance between the control rods 209 and the focusing electromagnets 207. The gamma ray laser 205 may activate the fueling material $Hf^{178m2}$ 212, which may initiate thermal energy generation.

Intensity of the thermal energy generation may vary based on the emitting power of the gamma ray laser 205, the distance to the fueling material $Hf^{178m2}$ 212, the position of the control rods 209 and the focusing electromagnets 207. Thermal energy that is generated by the fusion reaction may then be transmitted to the first and second sets of primary thermal absorbers 201 and 202. Nanoparticles of the thermo-magneto conductive, magneto-responsive liquids contained within the first and second sets of primary thermal absorbers 201 and 202 may then be heated up accordingly.

Heated magneto-responsive liquid may be thermally excited to induce a flow of the liquid through supply contour 224 to the intake of a linear induction pump 225. Magneto-dynamically amplified magneto-responsive liquid may then flow from the linear induction pump 225 through supply contour 226 and divided supply contour 227 to liquid sides of a ceramic matrix of active dynamic regenerators 228 and 230. From supply contour 227, thermally excited magneto-responsive liquid entering the liquid side of the ceramic matrix of the active dynamic regenerator 228. This may heat up the ceramic matrix accumulating material such that the accumulating material stores thermal energy transmitted thereto.

Thermally and electro-magneto-dynamically activated magneto-responsive liquids that are moved into the liquid side of the active dynamic regenerator 228 may be further amplified by EMD actuator 229. The EMD actuator 229 may include an electromagnetic coil that may be disposed around a core of the active dynamic regenerator 228. The thermal energy provided via the reciprocal flow direction of the magneto-responsive liquids may provide an improved regenerating process relative to other passive regenerating methods. The magneto-responsive liquids may exit the active dynamic regenerator 228 via return contour 232 and connect to main return contour 234 to return to the first set of primary thermal absorbers 201.

Referring again to FIGS. 8 and 9, thermally excited magneto-responsive liquids may also enter the liquid side of the active dynamic regenerator 230 from contour 227 to heat up the ceramic matrix accumulating material of the active dynamic regenerator 230. Thermally and electro-magneto-dynamically activated magneto-responsive liquids that are moved into the liquid side of the active dynamic regenerator 230 may be further amplified by EMD actuator 231 and its corresponding electromagnetic coil that is disposed around a core of the active dynamic regenerator 230. The thermal energy provided via the reciprocal flow direction of the magneto-responsive liquids may provide an improved regenerating process relative to other passive regenerating methods. The magneto-responsive liquids may exit the active dynamic regenerator 230 via return contour 233 and connect to main return contour 234 to return to the first set of primary thermal absorbers 201 to repeat the above described thermo-kinetic cycles.

A primary thermal rejection exchanger 359 may be provided in operable communication with the active dynamic regenerators 228 and 230 via respective ones of a first active thermal rejection exchanger 367 and a second active thermal rejection exchanger 368 as shown in FIG. 8. In this regard, a primary cooling contour 361 may divide into contours 362 and 363. Contour 364 may split off from primary cooling contour 361 at the point at which contour 363 returns to the first and second active thermal rejection exchangers 367 and 368. Contour 363 may split into contours 365 and 366, which may provide fluid communication with the liquid side of the first and second active thermal rejection exchangers 367 and 368, respectively. Cooling magneto-responsive liquid flow may be amplified by EMD actuator 369 in the first active thermal rejection exchanger 367 and by EMD actuator 370 in the second active thermal rejection exchanger 368. The EMD actuators 369 and 370 may include electromagnetic coils that are disposed around the first and second active thermal rejection exchangers 367 and 368, respectively, to improve the thermal, cooling exchange process relative to passive cooling methods.

Magneto-responsive liquid may flow out of the first and second active thermal rejection exchangers 367 and 368 return contours 371 and 372, which may connect to the suction side 373 of linear induction pump 375. Linear induction pump 375 may supply contour 376, which may return the liquid to the supply header 378 of the primary thermal rejection exchanger 359. This cyclical flow path may be repeated to define thermo-kinetic cooling cycles.

In an example embodiment, the primary thermal rejection exchanger 359 may include multiple sets of thermal rejection exchangers 360. The primary thermal rejection exchanger 359 may be cooled by a primary cooling pump (PCP) via contour 358 and cooling fluid may return to the PCP via exit contour 379. Thus, for example, the thermo-conductive, magneto-responsive liquids that pass through the thermal rejection exchangers 360 are indirectly thermally interfaced with the cooling fluids provided by the PCP within the primary thermal rejection exchanger 359.

Thermal excitation (enthalpy) proceedings will now be described in reference primarily to FIG. 10. As shown in FIG. 10, the second set of primary thermal absorbers 202 may be operably coupled to a displacement and power generating module 222. FIG. 11 illustrates a more detailed view of the displacement and power generating module 222. In an example embodiment, the second set of primary thermal absorbers 202 may thermally excite magneto-responsive liquids to induce thermo-kinetic flow out of the supply contour 243 to the intake of linear induction pump 244. The thermally excited magneto-responsive liquids may flow from the linear induction pump 244 to supply contour 245, which may have contour 246 split off therefrom. Contour 246 may then divide into contours 247 and 248, which may supply a first inner thermal exchanger 249 and a second inner thermal exchanger 250, respectively.

Contour 245 proceeds past the split with contour 246 to an opposite end of the power generating module 222 via contours 251 and 252 to supply a third inner thermal exchanger 253 and a fourth inner thermal exchanger 254, respectively. The first, second, third and fourth inner thermal exchangers 249, 250, 253 and 254 may be provided within the displacement and power generation module 222 to respond to the thermal excitation and employ compound gases and thermo-magneto conductive, magneto-responsive liquids as operating mediums. As such, each of the first, second, third and fourth inner thermal exchangers 249, 250, 253 and 254 may be referred to as an exciter (e.g., exciter 1, exciter 2, exciter 3 and exciter 4, respectively). Each exciter may itself be referred to as a power generating module in some cases.

The first inner thermal exchanger 249 and the third inner thermal exchanger 253 may provide return flows to the second set of primary thermal absorbers 202 via return contours 257 and 255, which may connect to return header 259 and define a path for a thermo-kinetic cycle capable of repetition. Meanwhile, the second inner thermal exchanger 250 and the fourth inner thermal exchanger 254 may provide return flows to the return header 259 via contours 258 and 256 again defining a path for a thermo-kinetic cycle capable of repetition.

In an example embodiment, outer electromagnetic coils 261 may be provided proximate to an outside of each exciter and internal electromagnetic coils 262 may be disposed to face the outer electromagnetic coils 261 from an inside of the exciters proximate to each of the first, second, third and fourth inner thermal exchangers 249, 250, 253 and 254. The inner electromagnetic coils 262 may function as secondary core electromagnets of the magneto-hydro-dynamic actuators described above in connection with the examples of FIGS. 2 and 3.

Each exciter of the displacement and power generating module 222 may be pre-charged with a relatively high initial pressure, compound gas, and may be filled by a thermo-magneto conductive, magneto-responsive liquid. To generate positive power in accordance with the first and second laws of thermodynamics, thermo-kinetic maximum and minimum gradients may be maintained relatively far apart in order to achieve thermal efficiency.

Referring now to FIGS. 12 and 13, operation of a compression and power generating module 450 will be described according to an example embodiment. Primary, counter-flow of cooling magneto-responsive liquids through cooling exchangers 360 of the primary thermal rejection exchanger 359 may be provided from the supply header 378. After passing through the cooling exchangers 360, fluid may be passed to contour 361 before splitting between contours 362 and 363. Contour 362 may supply the intake of a first thermal rejector exchanger 388 and contour 362 may also split off to contour 382, which supplies fluid to the intake of a second thermal rejector exchanger 384 to thereby cool (via gas and liquid operating mediums) the first and second thermal rejector exchangers 388 and 384. Recirculated liquid is then fed back to the primary thermal rejection exchanger 359 via contour 390. Liquid in contour 390 is supplied to the intake 395 of linear induction pump 396 to contour 377 which is in fluid communication with the supply header 378 to return fluid to the primary thermal rejection exchanger 359 to define a path for a thermo-kinetic cycle capable of repetition.

Meanwhile, contour 364 supplies a third thermal rejector exchanger 385 and a fourth thermal rejector exchanger 387 to supply cooling magneto-responsive liquids to the compression and power generating module 450. Contour 393 then connects to contour 374 and contour 372 and to the intake 373 the linear induction pump 375. The linear induction pump 375 then supplies fluid to contour 376, which connects back to the supply header 378 to return fluid to the primary thermal rejection exchanger 359 to define a path for a thermo-kinetic cycle capable of repetition.

In an example embodiment, outer electromagnetic coils 400 may be provided proximate to an outside of each of the first, second, third and fourth thermal rejector exchangers 388, 384, 385 and 387 and internal electromagnetic coils 401 may be disposed to face the outer electromagnetic coils 400 from an inside of the first, second, third and fourth thermal rejector exchangers 388, 384, 385 and 387. The inner electromagnetic coils 401 may function as secondary core electromagnets of the magneto-hydro-dynamic actuators described above in connection with the examples of FIGS. 2 and 3. All of the electromagnetic coils of the system (e.g., inner and outer coils 261, 262, 400 and 401 may operate under the control of the digital electro-dynamic governor 110 or 160.

Before operation, magneto-responsive liquid columns in thermal exciter modules 222 and thermal rejecting modules 450 may remain relaxed and at mid stroke of the respective modules. Compound gas volumes may be relatively equally divided and positioned at mid strokes within the thermal exciter modules 222 and thermal rejecting modules 450.

Operation of the exciters of FIGS. 5, 10 and 11 will now be described according to one example embodiment. In this regard, for example, under control of the digital electro-dynamic governor 110 or 160, the MHD actuators (e.g., outer electromagnetic coils 261 and inner electromagnetic coils 262) may generate electromagnetic energy to force the magneto-responsive liquid column to stir upward to an upper stage of the first inner thermal exchanger 249. This movement may displace compound gases 500 within a main thermal body 502 of the first inner thermal exchanger 249. Reciprocal contour H1 (see FIG. 5) connects to a gaseous exchanger 264 of the active dynamic regenerator 230. Pre-charged with an initially high pressure of compound gases, the main thermal body 502 is then filled with thermo-magneto conductive, magneto-responsive liquids 504. The magneto-responsive liquid 504 is then thermally excited by interfacing with the first inner thermal exchanger 249. Compound gases 500 volumes are then displaced to transfer thermal energy to the ceramic matrix of the active dynamic regenerator 228. At that phase, displacement of compound gases 500 may occur in the direction of counter flows associated with incoming thermally excited and amplified (e.g., via the EMD actuator 229) magneto-responsive liquid flows from the first set of primary thermal absorbers 201. The magneto-responsive liquid column may then be agitated by the EMD actuators (e.g., outer electromagnetic coils 261 and inner electromagnetic coils 262) in the upper stage of the first inner thermal exchanger 249 to displace the compound gases 500 responsive to heating therein.

Meanwhile, the magneto-responsive liquid column of the second thermal rejector exchanger 384 may move up to displace compound gases therein to the main rejecting reciprocal contour R2. The magneto-responsive liquid column may be influenced by electromagnetic fields generated by the EMD actuators (e.g., outer electromagnetic coils 400 and inner electromagnetic coils 401) to remain behind at a ½ stroke position. Following magneto-responsive liquid column motion of the first inner thermal exchanger 249, the magneto-responsive liquid column motion of the first inner thermal exchanger 249 may supersede second thermal rejector exchanger 384 magneto-responsive liquid column motion by ½ stroke. The digital-electro-dynamic governor 110 or 160 may control the electromagnetic fields generated by the MHD actuators (e.g., outer electromagnetic coils 261 and 400 and inner electromagnetic coils 262 and 401). Compound gases of the first inner thermal exchanger 249 displace through contour H1 to the active matrix of the active dynamic regenerator 228. From the gaseous exchanger 264 of the active dynamic regenerator 228, counter flow is initiated to the cooling exchanger 350. Compound gases are then cooled down via reciprocal contour R2, filling the second thermal rejector exchanger 384 and causing the compound gases to also be cooled down by the second thermal rejector exchanger 384.

Accordingly, thermally activated displacing gas flows from the first inner thermal exchanger 249 (exciter 1) reciprocate via H1 through the active dynamic regenerator's 228 gaseous exchanger 264 to transfer thermal energy via flows in the cooling exchanger 350 so that cooling displacing gas flows may reciprocate through contour R2 to and out from the second thermal rejector exchanger 384 (rejector 2). Accordingly, reciprocating thermo-kinetic forces and an electro-hydro-dynamic flywheel effect may be generated and the inertia mass of the magneto-responsive liquid column may be combined with that effect to generate a kinematically independent rotary positive (net) energy output from a bi-directional hydraulic turbine 550 disposed between the exciter 1 and exciter 2 modules (e.g., the first and second inner thermal exchangers 249 and 250).

Pre-charged with an initially high pressure of compound gases, the main thermal body of the second inner thermal exchanger 250 is also filled with thermo-magneto conductive, magneto-responsive liquids. The magneto-responsive liquid is then thermally excited by interfacing with the second inner thermal exchanger 250. Synchronously with the operation of the first inner thermal exchanger 249 (exciter 1) described above, and responsive to control by the digital electro-dynamic governor 110 or 160, an electromagnetic flywheel effect may be initiated by the electromagnetic field and compound gases due to thermo-kinetic expansion forces that cause the magneto-responsive liquid to move downward to the bottom stage of the second inner thermal exchanger 250 (exciter 2). This movement may cause the magneto-responsive liquid column to encounter guide blades (e.g., a nozzle ring) of the bi-directional hydraulic turbine 550.

Figure 14:
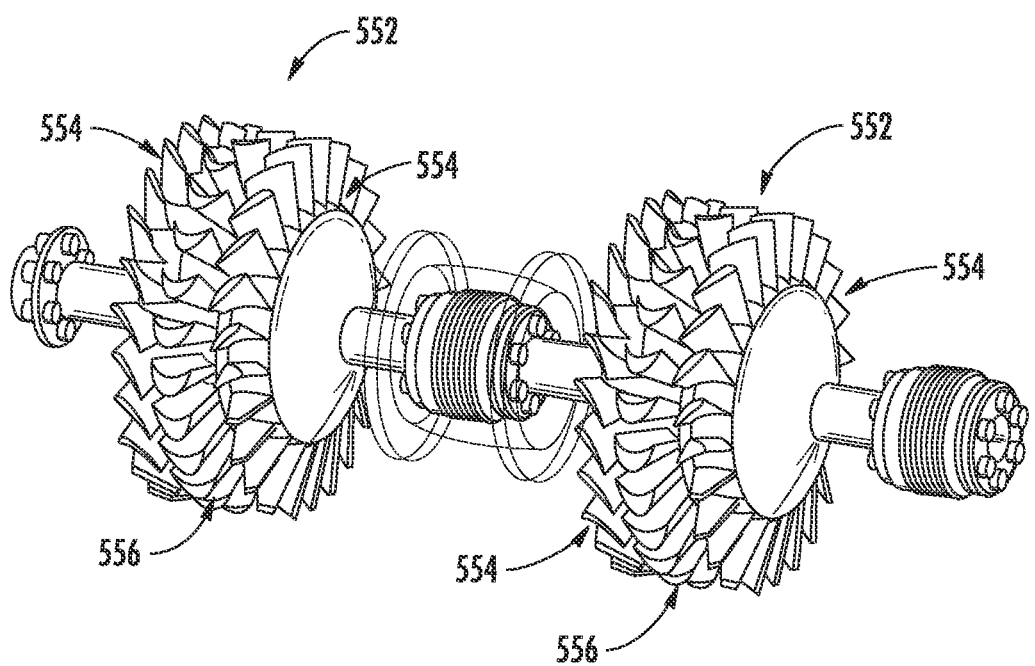
FIG. 14 illustrates working wheels of the bi-directional hydraulic turbine of an example embodiment.
Figure 15:
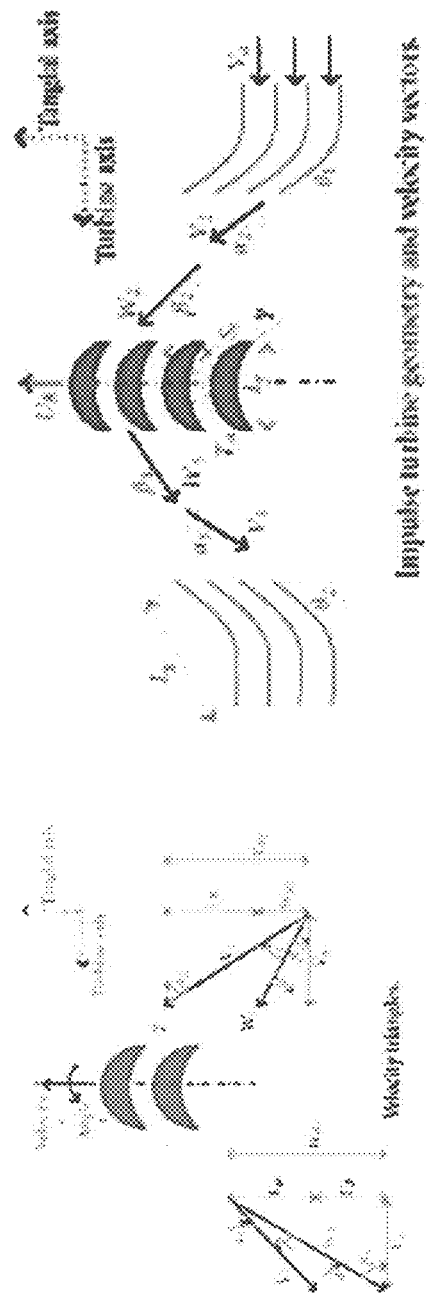
FIG. 15 illustrates a view of the turbine in its operating environment, along with the corresponding geometry and velocity vectors generated thereby according to an example embodiment.
Figure 15:
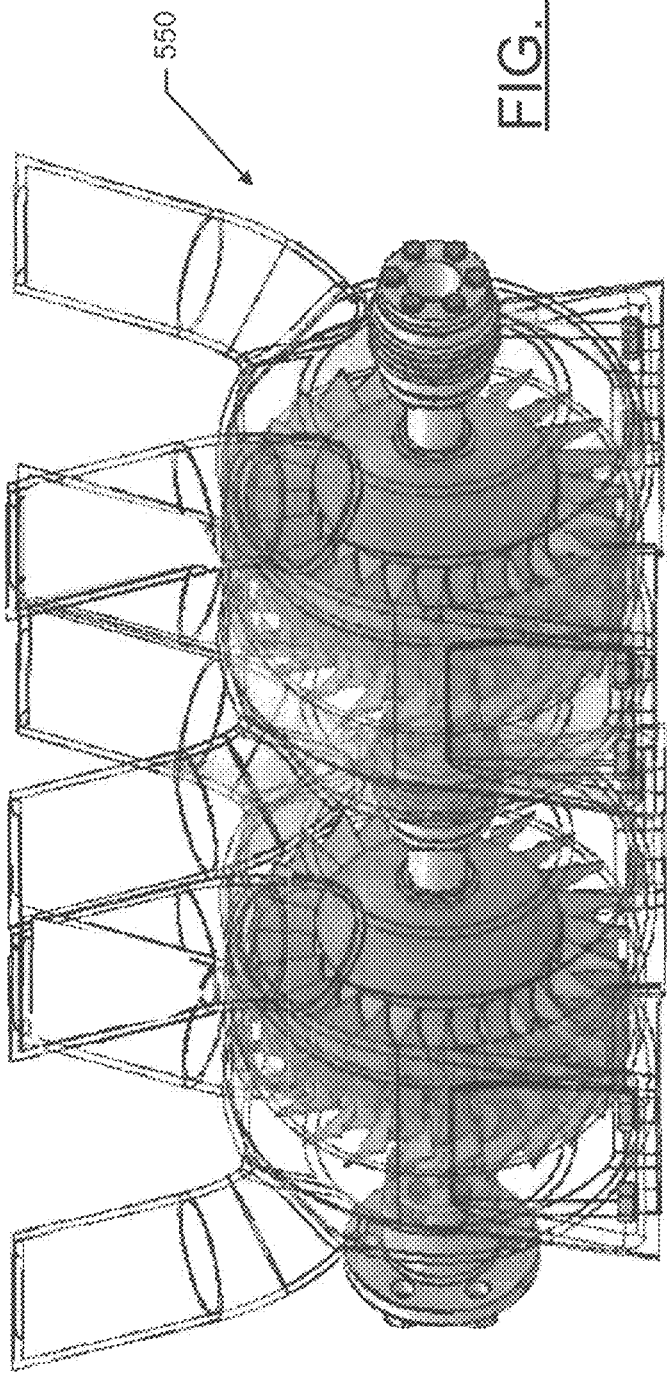
Figure 16:
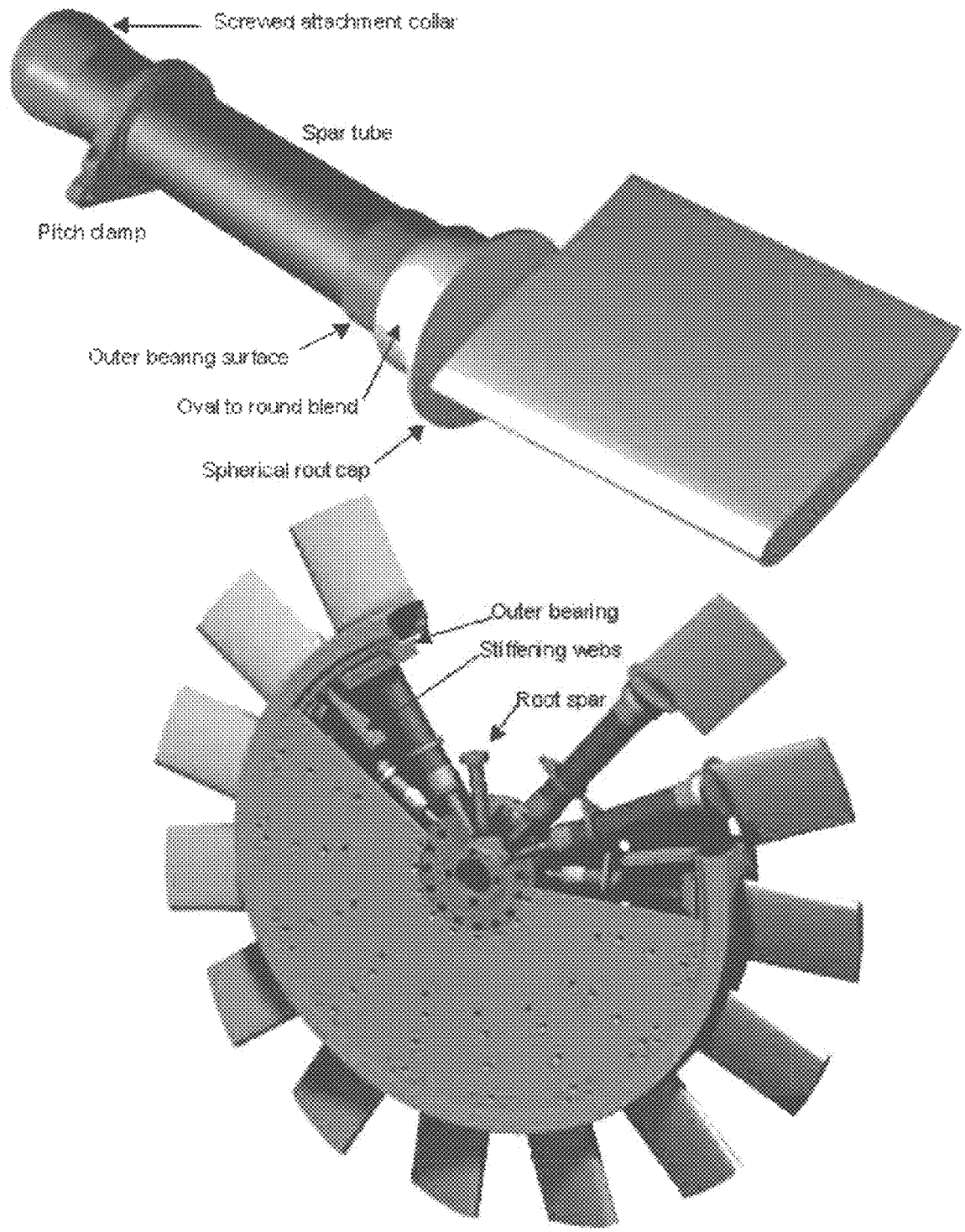
FIG. 16 illustrates a view of portions of a working wheel according to an example embodiment.

The magneto-responsive liquid column may powerfully flow through the blades of the working wheel of the bi-directional hydraulic turbine 550 to convert magneto-hydrodynamically induced liquid column hydro-dynamic flow directly into kinematic rotary positive power output without the use of complicated kinematics. The transient turbine working wheel moves in response to magneto-responsive liquid column flow interacting with the guide blades of the bi-directional hydraulic turbine 550 based on principles associated with Bernoulli's laws relating to decreasing velocity and increasing pressure in such situations. FIG. 14 illustrates the working wheels 552 of the bi-directional hydraulic turbine 550 of an example embodiment. FIG. 15 illustrates a view of the turbine 550 in its operating environment, along with the corresponding geometry and velocity vectors generated thereby according to an example embodiment. As can be seen in FIG. 14, the guide blades 554 on each side of the rotor blades 556 of the working wheels 552 are arranged to direct flow over the rotor blades 556 in the same direction. Thus, the turbine of FIG. 14 is bi-directional. The magneto-responsive liquid column may then be displaced up to the adjacent exciter module (e.g., exciter 1). Thermo-kinetic and electro-hydro-dynamic reciprocating forces may therefore be generated in the form of a positive energy output. FIG. 16 illustrates a view of portions of a working wheel according to an example embodiment. In this regard, FIG. 16 shows a wheel hub 580 from which a plurality of spars 582 radially extend to terminate at blades 584.

Compound gas reciprocal flows associated with the exciter 2 module and the rejector 3 module are similar to those described above in association with the exciter 1 and rejector 2 modules. In this regard, for example, the exciter 2 module (i.e., the second inner thermal exchanger 250) is operably coupled to the active dynamic regenerator 228 gaseous exchanger 265 via reciprocal contour H2. Magneto-responsive liquid volume released from the downward moving column of the exciter 2 module to push compound gases through reciprocal contour R3 of the rejector 3 module may reciprocate and be cooled down by the cooling exchanger 351. From cooling exchanger 351, compound gases may enter the active dynamic regenerator's 228 gaseous exchanger 265 to be heated up by accumulated thermal energy from the ceramic matrix therein. Compound gases, at that phase, may flow parallel to thermally activated magneto-responsive liquid flow from the first set of thermal absorbers 241 while being amplified by EMD actuator 231 to implement an active, reciprocal thermal exchange to multiply thermal efficiencies of the active dynamic regenerator 228. Compound gases heated by the inner thermal exchanger 350 may exit the exciter 3 module. As a desirable part of the sequence, compound gas flows may be compressed in and out from the rejector 3 module and reciprocate through contour R3 so that a flow via the cooling exchanger 351 cools the compressed gases. The gases enter the active dynamic regenerator 228 gaseous exchanger 265 and absorb thermal energy therein to thermally activate compressed gas flows to reciprocate via contour H2 connected to the exciter 2 module to fill the exciter 2 module with thermally activated compressed gases.

Reciprocating thermo-kinetic forces, electro-hydro-dynamic flywheel effects and inertia mass of the magneto-responsive liquid column may then combine to generate a kinematically independent, rotary positive (net) energy output from the adjacent exciter 2 and exciter 1 modules via the bi-directional hydraulic turbine 550.

Synchronously, with operation of the exciter-1 module, and under control of the digital electro-dynamic governor 110 or 160 via the MHD actuators (e.g., outer electromagnetic coils 261 and inner electromagnetic coils 262), electromagnetic energy generated by the MHD actuators may be used to power the magneto-responsive liquid column to move upward to the upper stage of the exciter-4 module. This movement may displace compound gases to main thermal, reciprocal contour H4, which connects to the active dynamic regenerator's 230 gaseous exchanger 267.

Pre-charged with an initially high pressure of compound gases, the main thermal body of the fourth inner thermal exchanger 254 (i.e., the exciter 4 module) is also filled with thermo-magneto conductive, magneto-responsive liquids. The magneto-responsive liquid is then thermally excited by interfacing with the fourth inner thermal exchanger 254. Compound gas volumes are then displaced to transfer thermal energy to the ceramic matrix of the active dynamic regenerator 230. At that phase, displacement of compound gases may occur in the direction of counter flows associated with incoming thermally excited and amplified (e.g., via the EMD actuator 232) magneto-responsive liquid flows from the first set of primary thermal absorbers 201. The magneto-responsive liquid column may then be agitated by the EMD actuators (e.g., outer electromagnetic coils 261 and inner electromagnetic coils 262) in the upper stage of the exciter 4 module to displace the compound gases through main thermal contour H4, which connects to the gaseous exchanger 267 of the active thermal regenerator 230 responsive to heating therein. The magneto-responsive liquid column of the exciter 4 module is heated by the third inner thermal exchanger 253.

Synchronously, the magneto-responsive liquid column of the rejector 1 module may move up to compress compound gases to the main, rejecting reciprocal contour R1. The magneto-responsive liquid column is agitated by electromagnetic fields that have been generated by the MHD actuators 400 and 401 to keep the rejector 1 module behind at the ½ stroke position and following the magneto-responsive liquid column motion of the exciter 4 module.

The motion of the magneto-responsive liquid column in the exciter 4 module may dominantly supersede the rejector 1 module's magneto-responsive liquid column motion by ½ stroke. That features leading and varied by the digital electro-dynamic governor 110 or 160 and controlling by electromagnetic fields, generated by MHD actuators 261 and 262 and 400 and 401. Compound gases of the exciter 4 module may be displaced through contour H4 to the active dynamic regenerator's gaseous exchanger 267. From the gaseous exchanger 267 of active dynamic regenerator 230, counter-flow to the main gas cooling exchanger 353 may be initiated. Cool down of the compound gases may then occur via reciprocal contour R1, filling up the rejector 1 module.

In some cases, a desirable or essential part of the sequence may include the thermal activation that displaces gas flows from the exciter 4 module to reciprocate via contour H4 through the gaseous exchanger 267 of the active dynamic regenerator 230. The gas flow may then transfer thermal energy to the ceramic matrix of the active dynamic generator 230 and then enter and flow via the main gas cooling exchanger 353 to cool compressed gas flows that reciprocate through contour R1 to and out from the rejector 1 module. Reciprocating thermo-kinetic forces, the electro-hydro-dynamic flywheel effect and inertia mass of the magneto-responsive liquid column may therefore combine to generate kinematically independent, rotary positive (net) energy output, from adjacent exciter 4 module and exciter 3 module via the bi-directional hydraulic turbine 550.

Synchronously with the operations described above relative to actions associated with the exciter 4 module, the digital electro-dynamic governor 110 or 160 may control the magneto-hydro-dynamic actuators and the outer electromagnetic coils 261 and inner electromagnetic coils 262 to create an electromagnetic flywheel effect via manipulation of the electromagnetic field and compound gases in a similar manner to that which has been described above. In this regard, for example, thermo-kinetic expansion forces may cause the magneto-responsive liquid column to move downward to the bottom stage of the exciter 3 module. This movement may cause the magneto-responsive liquid column to impact a guide blades apparatus (nozzle ring) of the bi-directional hydraulic turbine 550. The magneto-responsive liquid column may move powerfully flow past blades of the working wheel of the bi-directional hydraulic turbine 550 and convert magneto-hydro-dynamically induced liquid column to exert hydro-dynamic power flow directly to kinematic, rotary positive power output. In this regard, reciprocal flows through the bi-directional hydraulic turbine 550 may cause movement of the working wheel of the bi-directional hydraulic turbine 550 in a consistent direction in order to directly convert the reciprocating flows into rotary power.

Compound gas reciprocal flows may be exchanged between exciter 3 and rejector 4 modules. In this regard, for example, the exciter 3 module may be connected to the gaseous exchanger 266 of active dynamic regenerator 230 via main thermal reciprocal contour H3. The magneto-responsive liquid volume may be released from moving downward and the magneto-responsive liquid column of the exciter 3 module, filled by pre-charged compound gases, may be reciprocally pushed to the main cooling reciprocal contour R4, to and out of the rejecting 4 module, to be cooled down by main gas cooling exchanger 352. From cooling exchanger 352, compound gases may enter the gaseous exchanger 265 of the active dynamic regenerator 230 to heat up via the accumulated thermal energy from the ceramic matrix of the active dynamic regenerator 230. Compound gases, at that phase, may flow parallel to the thermally activated magneto-responsive liquid flow from the first set of thermal absorbers 201 additionally amplified by EMD actuator 232. By implementing an active, reciprocal thermal exchange method, thermal efficiencies of the active dynamic regenerator 230 may be multiplied. Out coming from Exciter-4 module Compound gases heated up by Inner Thermal exchanger 254.

In some embodiments, it may be desirable or even essential that compressed compound gases flow in and out from the rejector 3 module to reciprocate through contour R3 via the main gas cooling exchanger 351 to cool compressed gases and enter the gaseous exchanger 265 of the active dynamic regenerator 228 and absorb thermal energy from the ceramic matrix of the active dynamic regenerator 228. Thermally activated compressed gas may then reciprocate via flow through contour H2, which is connected to the exciter 2 module. The exciter 2 module may therefore be filled with thermally activated compressed gases. Reciprocating thermo-kinetic forces, the electro-hydro-dynamic flywheel effect and inertia mass of the magneto-responsive liquid column may therefore combine to generate kinematically independent, rotary positive (net) energy output, from adjacent exciter 3 module and exciter 4 module via the bi-directional hydraulic turbine 550.

In an example embodiment, reciprocating thermo-kinetic forces of cooled gas and magneto-responsive liquid column flows that reciprocate through contours R1 and R4 may alternate from the rejector 1 module to the adjacent rejector 4 module and reverse so that the electro-hydro-dynamic flywheel effect and inertial mass of the magneto-responsive liquid column combine to generate kinematically independent, rotary positive (net) energy output from the adjacent rejector 1 module and rejector 4 module via the bi-directional hydraulic turbine 550. Reciprocating thermo-kinetic forces of cooled gas and magneto-responsive liquid column flows that reciprocate through contours R2 and R3 may also alternate from the rejector 2 module to the adjacent rejector 3 module and reverse so that the electro-hydro-dynamic flywheel effect and inertial mass of the magneto-responsive liquid column combine to generate kinematically independent, rotary positive (net) energy output from the adjacent rejector 2 module and rejector 3 module via the bi-directional hydraulic turbine 550.

In an example embodiment, the digital electro-dynamic governor 110 or 160 may provide inputs to the MHD actuators, the outer electromagnetic coils 261 and 400 and the inner electromagnetic coils 262 and 401 of multiple rejector modules 450. By applying alternating electrical energy to the MHD actuators, the reciprocal electro-hydro-dynamic flywheel effect may be generated to set the magneto-responsive liquid columns of multiple exciter modules 222 and multiple rejector modules 450 in motion. Inertial mass of the magneto-responsive liquid columns and the electro-hydro-dynamic flywheel effect may combine such that rotary positive (net) energy is generated in a kinematically independent manner from adjacent exciter modules 220 and rejector modules 450, as described above, via the bi-directional hydraulic turbine 550. The exciter and rejector modules may act as power modules, which may be V-configured, inclined and double acting power modules that experience induced alternating flows therethrough responsive to reciprocal flows of compound gases and magneto responsive liquid columns that are driven by thermo-kinetic and electromagnetic influence under the control of a digital programmable governor.

Figure 17:
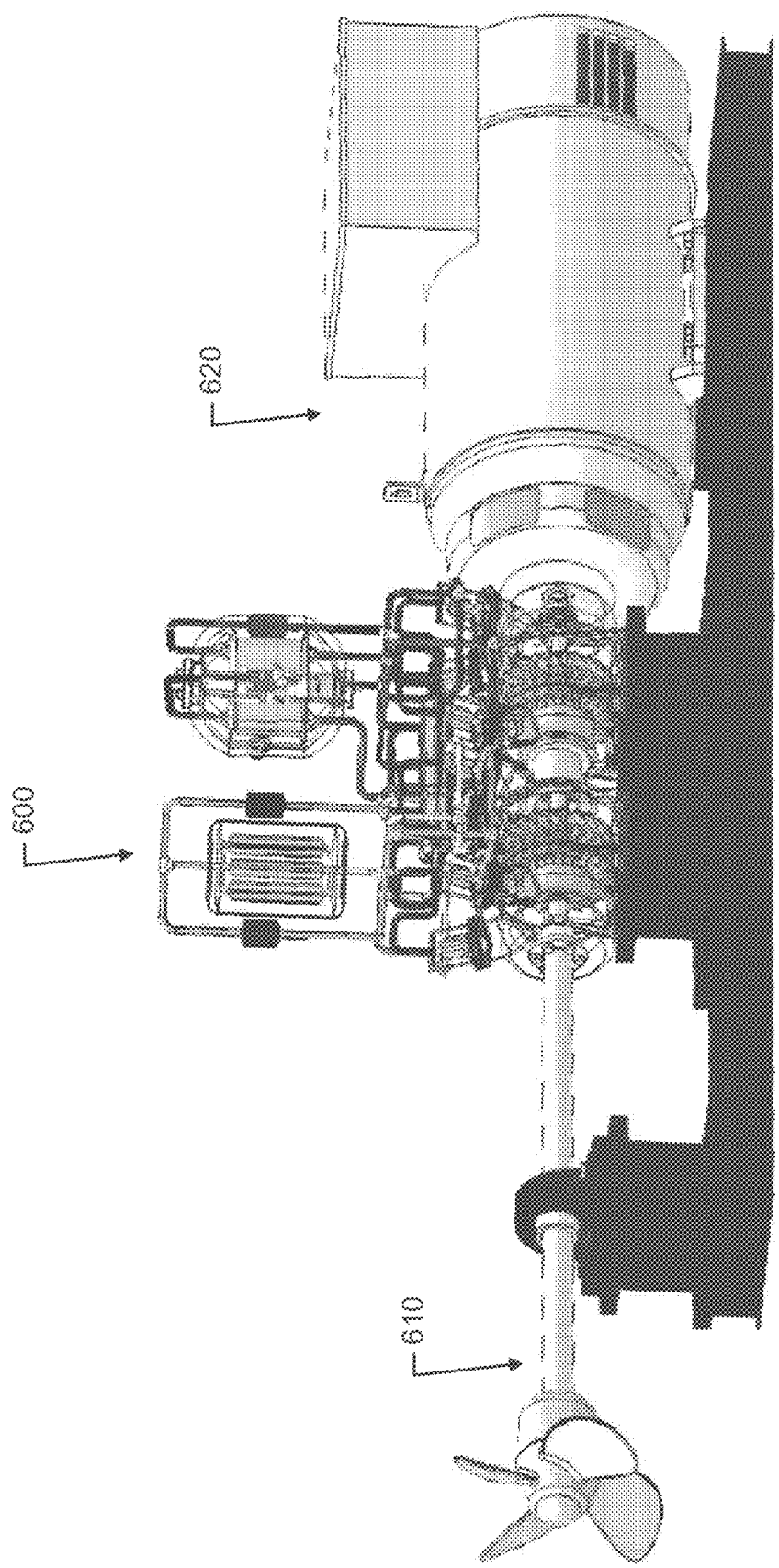
FIG. 17 illustrates a perspective view of a KITHD turbo-compound generator producing a rotary motion output coupled for electrical power generation and propulsion according to an example embodiment.
Figure 1A:
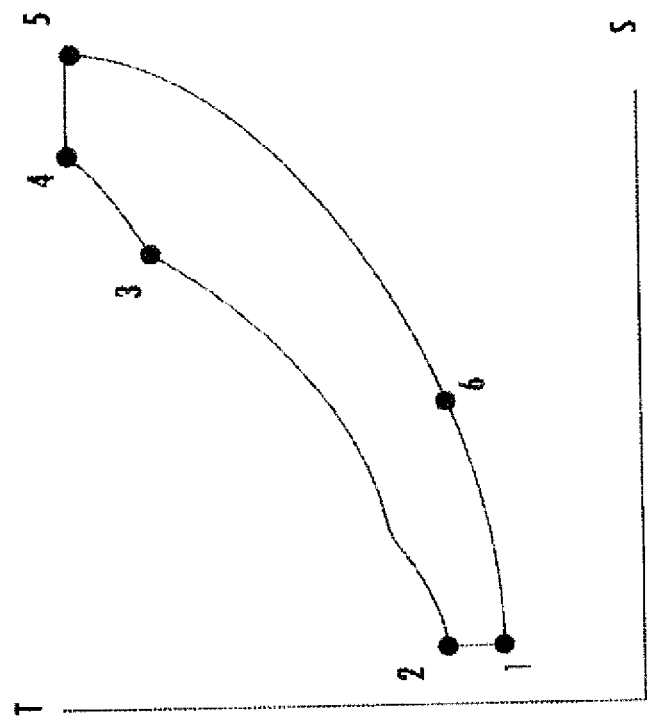
Figure 1B:
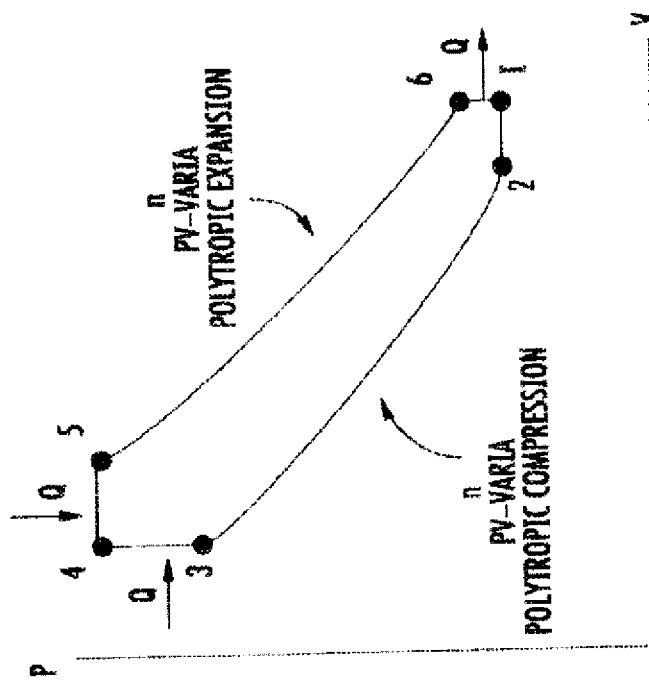
Figure 2:
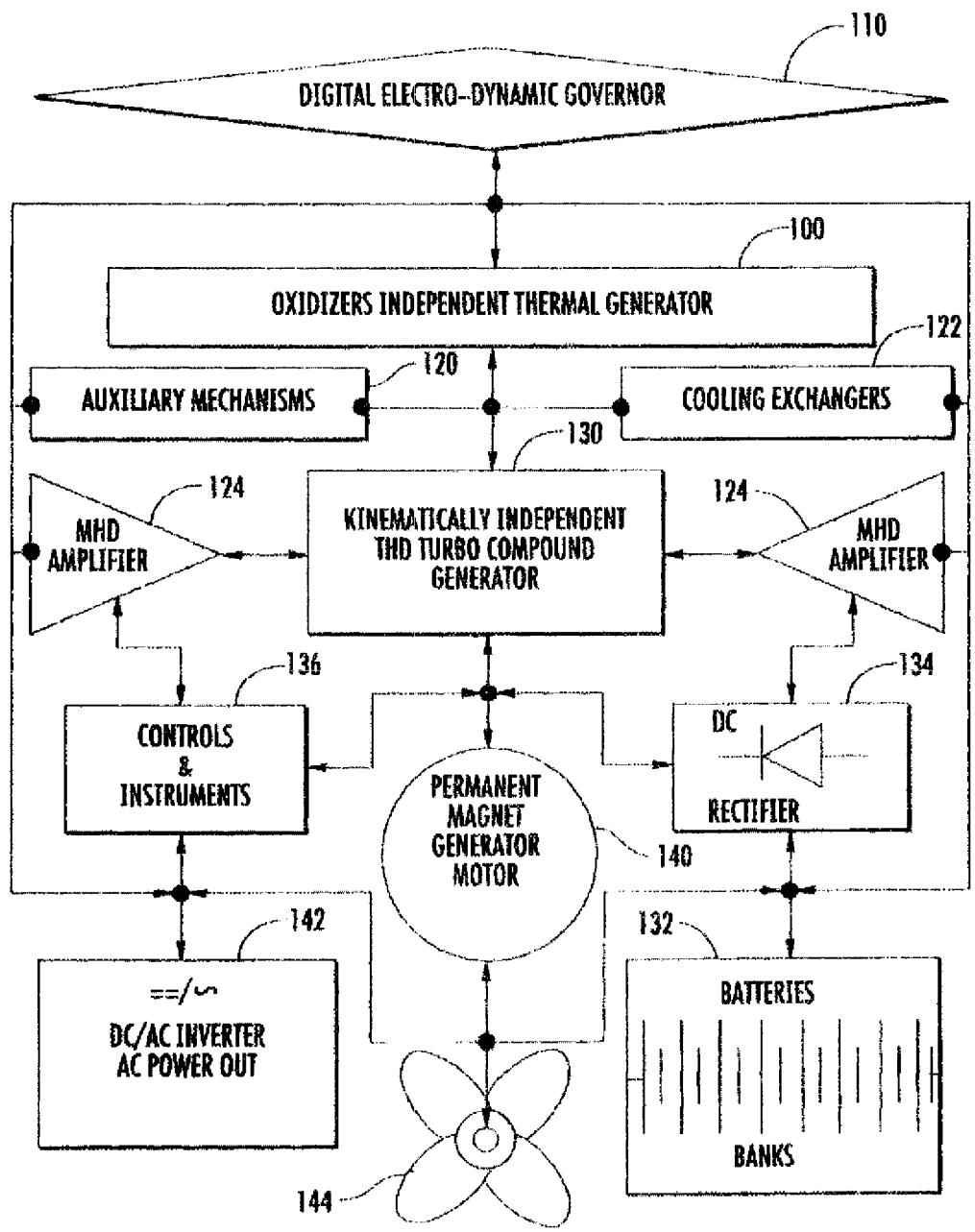
Figure 3:
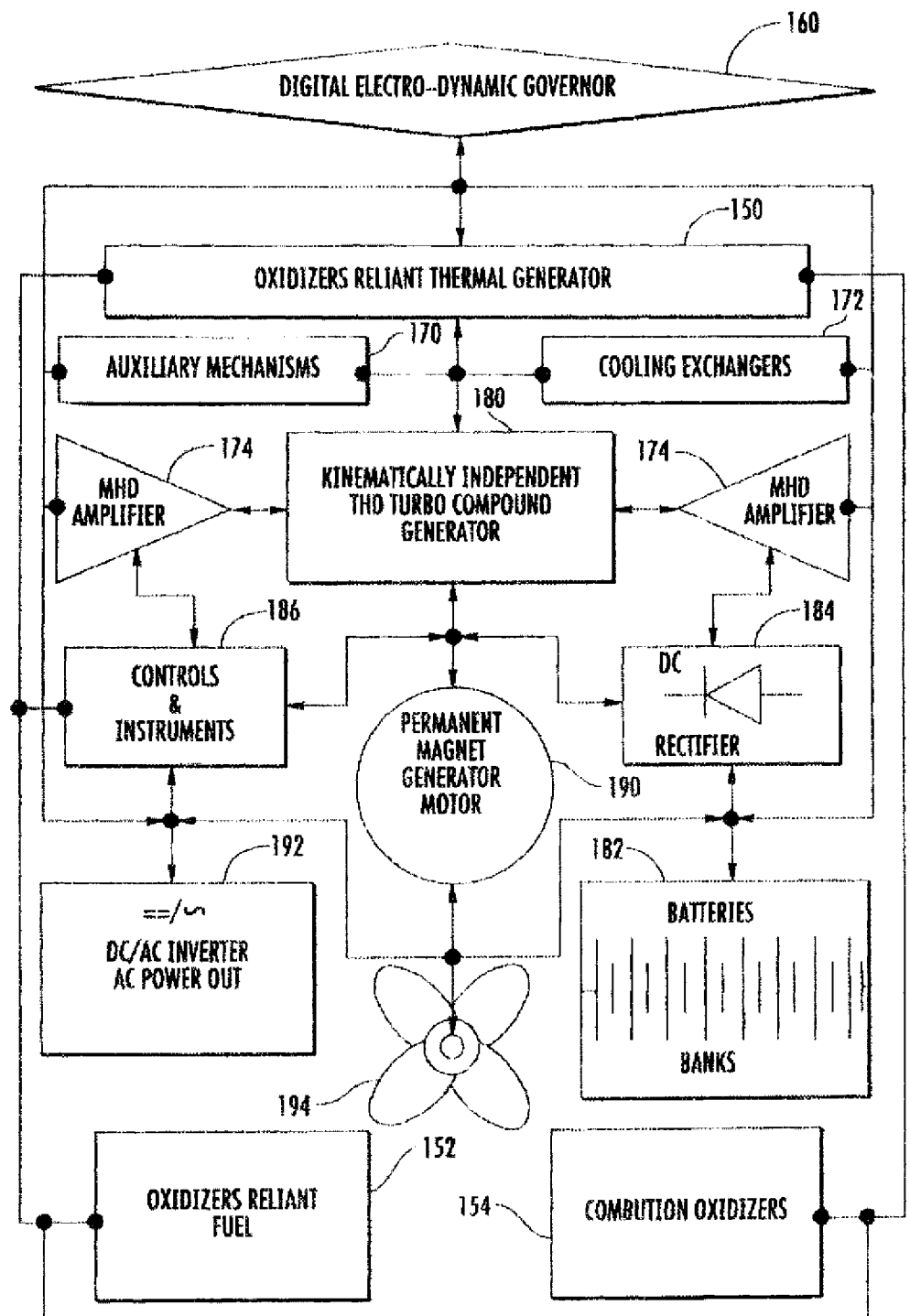

Accordingly, some example embodiments may enable a digital programmable governor (e.g., digital electro-dynamic governor 110 or 160) to be employed with respect to management of alternating, linear induction, MHD actuators, to control an entire thermo-kinetic, electro-magneto-dynamic and kinematically independent thermodynamic cycle. Control and variation of operating parameters such as temperatures, operating pressures, phase positions, compression ratios, rotational frequencies, power requirement outputs and/or the like may all be made via selection of corresponding design features consistent with the principles described herein. Electro-magneto-dynamic variations to physical and thermo-kinetic characteristics of operational magneto-responsive fluids may be selected for efficient operation in accordance with ambient requirements. In some embodiments, the MHD actuators may provide a kinematically independent energy source for providing a levitation effect relative to operation of the magneto-responsive liquid column to reduce friction losses. Example embodiments may therefore employ a KITHD turbo-compound generator 600 to produce rotary motion output power for provision of propulsion via a shaft 610 that powers a propeller and/or via an electrical generator 620 as shown in FIG. 17.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments That which is claimed:

1. A power generator comprising:
   a digital programmable governor;
   a plurality of power modules having a working fluid including a compound gas and a magneto-responsive liquid column disposed therein;
   a thermal generator capable of adding heat to the working fluid;
   one or more cooling exchangers configured to remove heat from the working fluid;
   at least one set of magneto hydro-dynamic actuators, responsive to control of the digital programmable governor and in association with a thermal cycle of adding heat to and removing heat from the working fluid, disposed proximate to the plurality of power modules to provide influence to drive reciprocal flows of the working fluid through the at least one power module; and
   a plurality of bi-directional turbines disposed to receive the reciprocal flows and perform a kinematically independent conversion of the reciprocal flows to rotary power.

2. The power generator of claim 1, wherein the thermal generator comprises an oxidizer independent thermal generator.

3. The power generator of claim 2, wherein the oxidizer independent thermal generator comprises a quantum nucleonic reactor, nuclear thermal generator, thermal storage battery, radioisotope thermal absorber, solar thermal absorber, or anaerobic thermal supply.

4. The power generator of claim 1, wherein the thermal generator comprises an oxidizer reliant thermal generator.

5. The power generator of claim 4, wherein the oxidizer reliant thermal generator comprises a thermal supply source that requires carbon fuels, combustible gases, liquid fuels, synthetic fluids, solid combustible substances, or waste thermal sources.

6. The power generator of claim 1, wherein the power generator is configured to operate in a first mode of operation in which the thermal generator comprises an oxidizer independent thermal generator, and a second mode of operation in which the thermal generator comprises an oxidizer reliant thermal generator.

7. The power generator of claim 1, wherein the plurality of power modules include one or more exciter modules and corresponding one or more rejector modules.

8. The power generator of claim 7, wherein each of the exciter and rejector modules is inclined out of a vertical plane.

9. The power generator of claim 7, wherein the one or more exciter modules and corresponding one or more rejector modules are V-configured, double acting power modules that experience induced alternating flows of the compound gas and the magneto-responsive liquid column driven by thermo-kinetic and electromagnetic influence under the control of the digital programmable governor.

10. The power generator of claim 7, wherein at least one bi-directional turbine is disposed between adjacent exciter modules and at least one bi-directional turbine is disposed between adjacent rejector modules to convert the bi-directional flows between adjacent exciter and rejector modules directly into rotary motion.

11. The power generator of claim 7, wherein the exciter modules are relatively hot and the rejector modules are relatively cold.

12. The power generator of claim 1, wherein each of the plurality of bi-directional turbines comprises a working wheel having guide blades disposed on each opposing side thereof, the guide blades directing flows to the working wheel such that a flow approaching the working wheel in either direction causes rotation of the working wheel in one direction.

13. The power generator of claim 1, wherein the thermal generator comprises a thermo-accumulative metallic-ceramic matrix.

14. The power generator of claim 1, wherein one or more cooling exchangers provide active dynamic cooling and one or more gas-dynamic thermal exchangers.

15. The power generator of claim 14, wherein the one or more cooling exchangers include anticorrosion enclosures to minimize dead volumes.

16. The power generator of claim 1, wherein the one or more cooling exchangers indirectly exchange thermal energy with the working fluids to vary from counter flow to parallel flow therethrough to enhance thermal efficiency of the one or more cooling exchangers.

17. The power generator of claim 1, wherein the at least one set of magneto hydro-dynamic actuators alter, based on control provided by the digital programmable governor, electromagnetic fields within the at least one power module to enhance flow of the working fluid responsive to thermo-kinetic influence.

18. The power generator of claim 1, wherein operating temperatures of the power generator are selectable based on ambient requirements.

19. The power generator of claim 1, wherein the power generator operates by controlling a $PV^m$-vary thermodynamic cycle with external thermal modes, based on variable, thermo-kinetic exchange phases including:
   a first phase comprising a variable ratio isobaric compression phase;
   a second phase comprising a variable polytropic compression phase;
   a third phase comprising a variable ratio isochoric thermal accumulation phase;
   a fourth phase comprising a variable ratio isobaric expansion phase;
   a fifth phase comprising a variable polytropic expansion phase; and
   a sixth phase comprising a variable ratio isochoric thermal rejection phase.

* * * * *

UNITED STATES PATENT AND TRADEMARK OFFICE
CERTIFICATE OF CORRECTION

PATENT NO. : 8,893,497 B2
APPLICATION NO. : 13/566532
DATED : November 25, 2014
INVENTOR(S) : Sverdlin It is certified that error appears in the above-identified patent and that said Letters Patent is hereby corrected as shown below:

Patent No. 8,893,497, issued November 25, 2014, should be deleted in its entirety to be replaced with the attached Patent No. 8,893,497.

Signed and Sealed this
Fourteenth Day of June, 2016

Michelle K. Lee
*Director of the United States Patent and Trademark Office*

(12) United States Patent
Sverdlin

(10) Patent No.: US 8,893,497 B2
(45) Date of Patent: Nov. 25, 2014

(54) KINEMATICALLY INDEPENDENT, THERMO-HYDRO-DYNAMIC TURBO-COMPOUND GENERATOR

(75) Inventor: Anatoly Sverdlin, Anderson, SC (US)

(73) Assignee: KITHD TECHNOLOGIES, LLC, Charlotte, NC (US)

( * ) Notice: Subject to any disclaimer, the term of this patent is extended or adjusted under 35 U.S.C. 154(b) by 0 days.

(21) Appl. No.: 13/566,532

(22) Filed: Aug. 3, 2012

(65) Prior Publication Data
US 2014/0033709 A1 Feb. 6, 2014

(51) Int. Cl.
*F01K 27/00* (2006.01)
*F01K 13/00* (2006.01)

(52) U.S. Cl.
CPC .............. *F01K 27/00* (2013.01); *F01K 13/006* (2013.01)
USPC .................................................. 60/643

(58) Field of Classification Search
USPC ........ 60/517, 519, 522, 524, 525, 644.1, 645, 60/682, 641.8, 659, 650, 671, 676, 651; 290/1 A–1 E, 1 R
See application file for complete search history.

(56) References Cited

U.S. PATENT DOCUMENTS

| | | | |
|---|---|---|---|
| 3,121,311 A | 2/1964 | Crosby et al. | |
| 4,148,195 A | 4/1979 | Gerstmann et al. | |
| 4,808,079 A * | 2/1989 | Crowley et al. | 417/50 |
| 5,195,321 A | 3/1993 | Howard | |
| 6,164,263 A | 12/2000 | Saint-Hillaire et al. | |
| 6,568,169 B2 | 5/2003 | Conde et al. | |
| 7,134,279 B2 | 11/2006 | White et al. | |
| 7,669,415 B2 | 3/2010 | Komaki et al. | |
| 2007/0157615 A1 | 7/2007 | Morgenstein | |
| 2007/0193266 A1 | 8/2007 | McConaghy | |
| 2008/0072597 A1 | 3/2008 | Call | |

FOREIGN PATENT DOCUMENTS

| | | |
|---|---|---|
| RU | 2133860 C1 | 7/1999 |
| WO | 9307374 A1 | 4/1993 |

OTHER PUBLICATIONS

Beale, W. et al., Sunpower, Inc Stirling Engine Configurations, http://www.freepistonjetengine.741.com.
Fette, P., Stirling Engine Research and Computer Program Development, http://home.germany.net/101-276996/fette.htm#c.

\* cited by examiner

*Primary Examiner* — Kenneth Bomberg
*Assistant Examiner* — Wesley Harris
(74) *Attorney, Agent, or Firm* — Nelson Mullins Riley & Scarborough LLP

(57) ABSTRACT

A power generator may include a digital programmable governor, a plurality of power modules that have working fluid including compound gas and a magneto-responsive liquid column disposed therein, a thermal generator capable of adding heat to the working fluid, one or more cooling exchangers configured to remove heat from the working fluid, at least one set of electro-hydro-dynamic actuators, and a plurality of bidirectional turbines. The set of electro-hydro-dynamic actuators are disposed proximate to the power modules to, responsive to control of the digital programmable governor and in association with a thermal cycle of adding heat to and removing heat from the working fluid, provide influence to drive reciprocal flows of the working fluid through the power modules. The bi-directional turbines are disposed to receive the reciprocal flows and perform a kinematically independent conversion of the operating medium reciprocal flows to rotary motion power output.

19 Claims, 17 Drawing Sheets

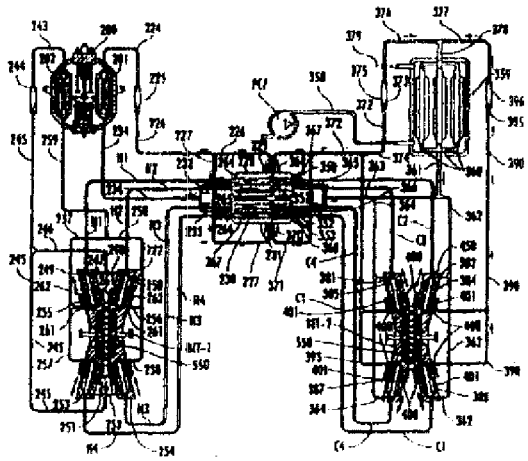

US 8,893,497 B2

KINEMATICALLY INDEPENDENT, THERMO-HYDRO-DYNAMIC TURBO-COMPOUND GENERATOR

TECHNICAL FIELD

Example embodiments generally relate to power generation technology and, more particularly, relate to a Kinematically Independent, Thermo-Hydro-Dynamic, Turbo-Compound generator.

BACKGROUND

Power generating technologies have been with us for many, many years. During that time, vast numbers of different methods, structures and ideas have been put forth regarding possible ways to generate power (electrical and mechanical). Many of these methods, structures and ideas leverage physical and thermodynamic laws regarding thermo-kinetic variations to generate useful energy. However, it is not uncommon for many of the thermal, kinematic and electrical energy generators that are currently known to implement inefficient mechanisms for power generation.

As an example, a typical power generation unit may employ a thermodynamic cycle to generate reciprocal motion of one or more pistons. The reciprocal motion of the pistons may then be converted, using complicated kinematic mechanisms, into rotary motion for power generation. Thus, typical power generation units may encounter inefficiencies by virtue of the complicated kinematic mechanisms that are required to extract energy from thermodynamic processes.

Typical power generation processes that are currently employed often also suffer from improper characterizations that allude to characteristics, origins or processes that are not accurately described. As an example, the so-called "diesel engine" operates on polytrophic, compression impelled, self-ignition based on a $PV^n$-cons thermodynamic cycle that employs "diesel fuels" that were not known when Rudolf Diesel invented his isothermal, compression induced, self-ignition P-cons thermodynamic cycle. Similarly, the combustion method that is often referred to as "Air Independent Propulsion" (AIP) is actually dependent upon the storage of oxidizers (oxygen) and therefore technically not "airless". As one more example, a so called "Free Piston" typically employs some kind of synchronizing suspension means that causes it to not be "free" at all.

BRIEF SUMMARY OF SOME EXAMPLES

Some example embodiments may provide for a Kinematically Independent, Thermo-Hydro-Dynamic (KITHD), Turbo-Compound generator that actually is "kinematically independent". Some embodiments may therefore provide systems for creating similar conditions to a natural hurricane's conditions such that thermo-kinetic variations that occur in such an environment may be efficiently leveraged into power production. Moreover, such power production may be enabled to be provided without the use of complex and loud mechanical equipment that converts reciprocating motion into rotary motion.

According to one example embodiment, a power generator is provided. The power generator may include a digital programmable governor, a plurality of power modules having working fluid including compound gas and a magneto-responsive liquid column disposed therein, a thermal generator capable of adding heat to the working fluid, one or more cooling exchangers configured to remove heat from the working fluid, a plurality of electro-hydro-dynamic actuators, and a plurality of bidirectional turbines. The plurality of electro-hydro-dynamic actuators are disposed proximate to the power modules to, responsive to control of the digital programmable governor and in association with a thermal cycle of adding heat to and removing heat from the working fluid, provide influence to drive and control reciprocal flows of the working fluid through the power modules. The bi-directional turbines are disposed to receive the reciprocal flows and perform a kinematically independent conversion of the operating medium reciprocal flows to rotary motion power output.

Some example embodiments may therefore improve efficiency in relation to power generation capabilities. Moreover, some example embodiments may increase the efficiency of oxidizer independent power generation systems so that complicated, noisy and/or expensive mechanical arrangements for conversion of reciprocating motion into rotary motion can be avoided.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1, which includes FIGS. 1A and 1B, illustrates theoretical PV & TS diagrams for a Kinematically Independent, Thermo-Hydro-Dynamic (KITHD) thermodynamic cycle according to an example embodiment;

FIG. 2 illustrates a functional block diagram of one KITHD turbo-compound generator that may employ the KITHD cycle with in an oxidizer independent structure according to an example embodiment;

FIG. 3 illustrates a functional block diagram of one KITHD turbo-compound generator that may employ the KITHD cycle with in an oxidizer dependent structure according to an example embodiment;

FIG. 4 illustrates a perspective view of a KITHD turbo-compound generator of an example embodiment;

FIG. 5 illustrates a schematic diagram of various components of the KITHD turbo-compound generator of FIG. 4 according to an example embodiment;

FIG. 6 illustrates a more detailed schematic view of the heat source of an example embodiment;

FIG. 7 illustrates a more detailed view of the primary thermal absorbers of an example embodiment;

FIG. 8 illustrates a more detailed view of the operable coupling provided between the heat source and dynamic regenerators of FIG. 5 according to an example embodiment;

FIG. 9 illustrates a more detailed view of active dynamic regenerators and active main cooling exchangers of FIG. 5 according to an example embodiment;

FIG. 10 illustrates portions of FIG. 5 that relate to thermal excitation in greater detail according to an example embodiment;

FIG. 11 illustrates a more detailed view of a displacement and power generating module according to an example embodiment;

FIG. 12 illustrates portions of FIG. 5 that relate to thermal rejection in greater detail according to an example embodiment;

FIG. 13 illustrates a more detailed view of a compression and power generating module according to an example embodiment;

FIG. 14 illustrates working wheels of the bi-directional hydraulic turbine of an example embodiment;

FIG. 15 illustrates a view of the turbine in its operating environment, along with the corresponding geometry and velocity vectors generated thereby according to an example embodiment;

FIG. 16 illustrates a view of portions of a working wheel according to an example embodiment; and FIG. 17 illustrates a perspective view of a KITHD turbo-compound generator producing a rotary motion output coupled for electrical power generation and propulsion according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, "operable coupling" should be understood to relate to direct or indirect connection that, in either case, enables functional interconnection of components that are operably coupled to each other. As used herein, the term "kinematically independent" should be understood to mean without traditional kinematic power converters such as pistons, special seals, piston rods, complicated linkages, crankshafts, connecting rods, bearings, gears, Scotch yokes, Swash-Wobble plates, orbital rotors and/or the like. Meanwhile, the term "turbo compound generator" should be understood to mean a reciprocal, thermo-kinetic energy source that employs turbines for converting energy from liquid thermo-kinetic sources, directly to kinematic, rotary motion without any intermediate kinematic mechanisms.

FIG. 1, which includes FIGS. 1A and 1B, illustrates theoretical PV & TS diagrams for a kinematically independent, thermo-hydro-dynamic (KITHD) thermodynamic cycle according to an example embodiment. In this regard, FIG. 1 shows six governed, variable thermodynamic phases. The KITHD thermodynamic cycle is isochoric-isobaric-polytropic. Phase 1-2 corresponds to a variable ratio isobaric compression phase. Phase 2-3 corresponds to a variable polytropic compression phase. Phase 3-4 corresponds to a variable ratio isochoric thermal accumulation phase. Phase 4-5 corresponds to a variable ratio isobaric expansion phase. Phase 5-6 corresponds to a variable polytropic expansion phase. Phase 6-1 corresponds to a variable ratio isochoric thermal rejection phase. The KITHD thermodynamic cycle may be referred to as an ᴁƷ cycle (after the inventor, Anatoly L. Sverdlin). Characteristics of the ᴁƷ cycle may include that it is a complex, polytropic, PV"-varia cycle that is a dynamically regenerative, high pressure (due to pre-charging) and close type thermodynamic cycle.

Typically, free piston reciprocal, external thermal supply cycles that have been developed employ linear AC alternators as electric power outputs. These types of electrical generating means typically do not exceed 50 kilowatts. Such "free pistons" are actually not "free" since they are linear "generators". Oscillating, free pistons engines that drive AC alternators often employ unstable governing methods that are not fully controllable and are not kinematically synchronized. Moreover, such engines often utilize complicated Thermo-Gravitational fluid dampeners, mechanical resonant frequency applicators (which can experience material fatigue), or similar devices. Thus, these methods that utilize linear electrical "generators" often require additional, complicated governing devices in comparison with a rotary DC generator. Linear "generators" are therefore not capable of competing with a rotary generator since the linear generators are involutes of rotary generator, thereby making a comparable linear "generator" necessarily acquire comparable characteristics, that are explainable by the simplified formula:

$$Diameter \times \omega d \times E_m \, chr,$$

where is: Diameter is the rotary generator diameter, L is the rotary generator Link, E.m.chr is the electromagnetic characteristic variables of the rotary generator and has the same oscillating frequency as the rotational frequency of rotary generator. Accordingly, in conclusion, to compete with a rotary DC generator, a free piston linear generator must acquire characteristics that are comparable to the rotary DC generator. However, doing so is practically impossible with an engine employing, for example, a Carnot thermodynamic cycle.

Although there may be a plurality of different ways to construct a generator capable of employing the KITHD cycle shown in FIG. 1, FIG. 2 illustrates a functional block diagram of one KITHD turbo-compound generator that may employ the KITHD cycle with in an oxidizer independent structure. Meanwhile, FIG. 3 illustrates a functional block diagram of an alternative KITHD turbo-compound generator that may employ the KITHD cycle with an oxidizer dependent structure. As can be appreciated from FIGS. 2 and 3, the primary difference between these two generators is the heat source employed. In this regard, for example, some embodiments may employ air independent thermal generation or air dependent thermal generation. Dependent upon which heat source is employed, certain other components may change to support the employed heat source. However, the basic structure of the remainder of the system is relatively consistent between the two design options.

Referring now to FIG. 2, the heat source of this example embodiment is an oxidizer independent thermal generator 100. Some examples of the oxidizer independent thermal generator 100 may include nuclear thermal generators, thermal storage batteries, radioisotope thermal absorbers, solar thermal absorbers, anaerobic thermal supply means, and/or the like. In some embodiments, a laser induced, quantum nucleonic reactor may form the oxidizer independent thermal generator 100. Quantum nucleonic reactors may be advantageous for some embodiments due to their relatively high energy capacity to weight ratio and the relatively low radiation hazards provided thereby for the generation of thermal energy. The relatively low radiation hazard may be the result of the use of $Hf^{178m2}$ fuel, which emits high temperature gamma rays. $Hf^{178m2}$ fuelled reactor technology may have numerous technology advantages over fission nuclear reactors since $Hf^{178m2}$ produces only gamma radiation and no neutrons, and also does not generate a potentially destructive cascade energy release of a nuclear chain reaction. The absence of neutron radiation means that less bulky shielding may be required and the process may be more tightly controlled. Furthermore, even in the highly unlikely event of an accident, the half life of $Hf^{178m2}$ is about 31 years instead of the half life on the order of thousands of years for uranium and plutonium.

The oxidizer independent thermal generator 100 of an example embodiment may be provided in a radiation protected, hermetically sealed vessel that is charged to a high pressure and is thermo-accumulative to employ compound gasses in connection with heating via $Hf^{178m2}$ fusion reactions. Thermal energy may then be transferred to multiple sets of metalloceramic primary thermal absorbers, as described in greater detail below.

In an example embodiment, the oxidizer independent thermal generator 100 may operate under the control of a digital electro-dynamic governor 110. The digital electro-dynamic governor 110 may be embodied as one or more computers or other processing circuitry. In an example embodiment, the digital electro-dynamic governor 110 may also provide control inputs for auxiliary mechanisms 120, cooling exchangers 122 and one or more magneto-hydro-dynamic amplifiers 124 (or actuators). The oxidizer independent thermal generator 100, auxiliary mechanisms 120, cooling exchangers 122 and one or more magneto-hydro-dynamic (MHD) amplifiers 124 may thereafter provide inputs to a KITHD turbo compound generator 130.

Some example embodiments may employ a magneto-responsive liquid as a thermal working media within the KITHD turbo compound generator 130. Magneto-responsive liquids may have relatively low melting points, high thermal capacities, high density, high thermal conductivity, low propensity to explode or be flammable, high thermal stability, wide temperature ranges as liquids, broad availability relative to variation and composition, and large numbers of possible electro-magnetic and thermo-kinetic variations, as some examples of beneficial characteristics relative to employment in the KITHD turbo compound generator 130.

The MHD amplifiers 124 may be provided as alternating linear induction MHD actuators in the form of electro-hydromagnetic devices that employ the principle of induction motors to move gases and magneto-responsive liquids by the action of electro-magnetic fields. MHD phenomena generate motion of electromagnetic conducting fluids in the presence of magnetic fields. Effects from such interactions may be observable in magneto-responsive liquids and gases and motion of gases and liquids having such properties may include eddy currents induces in those substances when they are employed in electromagnetic devices. The induced currents and their associated magnetic fields may generate Lorentz forces effects, which may affect alternating gases and magneto-responsive liquid motion. One potential advantage of an MHD actuator is that energy alteration is accomplished in the absence of moving mechanical parts. Accordingly, for example, operational fluid friction influences may be minimized for bi-directional impulse turbines for straight to rotary power conversion. Such turbines may be self-rectifying turbines that rotate in the same direction no matter what direction the fluid flows within the system. Such an impulse turbine may acquire a symmetrical, impulse-type rotor and mirror image fixed or variable guide vanes.

In some embodiments, one or more batteries (e.g., battery bank 132) may be provided as an alternative power source, backup power source, or as a component of the oxidizer independent thermal generator 100. The battery bank 132 may provide primary or backup power to various components of the system of FIG. 2. In some cases, a DC rectifier 134 may be provided to generate DC power for charging the battery bank 132 and/or for providing DC power to various components of the system that may require DC power. Controls and instruments 136 may also be employed to monitor various devices or processes of the system of FIG. 2.

In an example embodiment, the KITHD turbo compound generator 130 may drive a permanent magnet generator motor 140. An output of the permanent magnet generator motor 140 may then be used to provide AC output power (e.g., via a DC/AC inverter 142), DC output power (that may be rectified by the DC rectifier 134 and/or may be used to charge the battery bank 132) or rotary mechanical output 144 (e.g., for propulsion).

As indicated above, some alternative embodiments may employ an oxidizer reliant thermal generator 150 as the heat source. Some examples of the oxidizer reliant thermal generator 150 may include thermal supply sources that require carbon fuels, combustible gases, liquid fuels, synthetic fluids, solid combustible substances, waist thermal sources, and/or the like. As such, the oxidizer reliant thermal generator 150 may utilize oxidizer reliant fuel 152 and/or combustion oxidizers 154 that may be stored in a manner and location that makes the oxidizer reliant fuel 152 and/or combustion oxidizers 154 accessible to the oxidizer reliant thermal generator 150.

In an example embodiment, the oxidizer reliant thermal generator 150 may operate under the control of a digital electro-dynamic governor 160, which may be identical to or similar to the digital electro-dynamic governor 110 described above in connection with the example of FIG. 2. Moreover, it should be appreciated that in some embodiments, a system may be provided that is capable of running alternately with an oxidizer reliant thermal generator or an oxidizer independent thermal generator at different times, and therefore, literally the same digital electro-dynamic governor could work in either the example of FIG. 2 or the example of FIG. 3 depending on the mode of operation of the system. For example, a submarine may operate in an oxidizer independent mode when submerged and in an oxidizer reliant mode when surfaced or snorkeling.

In some embodiments, the digital electro-dynamic governor 160 may also provide control inputs for auxiliary mechanisms 170, cooling exchangers 172 and one or more magneto-hydro-dynamic amplifiers 174. The oxidizer reliant thermal generator 150, auxiliary mechanisms 170, cooling exchangers 172 and one or more magneto-hydro-dynamic (MHD) amplifiers 174 may thereafter provide inputs to a KITHD turbo compound generator 180, which may be similar in form and function to the KITHD turbo compound generator 130 of FIG. 2 (or may be the exact same device in multi-modal operable embodiments). In an example embodiment, the cooling exchangers 172 may include active dynamic cooling and gas-dynamic thermal exchangers with anticorrosion enclosures to minimize dead volumes.

In some embodiments, one or more batteries (e.g., battery bank 182) may be provided as an alternative power source or backup power source. The battery bank 182 may provide primary or backup power to various components of the system of FIG. 3. In some cases, a DC rectifier 184 may be provided to generate DC power for charging the battery bank 182 and/or for providing DC power to various components of the system that may require DC power. Controls and instruments 186 may also be employed to monitor various devices or processes of the system of FIG. 2.

In an example embodiment, the KITHD turbo compound generator 180 may drive a permanent magnet generator motor 190. An output of the permanent magnet generator motor 190 may then be used to provide AC output power (e.g., via a DC/AC inverter 192), DC output power (that may be rectified by the DC rectifier 184 and/or may be used to charge the battery bank 182) or rotary mechanical output 194 (e.g., for propulsion). Each of these components may also be similar in form or function (or be the same device) as the corresponding devices described in connection with the example of FIG. 2.

In example embodiments, KITHD turbo generator operation (e.g., via the KITHD turbo compound generator 130 of FIG. 2 or the KITHD turbo compound generator 180 of FIG. 3) is designed to perform a direct conversion from an alternating electromagnetic magneto-responsive fluid column to rotary motion. Thus, unlike may conventional power generation methods that initially produce reciprocal motion and use kinematically complex equipment to convert the reciprocal motion into rotary motion, example embodiments may more efficiently generate power by avoiding the use of equipment for conversion of reciprocal motion to rotary motion by directly converting alternating electromagnetic magneto-responsive fluid column to rotary motion.

In an example embodiment, KITHD turbo generator operation may generate positive energy by directly transforming thermo-kinetically excited and then alternately cooled, high pressure, pre-charged compound gases and magneto-responsive liquids straight to functional kinematic rotary motion by controlling and amplifying electro-magneto-hydro-dynamic forces. As such, some embodiments may enable power generation without the use of traditional kinematical power converters such as pistons, flow control valves, special seals, piston rods, complicated linkages, crankshafts, connecting rods, gear boxes, Scotch yokes, swash-wobble plates, orbital kinematic mechanisms, and/or the like.

Some example embodiments may implement thermo-kinetic and hydro-kinetic characteristics of a magneto-conductive fluid, which may be influenced by electro-magnetic fields to provide for conversion of thermo-kinetic features of the magneto-responsive liquids directly to kinematic power energy output. Moreover, using magneto-conductive fluids in this manner may enable different possibilities for structures that can deliver efficient power production with KITHD turbo generator operation. In one example, as will be described in greater detail below, a dual, double-acting, incline, V-configured power generating modules. Multiple sets of such modules may be employed in a spaced apart manner. Magneto-responsive liquids may be thermally and electromagnetically influenced in a pre-charged, high pressure environment to convert thermo-kinetic and electro-hydro-dynamically induced alternating flow directly into rotary motion. For example, a plurality of bi-directional impulse turbines may be employed to activate (e.g., via hydraulic energy) forced, reciprocal flow, to convert magneto-responsive liquid column reciprocal motion directly to kinematically independent, positive power, rotary motion.

A KITHD turbo compound generator may be implemented as a single, double acting power generating module with a single or multiple bi-directional impulse turbine arrangement. Alternatively, a KITHD turbo compound generator may be implemented as a multi-module, double acting power generating module and/or as a incline, V-configured power generating module, again with a single or multiple bi-directional impulse turbine arrangement.

FIG. 4 illustrates a perspective view of a KITHD turbo-compound generator 198 of an example embodiment. Meanwhile, FIG. 5 illustrates a schematic diagram of various components of the KITHD turbo-compound generator of FIG. 4 according to an example embodiment. FIGS. 6-13 illustrate detailed views of various portions and/or components of the embodiment of FIG. 5. FIG. 6 illustrates a more detailed schematic view of the heat source of an example embodiment. FIG. 7 illustrates a more detailed view of the primary thermal absorbers of an example embodiment. FIG. 8 illustrates a more detailed view of the operable coupling provided between the heat source and dynamic regenerators of FIG. 5 according to an example embodiment. FIG. 9 illustrates a more detailed view of active dynamic regenerators and active main cooling exchangers of FIG. 5 according to an example embodiment. FIG. 10 illustrates portions of FIG. 5 that relate to thermal excitation in greater detail according to an example embodiment. FIG. 11 illustrates a more detailed view of a displacement and power generating module according to an example embodiment. FIG. 12 illustrates portions of FIG. 5 that relate to thermal rejection in greater detail according to an example embodiment. FIG. 13 illustrates a more detailed view of a compression and power generating module according to an example embodiment.

As shown in FIG. 5-13, a heat source may be provided in the form of an oxidizer independent quantum nucleonic thermal energy generator 200. The oxidizer independent quantum nucleonic thermal energy generator 200 may be provided in a hermetically sealed high pressure vessel that is radiation insulated. The oxidizer independent quantum nucleonic thermal energy generator 200 may be pre-charged with thermo-accumulative, compound gases. In this example, the oxidizer independent quantum nucleonic thermal energy generator 200 may house a first set of primary thermal absorbers 201 and a second set of primary thermal absorbers 202. The first and second sets of primary thermal absorbers 201 and 202 may be metalloceramic thermal absorbers in one example embodiment. In this regard, for example, referring to FIG. 7, the first and second sets of primary thermal absorbers 201 and 202 may each include a ceramic matrix 203 and ionic liquid thermal absorbers 204 interposed between members of the ceramic matrix 203.

In an example embodiment, the oxidizer independent quantum nucleonic thermal energy generator 200 may include a gamma ray laser 205, which may be controlled at least in part via a laser focusing drive 206, focusing electromagnets 207, and focusing electromagnet drives 208. In some embodiments, the digital electro-dynamic governor 110 or 160 may further provide control inputs to one or more of the gamma ray laser 205, laser focusing drive 206, focusing electromagnets 207, and/or focusing electromagnet drives 208. The oxidizer independent quantum nucleonic thermal energy generator 200 may further include fusion reaction control rods 209 and fusion reaction control rod drives 210 and 211. The control rods 209 may be insertable into the oxidizer independent quantum nucleonic thermal energy generator 200 to control fusion reactions taking place relative to activating fuel material $Hf^{178m2}$ 212, which may be provided on an activating fueling material carrier 213 that is operated via an activating fueling material carrier drive 214. The oxidizer independent quantum nucleonic thermal energy generator 200 may further include a fueling material, thermal fluid cooling exchanger 215.

In an example embodiment, a fusion reaction may be initiated via outward movement of the control rods 209 to increase the clearance between electromagnetic heads. Control of the fusion reaction may be dependent at least in part upon the distance between the control rods 209 and the focusing electromagnets 207. The gamma ray laser 205 may activate the fueling material $Hf^{178m2}$ 212, which may initiate thermal energy generation.

Intensity of the thermal energy generation may vary based on the emitting power of the gamma ray laser 205, the distance to the fueling material $Hf^{178m2}$ 212, the position of the control rods 209 and the focusing electromagnets 207. Thermal energy that is generated by the fusion reaction may then be transmitted to the first and second sets of primary thermal absorbers 201 and 202. Nanoparticles of the thermo-magneto conductive, magneto-responsive liquids contained within the first and second sets of primary thermal absorbers 201 and 202 may then be heated up accordingly.

Heated magneto-responsive liquid may be thermally excited to induce a flow of the liquid through supply contour 224 to the intake of a linear induction pump 225. Magneto-dynamically amplified magneto-responsive liquid may then flow from the linear induction pump 225 through supply contour 226 and divided supply contour 227 to liquid sides of a ceramic matrix of active dynamic regenerators 228 and 230. From supply contour 227, thermally excited magneto-responsive liquid entering the liquid side of the ceramic matrix of the active dynamic regenerator 228. This may heat up the ceramic matrix accumulating material such that the accumulating material stores thermal energy transmitted thereto.

Thermally and electro-magneto-dynamically activated magneto-responsive liquids that are moved into the liquid side of the active dynamic regenerator 228 may be further amplified by EMD actuator 229. The EMD actuator 229 may include an electromagnetic coil that may be disposed around a core of the active dynamic regenerator 228. The thermal energy provided via the reciprocal flow direction of the magneto-responsive liquids may provide an improved regenerating process relative to other passive regenerating methods. The magneto-responsive liquids may exit the active dynamic regenerator 228 via return contour 232 and connect to main return contour 234 to return to the first set of primary thermal absorbers 201.

Referring again to FIGS. 8 and 9, thermally excited magneto-responsive liquids may also enter the liquid side of the active dynamic regenerator 230 from contour 227 to heat up the ceramic matrix accumulating material of the active dynamic regenerator 230. Thermally and electro-magneto-dynamically activated magneto-responsive liquids that are moved into the liquid side of the active dynamic regenerator 230 may be further amplified by EMD actuator 231 and its corresponding electromagnetic coil that is disposed around a core of the active dynamic regenerator 230. The thermal energy provided via the reciprocal flow direction of the magneto-responsive liquids may provide an improved regenerating process relative to other passive regenerating methods. The magneto-responsive liquids may exit the active dynamic regenerator 230 via return contour 233 and connect to main return contour 234 to return to the first set of primary thermal absorbers 201 to repeat the above described thermo-kinetic cycles.

A primary thermal rejection exchanger 359 may be provided in operable communication with the active dynamic regenerators 228 and 230 via respective ones of a first active thermal rejection exchanger 367 and a second active thermal rejection exchanger 368 as shown in FIG. 8. In this regard, a primary cooling contour 361 may divide into contours 362 and 363. Contour 364 may split off from primary cooling contour 361 at the point at which contour 363 returns to the first and second active thermal rejection exchangers 367 and 368. Contour 363 may split into contours 365 and 366, which may provide fluid communication with the liquid side of the first and second active thermal rejection exchangers 367 and 368, respectively. Cooling magneto-responsive liquid flow may be amplified by EMD actuator 369 in the first active thermal rejection exchanger 367 and by EMD actuator 370 in the second active thermal rejection exchanger 368. The EMD actuators 369 and 370 may include electromagnetic coils that are disposed around the first and second active thermal rejection exchangers 367 and 368, respectively, to improve the thermal, cooling exchange process relative to passive cooling methods.

Magneto-responsive liquid may flow out of the first and second active thermal rejection exchangers 367 and 368 return contours 371 and 372, which may connect to the suction side 373 of linear induction pump 375. Linear induction pump 375 may supply contour 376, which may return the liquid to the supply header 378 of the primary thermal rejection exchanger 359. This cyclical flow path may be repeated to define thermo-kinetic cooling cycles.

In an example embodiment, the primary thermal rejection exchanger 359 may include multiple sets of thermal rejection exchangers 360. The primary thermal rejection exchanger 359 may be cooled by a primary cooling pump (PCP) via contour 358 and cooling fluid may return to the PCP via exit contour 379. Thus, for example, the thermo-conductive, magneto-responsive liquids that pass through the thermal rejection exchangers 360 are indirectly thermally interfaced with the cooling fluids provided by the PCP within the primary thermal rejection exchanger 359.

Thermal excitation (enthalpy) proceedings will now be described in reference primarily to FIG. 10. As shown in FIG. 10, the second set of primary thermal absorbers 202 may be operably coupled to a displacement and power generating module 222. FIG. 11 illustrates a more detailed view of the displacement and power generating module 222. In an example embodiment, the second set of primary thermal absorbers 202 may thermally excite magneto-responsive liquids to induce thermo-kinetic flow out of the supply contour 243 to the intake of linear induction pump 244. The thermally excited magneto-responsive liquids may flow from the linear induction pump 244 to supply contour 245, which may have contour 246 split off therefrom. Contour 246 may then divide into contours 247 and 248, which may supply a first inner thermal exchanger 249 and a second inner thermal exchanger 250, respectively.

Contour 245 proceeds past the split with contour 246 to an opposite end of the power generating module 222 via contours 251 and 252 to supply a third inner thermal exchanger 253 and a fourth inner thermal exchanger 254, respectively. The first, second, third and fourth inner thermal exchangers 249, 250, 253 and 254 may be provided within the displacement and power generation module 222 to respond to the thermal excitation and employ compound gases and thermo-magneto conductive, magneto-responsive liquids as operating mediums. As such, each of the first, second, third and fourth inner thermal exchangers 249, 250, 253 and 254 may be referred to as an exciter (e.g., exciter 1, exciter 2, exciter 3 and exciter 4, respectively). Each exciter may itself be referred to as a power generating module in some cases.

The first inner thermal exchanger 249 and the third inner thermal exchanger 253 may provide return flows to the second set of primary thermal absorbers 202 via return contours 257 and 255, which may connect to return header 259 and define a path for a thermo-kinetic cycle capable of repetition. Meanwhile, the second inner thermal exchanger 250 and the fourth inner thermal exchanger 254 may provide return flows to the return header 259 via contours 258 and 256 again defining a path for a thermo-kinetic cycle capable of repetition.

In an example embodiment, outer electromagnetic coils 261 may be provided proximate to an outside of each exciter and internal electromagnetic coils 262 may be disposed to face the outer electromagnetic coils 261 from an inside of the exciters proximate to each of the first, second, third and fourth inner thermal exchangers 249, 250, 253 and 254. The inner electromagnetic coils 262 may function as secondary core electromagnets of the magneto-hydro-dynamic actuators described above in connection with the examples of FIGS. 2 and 3.

Each exciter of the displacement and power generating module 222 may be pre-charged with a relatively high initial pressure, compound gas, and may be filled by a thermo-magneto conductive, magneto-responsive liquid. To generate positive power in accordance with the first and second laws of thermodynamics, thermo-kinetic maximum and minimum gradients may be maintained relatively far apart in order to achieve thermal efficiency.

Referring now to FIGS. 12 and 13, operation of a compression and power generating module 450 will be described according to an example embodiment. Primary, counter-flow of cooling magneto-responsive liquids through cooling exchangers 360 of the primary thermal rejection exchanger 359 may be provided from the supply header 378. After passing through the cooling exchangers 360, fluid may be passed to contour 361 before splitting between contours 362 and 363. Contour 362 may supply the intake of a first thermal rejector exchanger 388 and contour 362 may also split off to contour 382, which supplies fluid to the intake of a second thermal rejector exchanger 384 to thereby cool (via gas and liquid operating mediums) the first and second thermal rejector exchangers 388 and 384. Recirculated liquid is then fed back to the primary thermal rejection exchanger 359 via contour 390. Liquid in contour 390 is supplied to the intake 395 of linear induction pump 396 to contour 377 which is in fluid communication with the supply header 378 to return fluid to the primary thermal rejection exchanger 359 to define a path for a thermo-kinetic cycle capable of repetition.

Meanwhile, contour 364 supplies a third thermal rejector exchanger 385 and a fourth thermal rejector exchanger 387 to supply cooling magneto-responsive liquids to the compression and power generating module 450. Contour 393 then connects to contour 374 and contour 372 and to the intake 373 the linear induction pump 375. The linear induction pump 375 then supplies fluid to contour 376, which connects back to the supply header 378 to return fluid to the primary thermal rejection exchanger 359 to define a path for a thermo-kinetic cycle capable of repetition.

In an example embodiment, outer electromagnetic coils 400 may be provided proximate to an outside of each of the first, second, third and fourth thermal rejector exchangers 388, 384, 385 and 387 and internal electromagnetic coils 401 may be disposed to face the outer electromagnetic coils 400 from an inside of the first, second, third and fourth thermal rejector exchangers 388, 384, 385 and 387. The inner electromagnetic coils 401 may function as secondary core electromagnets of the magneto-hydro-dynamic actuators described above in connection with the examples of FIGS. 2 and 3. All of the electromagnetic coils of the system (e.g., inner and outer coils 261, 262, 400 and 401) may operate under the control of the digital electro-dynamic governor 110 or 160.

Before operation, magneto-responsive liquid columns in thermal exciter modules 222 and thermal rejecting modules 450 may remain relaxed and at mid stroke of the respective modules. Compound gas volumes may be relatively equally divided and positioned at mid strokes within the thermal exciter modules 222 and thermal rejecting modules 450.

Operation of the exciters of FIGS. 5, 10 and 11 will now be described according to one example embodiment. In this regard, for example, under control of the digital electro-dynamic governor 110 or 160, the MHD actuators (e.g., outer electromagnetic coils 261 and inner electromagnetic coils 262) may generate electromagnetic energy to force the magneto-responsive liquid column to stir upward to an upper stage of the first inner thermal exchanger 249. This movement may displace compound gases 500 within a main thermal body 502 of the first inner thermal exchanger 249. Reciprocal contour H1 (see FIG. 5) connects to a gaseous exchanger 264 of the active dynamic regenerator 230. Pre-charged with an initially high pressure of compound gases, the main thermal body 502 is then filled with thermo-magneto conductive, magneto-responsive liquids 504. The magneto-responsive liquid 504 is then thermally excited by interfacing with the first inner thermal exchanger 249. Compound gases 500 volumes are then displaced to transfer thermal energy to the ceramic matrix of the active dynamic regenerator 228. At that phase, displacement of compound gases 500 may occur in the direction of counter flows associated with incoming thermally excited and amplified (e.g., via the EMD actuator 229) magneto-responsive liquid flows from the first set of primary thermal absorbers 201. The magneto-responsive liquid column may then be agitated by the EMD actuators (e.g., outer electromagnetic coils 261 and inner electromagnetic coils 262) in the upper stage of the first inner thermal exchanger 249 to displace the compound gases 500 responsive to heating therein.

Meanwhile, the magneto-responsive liquid column of the second thermal rejector exchanger 384 may move up to displace compound gases therein to the main rejecting reciprocal contour R2. The magneto-responsive liquid column may be influenced by electromagnetic fields generated by the EMD actuators (e.g., outer electromagnetic coils 400 and inner electromagnetic coils 401) to remain behind at a ½ stroke position. Following magneto-responsive liquid column motion of the first inner thermal exchanger 249, the magneto-responsive liquid column motion of the first inner thermal exchanger 249 may supersede second thermal rejector exchanger 384 magneto-responsive liquid column motion by ½ stroke. The digital-electro-dynamic governor 110 or 160 may control the electromagnetic fields generated by the MHD actuators (e.g., outer electromagnetic coils 261 and 400 and inner electromagnetic coils 262 and 401). Compound gases of the first inner thermal exchanger 249 displace through contour H1 to the active matrix of the active dynamic regenerator 228. From the gaseous exchanger 264 of the active dynamic regenerator 228, counter flow is initiated to the cooling exchanger 350. Compound gases are then cooled down via reciprocal contour R2, filling the second thermal rejector exchanger 384 and causing the compound gases to also be cooled down by the second thermal rejector exchanger 384.

Accordingly, thermally activated displacing gas flows from the first inner thermal exchanger 249 (exciter 1) reciprocate via H1 through the active dynamic regenerator's 228 gaseous exchanger 264 to transfer thermal energy via flows in the cooling exchanger 350 so that cooling displacing gas flows may reciprocate through contour R2 to and out from the second thermal rejector exchanger 384 (rejector 2). Accordingly, reciprocating thermo-kinetic forces and an electro-hydro-dynamic flywheel effect may be generated and the inertia mass of the magneto-responsive liquid column may be combined with that effect to generate a kinematically independent rotary positive (net) energy output from a bi-directional hydraulic turbine 550 disposed between the exciter 1 and exciter 2 modules (e.g., the first and second inner thermal exchangers 249 and 250).

Pre-charged with an initially high pressure of compound gases, the main thermal body of the second inner thermal exchanger 250 is also filled with thermo-magneto conductive, magneto-responsive liquids. The magneto-responsive liquid is then thermally excited by interfacing with the second inner thermal exchanger 250. Synchronously with the operation of the first inner thermal exchanger 249 (exciter 1) described above, and responsive to control by the digital electro-dynamic governor 110 or 160, an electromagnetic flywheel effect may be initiated by the electromagnetic field and compound gases due to thermo-kinetic expansion forces that cause the magneto-responsive liquid to move downward to the bottom stage of the second inner thermal exchanger 250 (exciter 2). This movement may cause the magneto-responsive liquid column to encounter guide blades (e.g., a nozzle ring) of the bi-directional hydraulic turbine 550.

The magneto-responsive liquid column may powerfully flow through the blades of the working wheel of the bi-directional hydraulic turbine 550 to convert magneto-hydro-dynamically induced liquid column hydro-dynamic flow directly into kinematic rotary positive power output without the use of complicated kinematics. The transient turbine working wheel moves in response to magneto-responsive liquid column flow interacting with the guide blades of the bi-directional hydraulic turbine 550 based on principles associated with Bernoulli's laws relating to decreasing velocity and increasing pressure in such situations. FIG. 14 illustrates the working wheels 552 of the bi-directional hydraulic turbine 550 of an example embodiment. FIG. 15 illustrates a view of the turbine 550 in its operating environment, along with the corresponding geometry and velocity vectors generated thereby according to an example embodiment. As can be seen in FIG. 14, the guide blades 554 on each side of the rotor blades 556 of the working wheels 552 are arranged to direct flow over the rotor blades 556 in the same direction. Thus, the turbine of FIG. 14 is bi-directional. The magneto-responsive liquid column may then be displaced up to the adjacent exciter module (e.g., exciter 1). Thermo-kinetic and electro-hydro-dynamic reciprocating forces may therefore be generated in the form of a positive energy output. FIG. 16 illustrates a view of portions of a working wheel according to an example embodiment. In this regard, FIG. 16 shows a wheel hub 580 from which a plurality of spars 582 radially extend to terminate at blades 584.

Compound gas reciprocal flows associated with the exciter 2 module and the rejector 3 module are similar to those described above in association with the exciter 1 and rejector 2 modules. In this regard, for example, the exciter 2 module (i.e., the second inner thermal exchanger 250) is operably coupled to the active dynamic regenerator 228 gaseous exchanger 265 via reciprocal contour H2. Magneto-responsive liquid volume released from the downward moving column of the exciter 2 module to push compound gases through reciprocal contour R3 of the rejector 3 module may reciprocate and be cooled down by the cooling exchanger 351. From cooling exchanger 351, compound gases may enter the active dynamic regenerator's 228 gaseous exchanger 265 to be heated up by accumulated thermal energy from the ceramic matrix therein. Compound gases, at that phase, may flow parallel to thermally activated magneto-responsive liquid flow from the first set of thermal absorbers 241 while being amplified by EMD actuator 231 to implement an active, reciprocal thermal exchange to multiply thermal efficiencies of the active dynamic regenerator 228. Compound gases heated by the inner thermal exchanger 350 may exit the exciter 3 module. As a desirable part of the sequence, compound gas flows may be compressed in and out from the rejector 3 module and reciprocate through contour R3 so that a flow via the cooling exchanger 351 cools the compressed gases. The gases enter the active dynamic regenerator 228 gaseous exchanger 265 and absorb thermal energy therein to thermally activate compressed gas flows to reciprocate via contour H2 connected to the exciter 2 module to fill the exciter 2 module with thermally activated compressed gases.

Reciprocating thermo-kinetic forces, electro-hydro-dynamic flywheel effects and inertia mass of the magneto-responsive liquid column may then combine to generate a kinematically independent, rotary positive (net) energy output from the adjacent exciter 2 and exciter 1 modules via the bi-directional hydraulic turbine 550.

Synchronously, with operation of the exciter-1 module, and under control of the digital electro-dynamic governor 110 or 160 via the MHD actuators (e.g., outer electromagnetic coils 261 and inner electromagnetic coils 262), electromagnetic energy generated by the MHD actuators may be used to power the magneto-responsive liquid column to move upward to the upper stage of the exciter-4 module. This movement may displace compound gases to main thermal, reciprocal contour H4, which connects to the active dynamic regenerator's 230 gaseous exchanger 267.

Pre-charged with an initially high pressure of compound gases, the main thermal body of the fourth inner thermal exchanger 254 (i.e., the exciter 4 module) is also filled with thermo-magneto conductive, magneto-responsive liquids. The magneto-responsive liquid is then thermally excited by interfacing with the fourth inner thermal exchanger 254. Compound gas volumes are then displaced to transfer thermal energy to the ceramic matrix of the active dynamic regenerator 230. At that phase, displacement of compound gases may occur in the direction of counter flows associated with incoming thermally excited and amplified (e.g., via the EMD actuator 232) magneto-responsive liquid flows from the first set of primary thermal absorbers 201. The magneto-responsive liquid column may then be agitated by the EMD actuators (e.g., outer electromagnetic coils 261 and inner electromagnetic coils 262) in the upper stage of the exciter 4 module to displace the compound gases through main thermal contour H4, which connects to the gaseous exchanger 267 of the active thermal regenerator 230 responsive to heating therein. The magneto-responsive liquid column of the exciter 4 module is heated by the third inner thermal exchanger 253.

Synchronously, the magneto-responsive liquid column of the rejector 1 module may move up to compress compound gases to the main, rejecting reciprocal contour R1. The magneto-responsive liquid column is agitated by electromagnetic fields that have been generated by the MHD actuators 400 and 401 to keep the rejector 1 module behind at the ½ stroke position and following the magneto-responsive liquid column motion of the exciter 4 module.

The motion of the magneto-responsive liquid column in the exciter 4 module may dominantly supersede the rejector 1 module's magneto-responsive liquid column motion by ½ stroke. That features leading and varied by the digital electro-dynamic governor 110 or 160 and controlling by electromagnetic fields, generated by MHD actuators 261 and 262 and 400 and 401. Compound gases of the exciter 4 module may be displaced through contour H4 to the active dynamic regenerator's gaseous exchanger 267. From the gaseous exchanger 267 of active dynamic regenerator 230, counter-flow to the main gas cooling exchanger 353 may be initiated. Cool down of the compound gases may then occur via reciprocal contour R1, filling up the rejector 1 module.

In some cases, a desirable or essential part of the sequence may include the thermal activation that displaces gas flows from the exciter 4 module to reciprocate via contour H4 through the gaseous exchanger 267 of the active dynamic regenerator 230. The gas flow may then transfer thermal energy to the ceramic matrix of the active dynamic generator 230 and then enter and flow via the main gas cooling exchanger 353 to cool compressed gas flows that reciprocate through contour R1 to and out from the rejector 1 module. Reciprocating thermo-kinetic forces, the electro-hydro-dynamic flywheel effect and inertia mass of the magneto-responsive liquid column may therefore combine to generate kinematically independent, rotary positive (net) energy output, from adjacent exciter 4 module and exciter 3 module via the bi-directional hydraulic turbine 550.

Synchronously with the operations described above relative to actions associated with the exciter 4 module, the digital electro-dynamic governor 110 or 160 may control the magneto-hydro-dynamic actuators and the outer electromagnetic coils 261 and inner electromagnetic coils 262 to create an electromagnetic flywheel effect via manipulation of the electromagnetic field and compound gases in a similar manner to that which has been described above. In this regard, for example, thermo-kinetic expansion forces may cause the magneto-responsive liquid column to move downward to the bottom stage of the exciter 3 module. This movement may cause the magneto-responsive liquid column to impact a guide blades apparatus (nozzle ring) of the bi-directional hydraulic turbine 550. The magneto-responsive liquid column may move powerfully flow past blades of the working wheel of the bi-directional hydraulic turbine 550 and convert magneto-hydro-dynamically induced liquid column to exert hydro-dynamic power flow directly to kinematic, rotary positive power output. In this regard, reciprocal flows through the bi-directional hydraulic turbine 550 may cause movement of the working wheel of the bi-directional hydraulic turbine 550 in a consistent direction in order to directly convert the reciprocating flows into rotary power.

Compound gas reciprocal flows may be exchanged between exciter 3 and rejector 4 modules. In this regard, for example, the exciter 3 module may be connected to the gaseous exchanger 266 of active dynamic regenerator 230 via main thermal reciprocal contour H3. The magneto-responsive liquid volume may be released from moving downward and the magneto-responsive liquid column of the exciter 3 module, filled by pre-charged compound gases, may be reciprocally pushed to the main cooling reciprocal contour R4, to and out of the rejecting 4 module, to be cooled down by main gas cooling exchanger 352. From cooling exchanger 352, compound gases may enter the gaseous exchanger 265 of the active dynamic regenerator 230 to heat up via the accumulated thermal energy from the ceramic matrix of the active dynamic regenerator 230. Compound gases, at that phase, may flow parallel to the thermally activated magneto-responsive liquid flow from the first set of thermal absorbers 201 additionally amplified by EMD actuator 232. By implementing an active, reciprocal thermal exchange method, thermal efficiencies of the active dynamic regenerator 230 may be multiplied. Out coming from Exciter-4 module Compound gases heated up by Inner Thermal exchanger 254.

In some embodiments, it may be desirable or even essential that compressed compound gases flow in and out from the rejector 3 module to reciprocate through contour R3 via the main gas cooling exchanger 351 to cool compressed gases and enter the gaseous exchanger 265 of the active dynamic regenerator 228 and absorb thermal energy from the ceramic matrix of the active dynamic regenerator 228. Thermally activated compressed gas may then reciprocate via flow through contour H2, which is connected to the exciter 2 module. The exciter 2 module may therefore be filled with thermally activated compressed gases. Reciprocating thermo-kinetic forces, the electro-hydro-dynamic flywheel effect and inertia mass of the magneto-responsive liquid column may therefore combine to generate kinematically independent, rotary positive (net) energy output, from adjacent exciter 3 module and exciter 4 module via the bi-directional hydraulic turbine 550.

In an example embodiment, reciprocating thermo-kinetic forces of cooled gas and magneto-responsive liquid column flows that reciprocate through contours R1 and R4 may alternate from the rejector 1 module to the adjacent rejector 4 module and reverse so that the electro-hydro-dynamic flywheel effect and inertial mass of the magneto-responsive liquid column combine to generate kinematically independent, rotary positive (net) energy output from the adjacent rejector 1 module and rejector 4 module via the bi-directional hydraulic turbine 550. Reciprocating thermo-kinetic forces of cooled gas and magneto-responsive liquid column flows that reciprocate through contours R2 and R3 may also alternate from the rejector 2 module to the adjacent rejector 3 module and reverse so that the electro-hydro-dynamic flywheel effect and inertial mass of the magneto-responsive liquid column combine to generate kinematically independent, rotary positive (net) energy output from the adjacent rejector 2 module and rejector 3 module via the bi-directional hydraulic turbine 550.

In an example embodiment, the digital electro-dynamic governor 110 or 160 may provide inputs to the MHD actuators, the outer electromagnetic coils 261 and 400 and the inner electromagnetic coils 262 and 401 of multiple rejector modules 450. By applying alternating electrical energy to the MHD actuators, the reciprocal electro-hydro-dynamic flywheel effect may be generated to set the magneto-responsive liquid columns of multiple exciter modules 222 and multiple rejector modules 450 in motion. Inertial mass of the magneto-responsive liquid columns and the electro-hydro-dynamic flywheel effect may combine such that rotary positive (net) energy is generated in a kinematically independent manner from adjacent exciter modules 220 and rejector modules 450, as described above, via the bi-directional hydraulic turbine 550. The exciter and rejector modules may act as power modules, which may be V-configured, inclined and double acting power modules that experience induced alternating flows therethrough responsive to reciprocal flows of compound gases and magneto responsive liquid columns that are driven by thermo-kinetic and electromagnetic influence under the control of a digital programmable governor.

Accordingly, some example embodiments may enable a digital programmable governor (e.g., digital electro-dynamic governor 110 or 160) to be employed with respect to management of alternating, linear induction, MHD actuators, to control an entire thermo-kinetic, electro-magneto-dynamic and kinematically independent thermodynamic cycle. Control and variation of operating parameters such as temperatures, operating pressures, phase positions, compression ratios, rotational frequencies, power requirement outputs and/or the like may all be made via selection of corresponding design features consistent with the principles described herein. Electro-magneto-dynamic variations to physical and thermo-kinetic characteristics of operational magneto-responsive fluids may be selected for efficient operation in accordance with ambient requirements. In some embodiments, the MHD actuators may provide a kinematically independent energy source for providing a levitation effect relative to operation of the magneto-responsive liquid column to reduce friction losses. Example embodiments may therefore employ a KITHD turbo-compound generator 600 to produce rotary motion output power for provision of propulsion via a shaft 610 that powers a propeller and/or via an electrical generator 620 as shown in FIG. 17.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A power generator comprising:
a digital programmable governor;
a plurality of power modules having
a working fluid including a compound gas and a magneto-responsive liquid column disposed therein;
at least one set of magneto-hydro-dynamic actuators, responsive to control of the digital programmable governor and in association with a thermal cycle of adding heat to and removing heat from the working fluid, disposed proximate to the plurality of power modules to provide influence to drive reciprocal flows of the working fluid through the at least one power module; and
a plurality of bi-directional turbines disposed to receive the reciprocal flows and perform a kinematically independent conversion of the reciprocal flows to rotary power;
a thermal generator capable of adding heat to the working fluid; and
one or more cooling exchangers configured to remove heat from the working fluid.

2. The power generator of claim 1, wherein the thermal generator comprises an oxidizer independent thermal generator.

3. The power generator of claim 2, wherein the oxidizer independent thermal generator comprises a quantum nucleonic reactor, nuclear thermal generator, thermal storage battery, radioisotope thermal absorber, solar thermal absorber, or anaerobic thermal supply.

4. The power generator of claim 1, wherein the thermal generator comprises an oxidizer reliant thermal generator.

5. The power generator of claim 4, wherein the oxidizer reliant thermal generator comprises a thermal supply source that requires carbon fuels, combustible gases, liquid fuels, synthetic fluids, solid combustible substances, or waste thermal sources.

6. The power generator of claim 1, wherein the power generator is configured to operate in a first mode of operation in which the thermal generator comprises an oxidizer independent thermal generator, and a second mode of operation in which the thermal generator comprises an oxidizer reliant thermal generator.

7. The power generator of claim 1, wherein the plurality of power modules further includes one or more exciter modules and corresponding one or more rejector modules.

8. The power generator of claim 7, wherein each of the exciter and rejector modules is inclined out of a vertical plane.

9. The power generator of claim 7, wherein the one or more exciter modules and corresponding one or more rejector modules are V-configured, double acting power modules that experience induced alternating flows of the compound gas and the magneto-responsive liquid column driven by thermo-kinetic and electromagnetic influence under the control of the digital programmable governor.

10. The power generator of claim 7, wherein at least one bi-directional turbine is disposed between adjacent exciter modules and at least one bi-directional turbine is disposed between adjacent rejector modules to convert the bi-directional flows between adjacent exciter and rejector modules directly into rotary motion.

11. The power generator of claim 7, wherein the exciter modules are relatively hot and the rejector modules are relatively cold.

12. The power generator of claim 1, wherein each of the plurality of bi-directional turbines comprises a working wheel having guide blades disposed on each opposing side thereof, the guide blades directing flows to the working wheel such that a flow approaching the working wheel in either direction causes rotation of the working wheel in one direction.

13. The power generator of claim 1, wherein the thermal generator comprises a thermo-accumulative metallic-ceramic matrix.

14. The power generator of claim 1, wherein one or more cooling exchangers provide active dynamic cooling and one or more gas-dynamic thermal exchangers.

15. The power generator of claim 14, wherein the one or more cooling exchangers include anticorrosion enclosures to minimize dead volumes.

16. The power generator of claim 1, wherein the one or more cooling exchangers indirectly exchange thermal energy with the working fluids to vary from counter flow to parallel flow therethrough to enhance thermal efficiency of the one or more cooling exchangers.

17. The power generator of claim 1, wherein the at least one set of magneto hydro-dynamic actuators alter, based on control provided by the digital programmable governor, electromagnetic fields within the at least one power module to enhance flow of the working fluid responsive to thermo-kinetic influence.

18. The power generator of claim 1, wherein operating temperatures of the power generator are selectable based on ambient requirements.

19. The power generator of claim 1, wherein the power generator operates by controlling a $PV^n$-vary thermodynamic cycle with external thermal modes, based on variable, thermo-kinetic exchange phases including:
a first phase comprising a variable ratio isobaric compression phase;
a second phase comprising a variable polytropic compression phase;
a third phase comprising a variable ratio isochoric thermal accumulation phase;
a fourth phase comprising a variable ratio isobaric expansion phase;
a fifth phase comprising a variable polytropic expansion phase; and
a sixth phase comprising a variable ratio isochoric thermal rejection phase.

* * * * *